(12) United States Patent
Baptist et al.

(10) Patent No.: US 11,983,070 B2
(45) Date of Patent: May 14, 2024

(54) DETERMINING SEGMENTATION SIZE IN A DISTRIBUTED STORAGE NETWORK

(71) Applicant: PURE STORAGE, INC., Mountain View, CA (US)

(72) Inventors: Andrew D. Baptist, Mt. Pleasant, WI (US); Jason K. Resch, Warwick, RI (US)

(73) Assignee: PURE STORAGE, INC., Mountain View, CA (US)

( * ) Notice: Subject to any disclaimer, the term of this patent is extended or adjusted under 35 U.S.C. 154(b) by 101 days.

(21) Appl. No.: 17/538,694

(22) Filed: Nov. 30, 2021

(65) Prior Publication Data
US 2022/0091937 A1   Mar. 24, 2022

Related U.S. Application Data

(63) Continuation-in-part of application No. 16/542,946, filed on Aug. 16, 2019, now Pat. No. 11,204,836,
(Continued)

(51) Int. Cl.
*G06F 11/10* (2006.01)
*G06F 3/06* (2006.01)
*G06F 11/14* (2006.01)

(52) U.S. Cl.
CPC ........ *G06F 11/1076* (2013.01); *G06F 3/0619* (2013.01); *G06F 3/064* (2013.01);
(Continued)

(58) Field of Classification Search
CPC .. G06F 11/10; G06F 2211/1028; G06F 3/067; G06F 3/0689
See application file for complete search history.

(56) References Cited

U.S. PATENT DOCUMENTS 4,092,732 A   5/1978   Ouchi
5,454,101 A   9/1995   Mackay
(Continued)

OTHER PUBLICATIONS

Chung; An Automatic Data Segmentation Method for 3D Measured Data Points; National Taiwan University; pp. 1-8; 1998.
(Continued)

*Primary Examiner* — Yolanda L Wilson
(74) *Attorney, Agent, or Firm* — Garlick & Markison; Timothy W. Markison; Kelly H. Hale

(57) ABSTRACT

A method begins by receiving data to be distributedly stored in a storage network and continues by determining a decode threshold value for storage of the data, wherein the data is to be distributedly stored in the storage network. The method continues by determining a preferred encoded data slice size for storage of the data, where the preferred encoded data slice size is based on a minimum performance level requirement and based on the preferred encoded data slice size and the decode threshold value the method continues by determining a preferred segment size for the data. The method then continues by determining a segmentation scheme for the data based on the preferred segment size for the data and segmenting the data into a plurality of data segments in accordance with the segmentation scheme. The method then continues by determining dispersed error encoding parameters for encoding each data segment and encoding each data segment to produce a set of error encoded data slices.

16 Claims, 54 Drawing Sheets

Related U.S. Application Data which is a continuation-in-part of application No. 15/398,163, filed on Jan. 4, 2017, now Pat. No. 10,387,250, which is a continuation of application No. 14/549,253, filed on Nov. 20, 2014, now Pat. No. 9,552,261.

(60) Provisional application No. 61/933,953, filed on Jan. 31, 2014.

(52) U.S. Cl.
CPC ............ *G06F 3/0644* (2013.01); *G06F 3/067* (2013.01); *G06F 11/10* (2013.01); *G06F 11/1088* (2013.01); *G06F 11/1092* (2013.01); *G06F 11/1464* (2013.01); *G06F 2211/1028* (2013.01)

(56) References Cited

U.S. PATENT DOCUMENTS

| | | | |
|---|---|---|---|
| 5,485,474 A | 1/1996 | Rabin | |
| 5,774,643 A | 6/1998 | Lubbers | |
| 5,802,364 A | 9/1998 | Senator | |
| 5,809,285 A | 9/1998 | Hilland | |
| 5,890,156 A | 3/1999 | Rekieta | |
| 5,987,622 A | 11/1999 | Lo Verso | |
| 5,991,414 A | 11/1999 | Garay | |
| 6,012,159 A | 1/2000 | Fischer | |
| 6,058,454 A | 5/2000 | Gerlach | |
| 6,128,277 A | 10/2000 | Bruck | |
| 6,175,571 B1 | 1/2001 | Haddock | |
| 6,192,472 B1 | 2/2001 | Garay | |
| 6,256,688 B1 | 7/2001 | Suetaka | |
| 6,272,658 B1 | 8/2001 | Steele | |
| 6,301,604 B1 | 10/2001 | Nojima | |
| 6,356,949 B1 | 3/2002 | Katsandres | |
| 6,366,995 B1 | 4/2002 | Nikolaevich | |
| 6,374,336 B1 | 4/2002 | Peters | |
| 6,415,373 B1 | 7/2002 | Peters | |
| 6,418,539 B1 | 7/2002 | Walker | |
| 6,449,688 B1 | 9/2002 | Peters | |
| 6,567,948 B2 | 5/2003 | Steele | |
| 6,571,282 B1 | 5/2003 | Bowman-Amuah | |
| 6,609,223 B1 | 8/2003 | Wolfgang | |
| 6,718,361 B1 | 4/2004 | Basani | |
| 6,760,808 B2 | 7/2004 | Peters | |
| 6,785,768 B2 | 8/2004 | Peters | |
| 6,785,783 B2 | 8/2004 | Buckland | |
| 6,826,711 B2 | 11/2004 | Moulton | |
| 6,879,596 B1 | 4/2005 | Dooply | |
| 7,003,688 B1 | 2/2006 | Pittelkow | |
| 7,024,451 B2 | 4/2006 | Jorgenson | |
| 7,024,609 B2 | 4/2006 | Wolfgang | |
| 7,080,101 B1 | 7/2006 | Watson | |
| 7,103,824 B2 | 9/2006 | Halford | |
| 7,103,915 B2 | 9/2006 | Redlich | |
| 7,111,115 B2 | 9/2006 | Peters | |
| 7,140,044 B2 | 11/2006 | Redlich | |
| 7,146,644 B2 | 12/2006 | Redlich | |
| 7,171,493 B2 | 1/2007 | Shu | |
| 7,222,133 B1 | 5/2007 | Raipurkar | |
| 7,240,236 B2 | 7/2007 | Cutts | |
| 7,272,613 B2 | 9/2007 | Sim | |
| 7,636,724 B2 | 12/2009 | de la Torre | |
| 8,868,797 B1 | 10/2014 | Kirac | |
| 2002/0062422 A1 | 5/2002 | Butterworth | |
| 2002/0166079 A1 | 11/2002 | Ulrich | |
| 2003/0018927 A1 | 1/2003 | Gadir | |
| 2003/0037261 A1 | 2/2003 | Meffert | |
| 2003/0065617 A1 | 4/2003 | Watkins | |
| 2003/0084020 A1 | 5/2003 | Shu | |
| 2004/0024963 A1* | 2/2004 | Talagala | G06F 11/1076 714/E11.034 |
| 2004/0122917 A1 | 6/2004 | Menon | |
| 2004/0215998 A1 | 10/2004 | Buxton | |
| 2004/0228493 A1 | 11/2004 | Ma | |
| 2005/0100022 A1 | 5/2005 | Ramprashad | |
| 2005/0114594 A1 | 5/2005 | Corbett | |
| 2005/0125593 A1 | 6/2005 | Karpoff | |
| 2005/0131993 A1 | 6/2005 | Fatula | |
| 2005/0132070 A1 | 6/2005 | Redlich | |
| 2005/0144382 A1 | 6/2005 | Schmisseur | |
| 2005/0229069 A1 | 10/2005 | Hassner | |
| 2006/0047907 A1 | 3/2006 | Shiga | |
| 2006/0136448 A1 | 6/2006 | Cialini | |
| 2006/0156059 A1 | 7/2006 | Kitamura | |
| 2006/0224603 A1 | 10/2006 | Correll | |
| 2007/0079081 A1 | 4/2007 | Gladwin | |
| 2007/0079082 A1 | 4/2007 | Gladwin | |
| 2007/0079083 A1 | 4/2007 | Gladwin | |
| 2007/0088970 A1 | 4/2007 | Buxton | |
| 2007/0174192 A1 | 7/2007 | Gladwin | |
| 2007/0214285 A1 | 9/2007 | Au | |
| 2007/0234110 A1 | 10/2007 | Soran | |
| 2007/0283167 A1 | 12/2007 | Venters | |
| 2009/0094251 A1 | 4/2009 | Gladwin | |
| 2009/0094318 A1 | 4/2009 | Gladwin | |
| 2009/0259882 A1* | 10/2009 | Shellhamer | G06F 11/1076 714/E11.085 |
| 2010/0023524 A1 | 1/2010 | Gladwin | |
| 2011/0029711 A1 | 2/2011 | Dhuse | |
| 2011/0083061 A1* | 4/2011 | Grube | G06F 21/6272 714/776 |
| 2011/0107165 A1* | 5/2011 | Resch | G06F 11/1076 714/E11.023 |
| 2011/0286594 A1 | 11/2011 | Resch | |
| 2012/0166868 A1* | 6/2012 | Volvovski | G06F 3/0604 711/170 |
| 2013/0238932 A1 | 9/2013 | Resch | |
| 2013/0262959 A1* | 10/2013 | Resch | G06F 16/278 714/766 |
| 2013/0304746 A1* | 11/2013 | Dhuse | G06F 11/1096 707/743 |
| 2014/0298135 A1 | 10/2014 | Dhuse | |
| 2015/0006594 A1* | 1/2015 | Volvovski | G06F 16/182 707/827 |
| 2015/0006952 A1 | 1/2015 | Trichardt | |
| 2015/0067295 A1* | 3/2015 | Storm | G06F 16/2365 711/171 |
| 2015/0074463 A1 | 3/2015 | Jacoby | |
| 2015/0156204 A1 | 6/2015 | Resch | |
| 2015/0172386 A1 | 6/2015 | Palthepu | |
| 2015/0355980 A1 | 12/2015 | Volvovski | |
| 2016/0070719 A1 | 3/2016 | Resch | |
| 2016/0277502 A1* | 9/2016 | Resch | H04L 67/1097 |
| 2018/0067801 A1 | 3/2018 | Yun | |
| 2019/0155701 A1 | 5/2019 | Motwani | |

OTHER PUBLICATIONS

Harrison; Lightweight Directory Access Protocol (LDAP): Authentication Methods and Security Mechanisms; IETF Network Working Group; RFC 4513; Jun. 2006; pp. 1-32.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

Legg; Lightweight Directory Access Protocol (LDAP): Syntaxes and Matching Rules; IETF Network Working Group; RFC 4517; Jun. 2006; pp. 1-50.

Plank, T1: Erasure Codes for Storage Applications; FAST2005, 4th Usenix Conference on File Storage Technologies; Dec. 13-16, 2005; pp. 1-74.

Rabin; Efficient Dispersal of Information for Security, Load Balancing, and Fault Tolerance; Journal of the Association for Computer Machinery; vol. 36, No. 2; Apr. 1989; pp. 335-348.

Satran, et al.; Internet Small Computer Systems Interface (iSCSI); IETF Network Working Group; RFC 3720; Apr. 2004; pp. 1-257.

Sciberras; Lightweight Directory Access Protocol (LDAP): Schema for User Applications; IETF Network Working Group; RFC 4519; Jun. 2006; pp. 1-33.

(56) References Cited

OTHER PUBLICATIONS

Sermersheim; Lightweight Directory Access Protocol (LDAP): The Protocol; IETF Network Working Group; RFC 4511; Jun. 2006; pp. 1-68.
Shamir; How to Share a Secret; Communications of the ACM; vol. 22, No. 11; Nov. 1979; pp. 612-613.
Smith; Lightweight Directory Access Protocol (LDAP): Uniform Resource Locator; IETF Network Working Group; RFC 4516; Jun. 2006; pp. 1-15.
Smith; Lightweight Directory Access Protocol (LDAP): String Representation of Search Filters; IETF Network Working Group; RFC 4515; Jun. 2006; pp. 1-12.
Wildi; Java iSCSi Initiator; Master Thesis; Department of Computer and Information Science, University of Konstanz; Feb. 2007; 60 pgs.
Xin, et al.; Evaluation of Distributed Recovery in Large-Scale Storage Systems; 13th IEEE International Symposium on High Performance Distributed Computing; Jun. 2004; pp. 172-181.
Zeilenga; Lightweight Directory Access Protocol (LDAP): Directory Information Models; IETF Network Working Group; RFC 4512; Jun. 2006; pp. 1-49.
Zeilenga; Lightweight Directory Access Protocol (LDAP): Internationalized String Preparation; IETF Network Working Group; RFC 4518; Jun. 2006; pp. 1-14.
Zeilenga; Lightweight Directory Access Protocol (LDAP): String Representation of Distinguished Names; IETF Network Working Group; RFC 4514; Jun. 2006; pp. 1-15.
Zeilenga; Lightweight Directory Access Protocol (LDAP): Technical Specification Road Map; IETF Network Working Group; RFC 4510; Jun. 2006; pp. 1-8.

\* cited by examiner

FIG. 32

DST allocation info 242: data partition info 320; data ID; No. of partitions; Addr. info for each partition; format conversion indication

| task 326 | task ordering 328 | task execution info 322 | | | intermediate result info 324 | | | |
|---|---|---|---|---|---|---|---|---|
| | | data partition 330 | set of DT EX mods 332 | Name 334 | interm. result processing 336 | scratch pad storage 338 | intermediate result storage 340 |
| 1_1 | none | 2_1 - 2_z | 1_1, 2_1, 3_1, 4_1, & 5_1 | R1-1 | DST unit 1 | DST unit 1 | DST units 1-5 |
| 1_2 | none | 2_1 - 2_4 | 1_1, 2_1, 3_1, 4_1, & 5_1 | R1-2 | DST unit 1 | DST unit 1 | DST units 1-5 |
| 1_3 | none | 2_1 - 2_4<br>2_5 - 2_z | 1_1, 2_1, 3_1, 4_1, & 5_1<br>1_2, 2_2, 3_2, 4_2, & 5_2 | R1-3 | DST unit 2 | DST unit 2 | DST units 2-6 |
| 1_4 | after 1_3 | R1-3_1 - R1-3_4<br>R1-3_5 - R1-3_z | 1_1, 2_1, 3_1, 4_1, & 5_1<br>1_2, 2_2, 6_1, 7_1, & 7_2 | R1_4 | DST unit 3 | DST unit 3 | DST units 3-7 |
| 1_5 | after 1_4 | R1-4_1 - R1-4_z &<br>2_1 - 2_z | 1_1, 2_1, 3_1, 4_1, & 5_1 | R1-5 | DST unit 1 | DST unit 1 | DST units 1-5 |
| 1_6 | after 1_1 & 1_5 | R1-1_1 - R1-1_z &<br>R1-5_1 - R1-5_z | 1_1, 2_1, 3_1, 4_1, & 5_1 | R1-6 | DST unit 2 | DST unit 2 | DST units 2-6 |
| 1_7 | after 1_2 & 1_5 | R1-2_1 - R1-2_z &<br>R1-5_1 - R1-5_z | 1_2, 2_2, 3_2, 4_2, & 5_2 | R1-7 | DST unit 3 | DST unit 3 | DST units 3-7 |
| 2 | none | 2_1 - 2_z | 3_1, 4_1, 5_1, 6_1, & 7_1 | R2 | DST unit 7 | DST unit 7 | DST units 7, 1-4 |
| 3_1 | none (same as 1_3) | use R1_3 | | R1-1 | | | |
| 3_2 | after 3_1 | R1-3_1 - R1-3_z | 1_2, 2_2, 3_2, 4_2, & 5_2 | R3-2 | DST unit 5 | DST unit 5 | DST units 5,6, 1-3 |

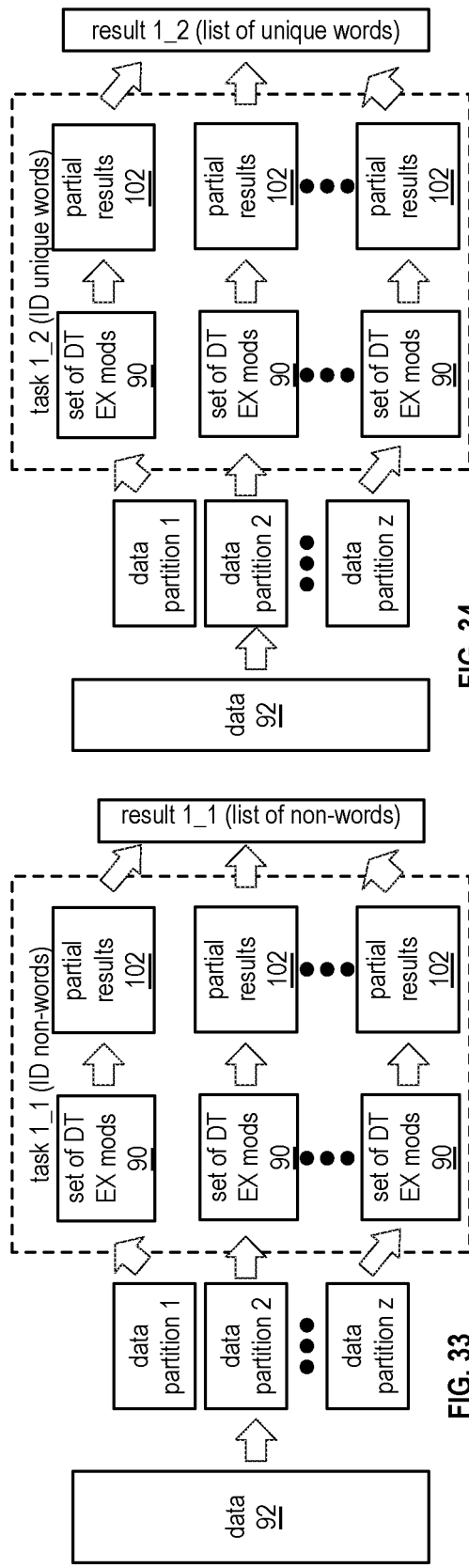
FIG. 33
FIG. 34
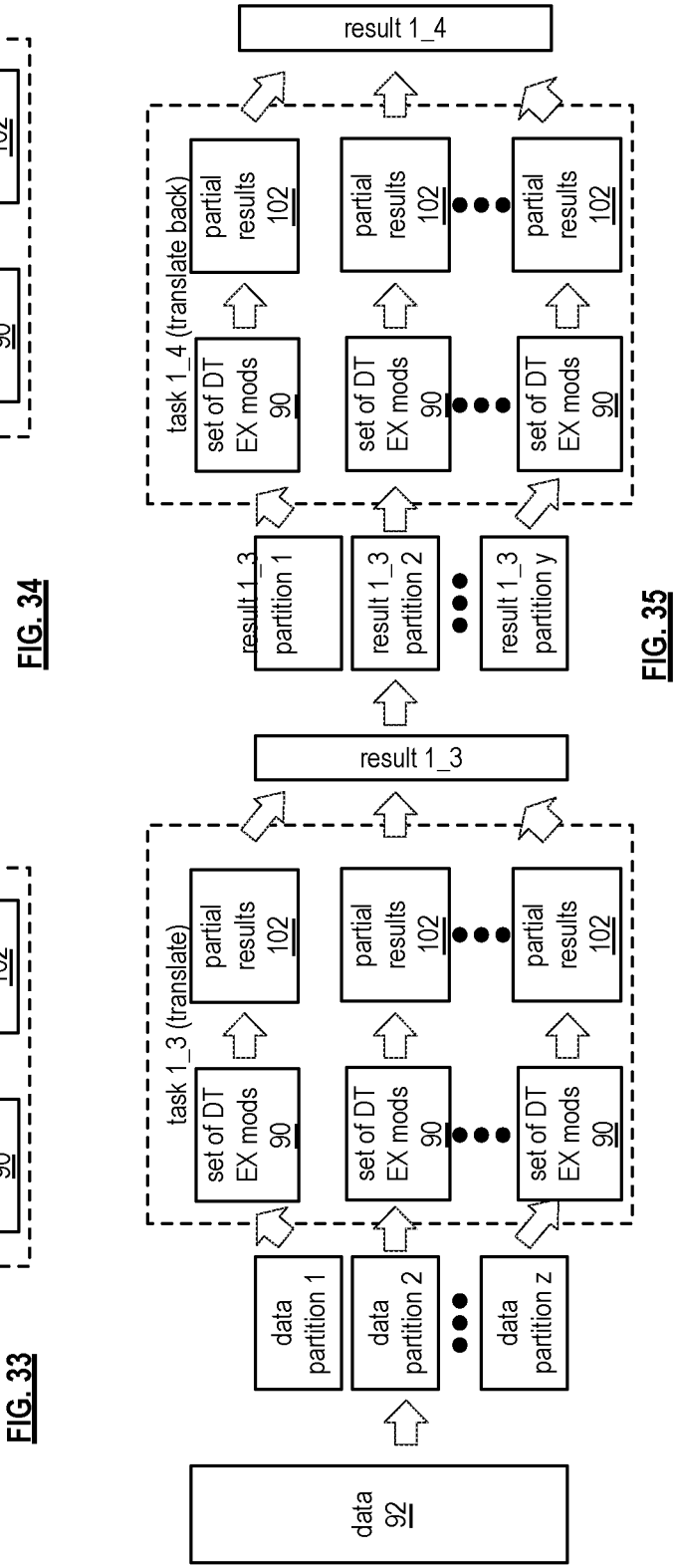
FIG. 35

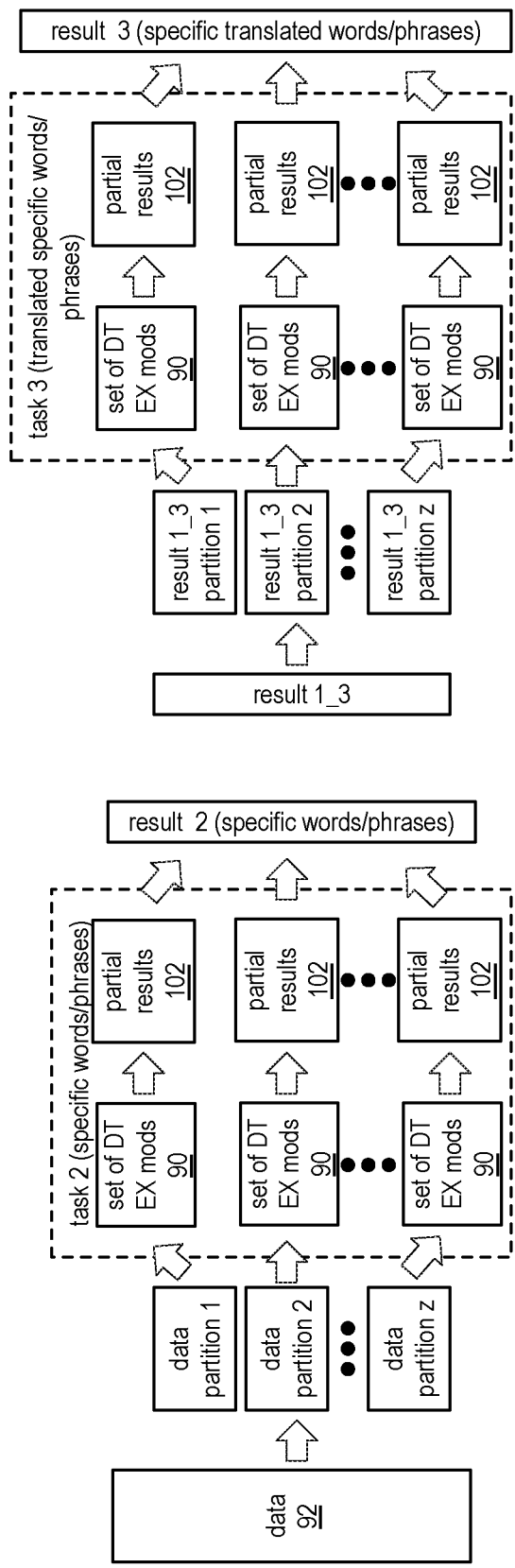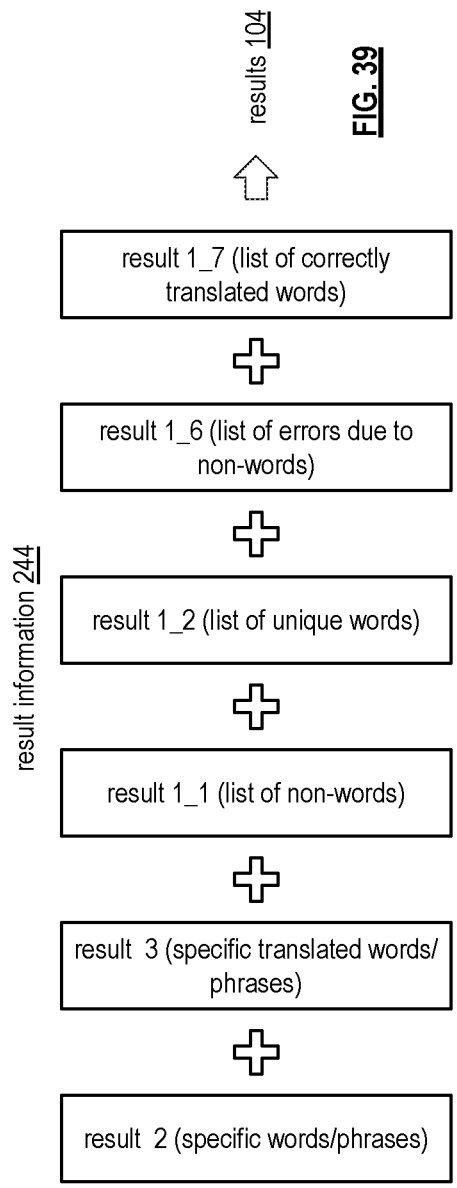

DETERMINING SEGMENTATION SIZE IN A DISTRIBUTED STORAGE NETWORK

CROSS REFERENCE TO RELATED PATENTS

The present U.S. Utility patent application claims priority pursuant to 35 U.S.C. § 120 as a continuation-in-part of U.S. Utility application Ser. No. 16/542,946, entitled "Using Trap Slices For Anomaly Detection In A Distributed Storage Network", filed Aug. 16, 2019, which is a continuation-in-part of U.S. Utility application Ser. No. 15/398,163, entitled "Recovering Data From Microslices In A Dispersed Storage Network", filed Jan. 4, 2017, now U.S. Pat. No. 10,387,250 on Aug. 20, 2019, which is a continuation of U.S. Utility application Ser. No. 14/549,253, entitled "Recovering Data From Microslices In A Dispersed Storage Network", filed Nov. 20, 2014, now U.S. Pat. No. 9,552,261 issued on Jan. 24, 2017, which claims priority pursuant to 35 U.S.C. § 119(e) to U.S. Provisional Application No. 61/933,953, entitled "Identifying Slice Errors Associated With A Dispersed Storage Network", filed Jan. 31, 2014, all of which are hereby incorporated herein by reference in their entirety and made part of the present U.S. Utility patent application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to computer networks and more particularly to dispersed storage of data and distributed task processing of data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc., on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 32 is a diagram of an example of DST allocation information for the example of FIG. 30 in accordance with the present invention;

FIGS. 33-38 are schematic block diagrams of the DSTN module performing the example of FIG. 30 in accordance with the present invention;

FIG. 39 is a diagram of an example of combining result information into final results for the example of FIG. 30 in accordance with the present invention;

Figure 43A:
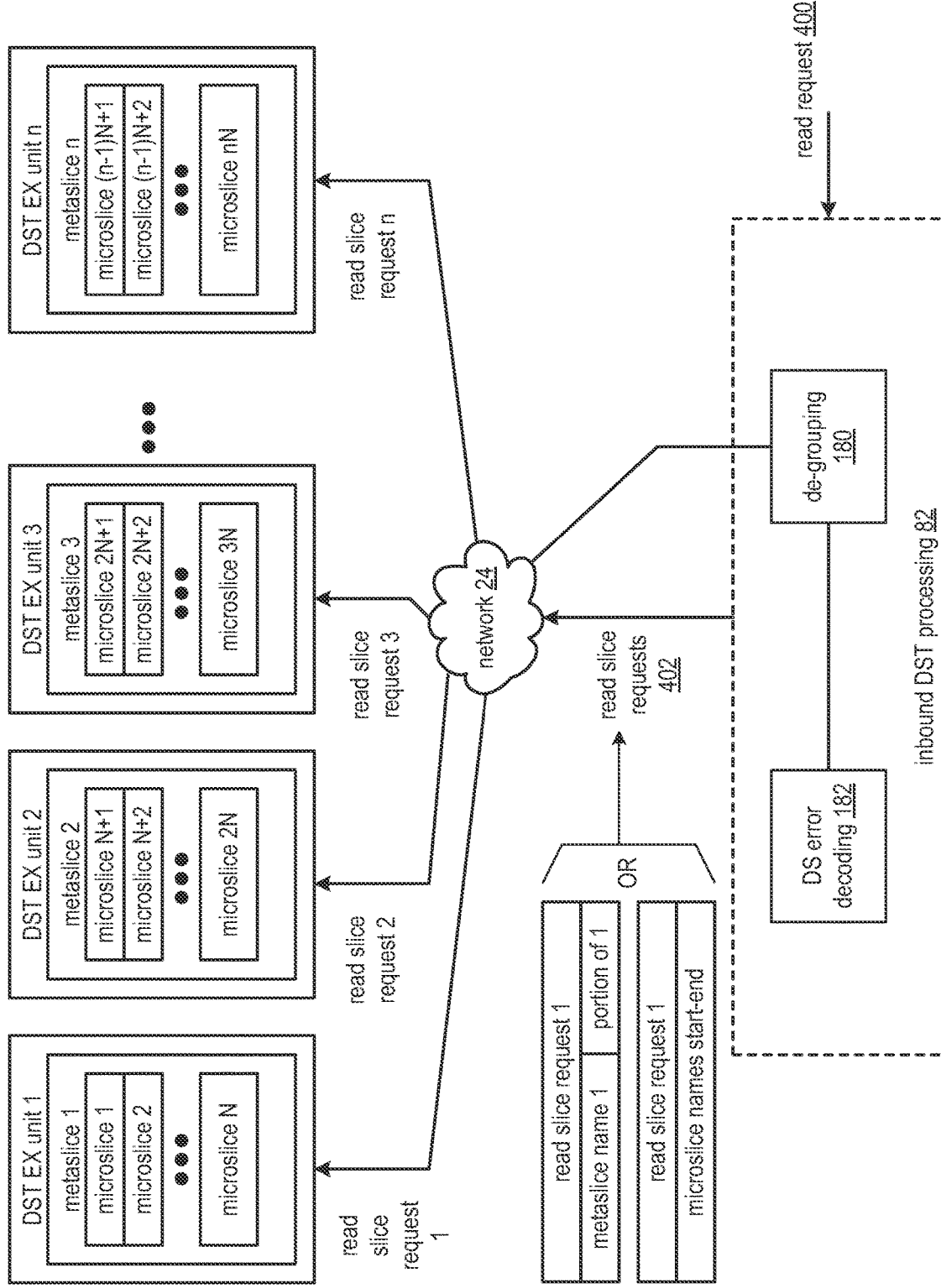
Figure 43B:
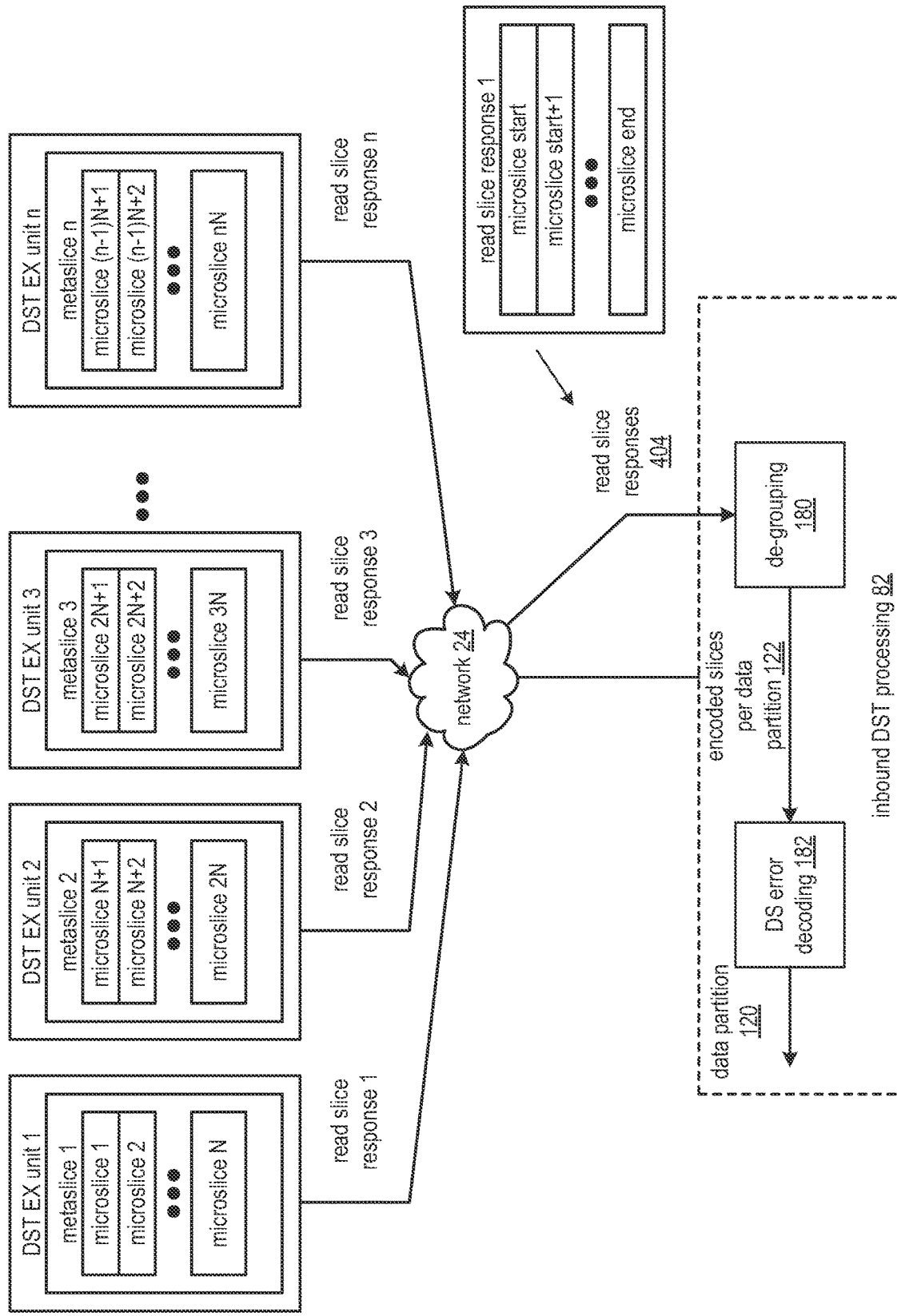
Figure 43C:
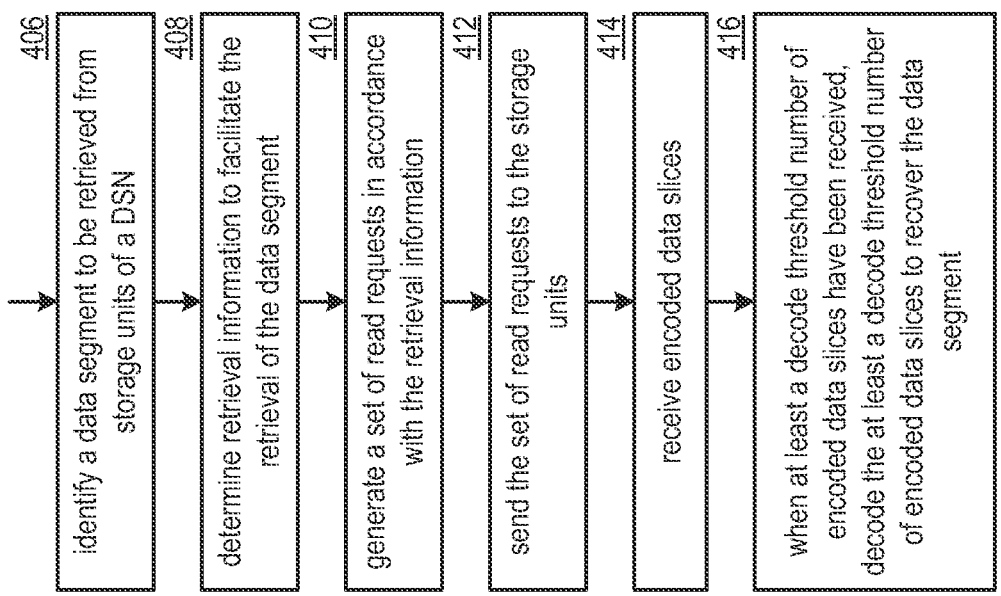
Figure 44A:
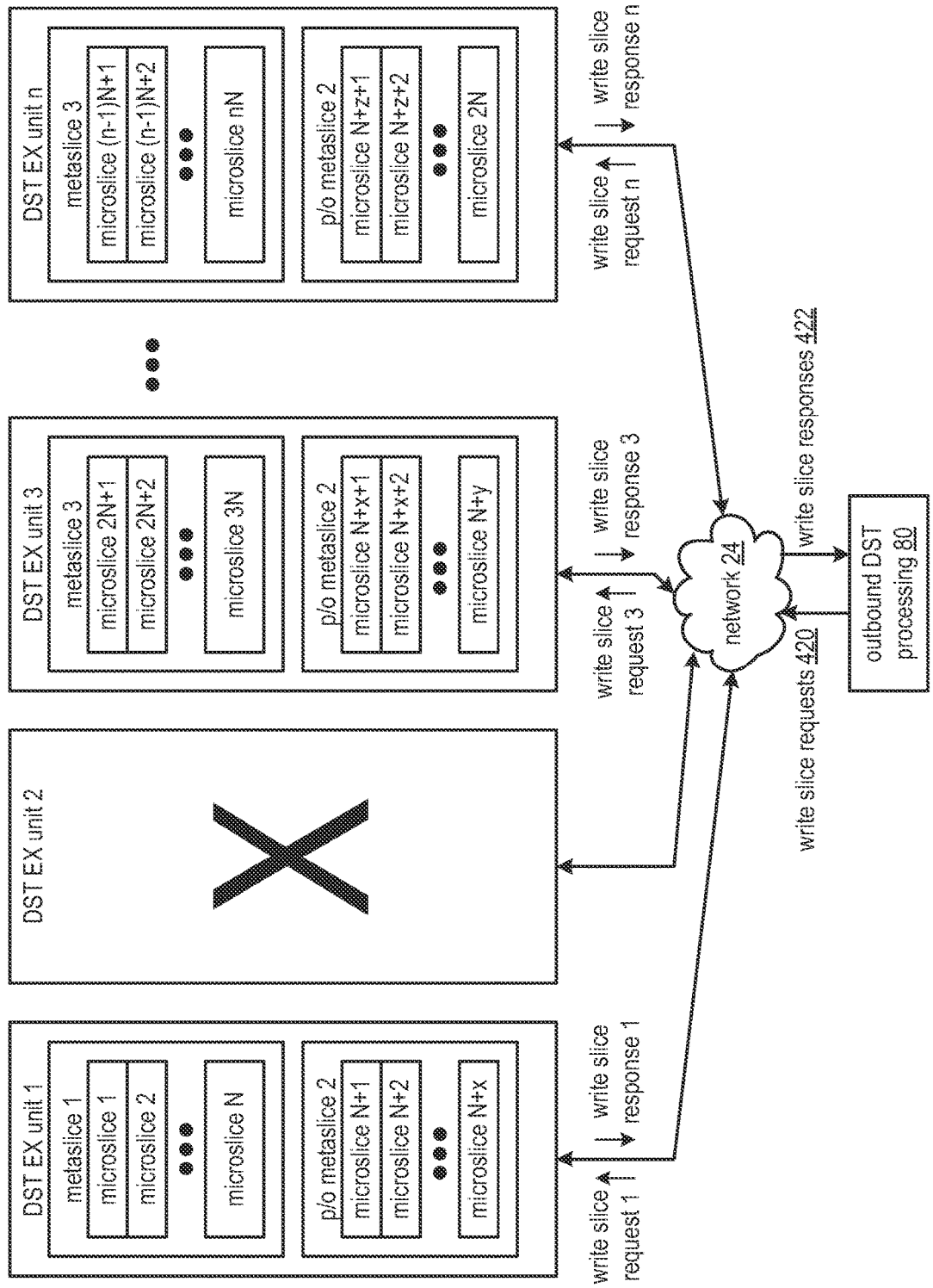
Figure 44B:
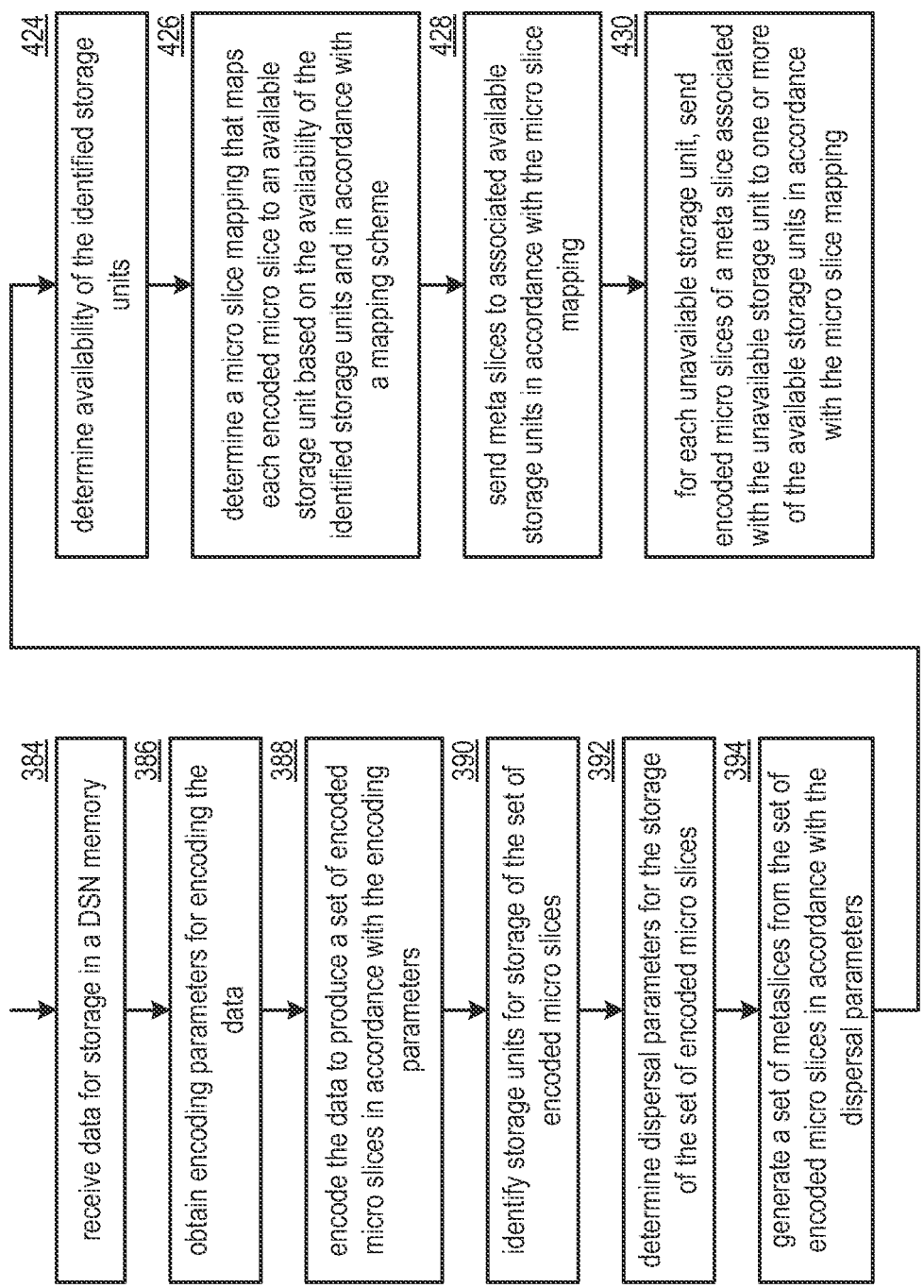
Figure 45A:
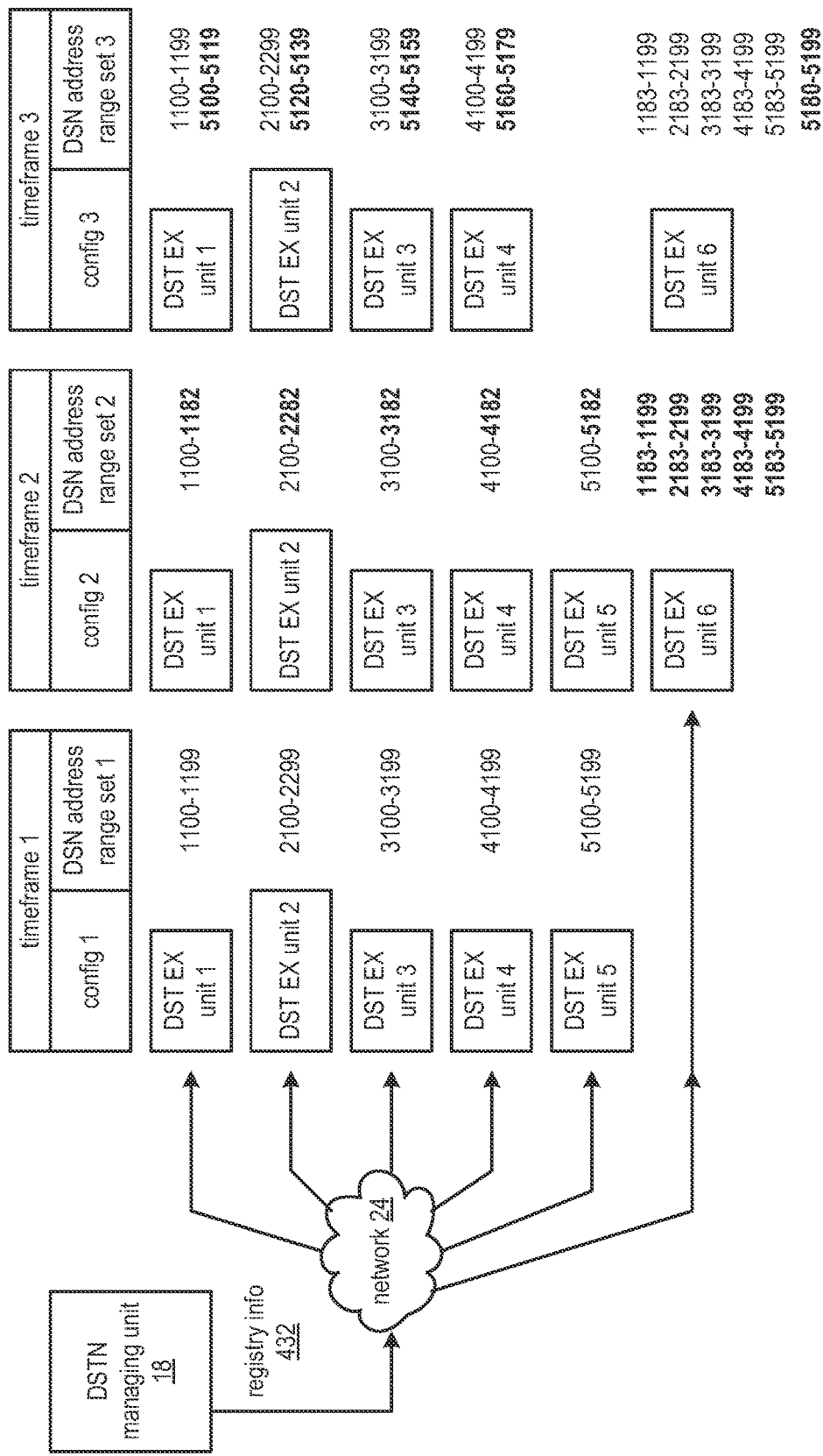
Figure 45B:
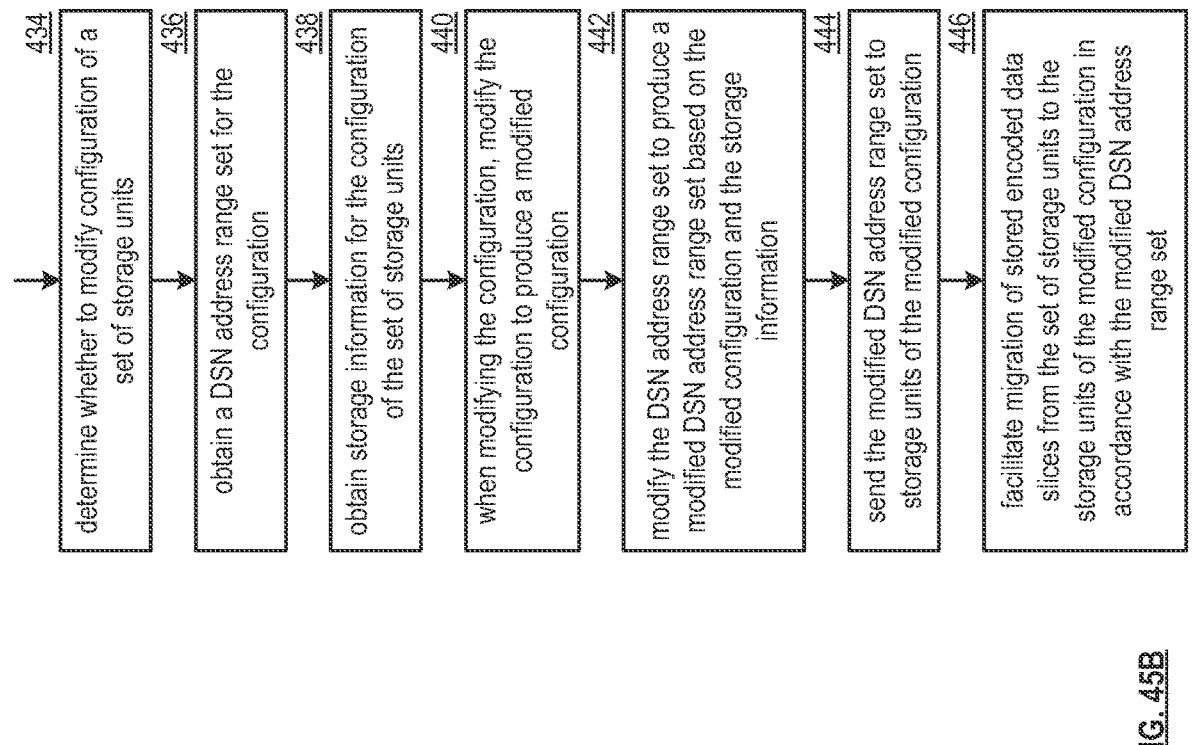
Figure 46A:
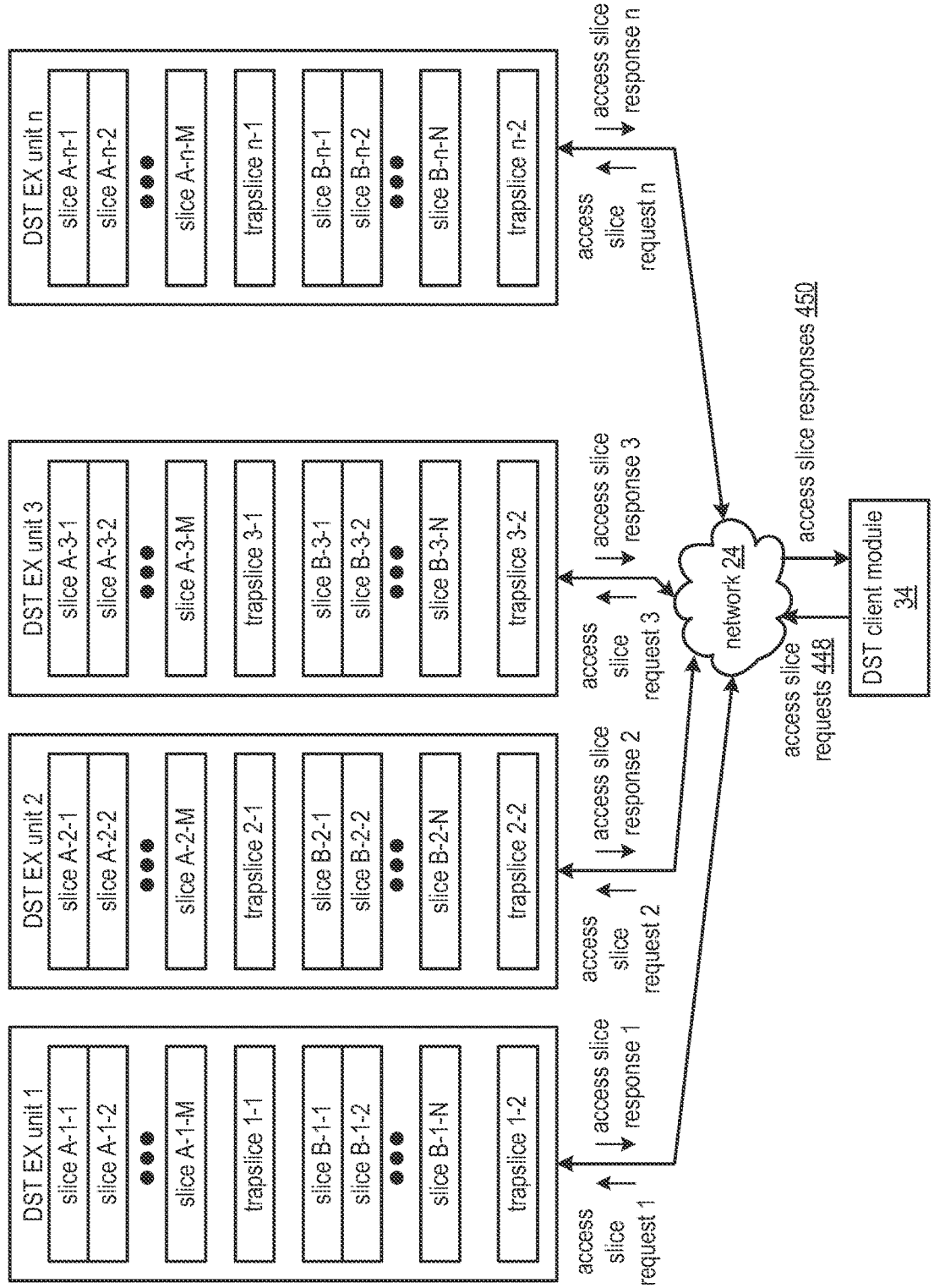
Figure 46B:
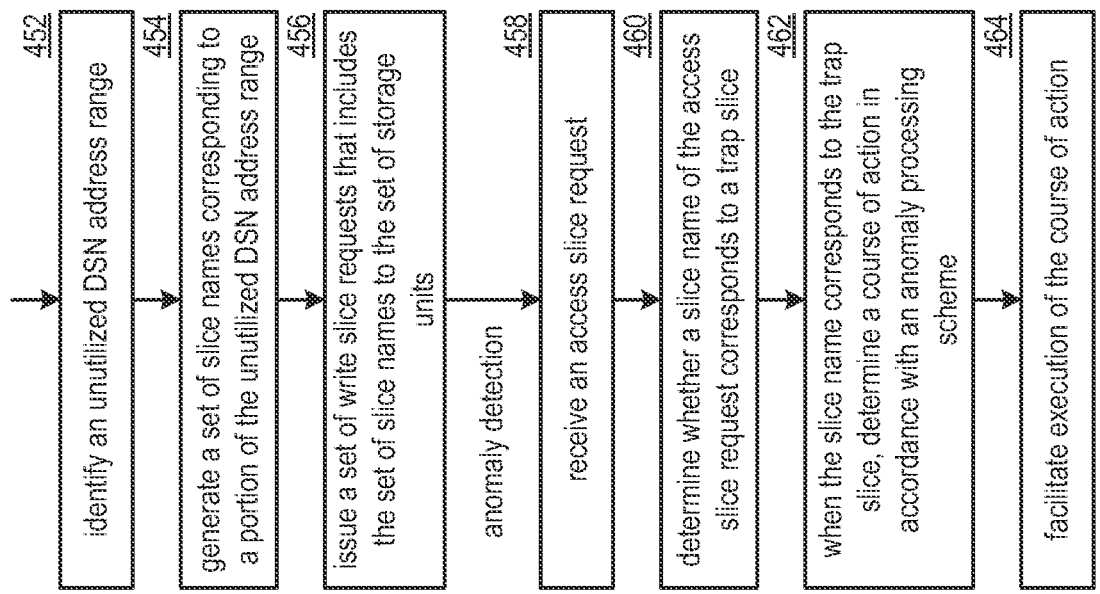
Figure 47A:
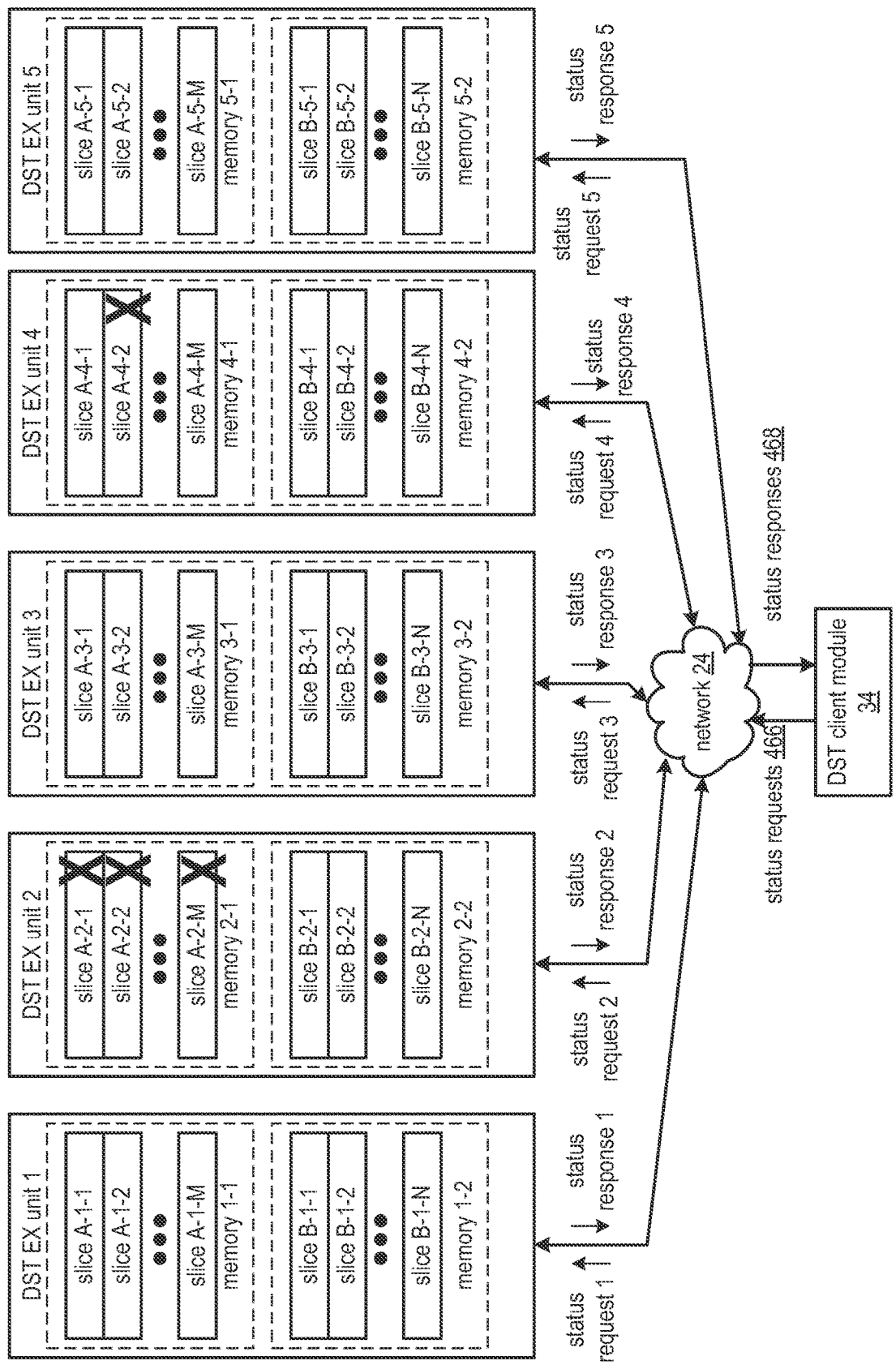
Figure 47B:
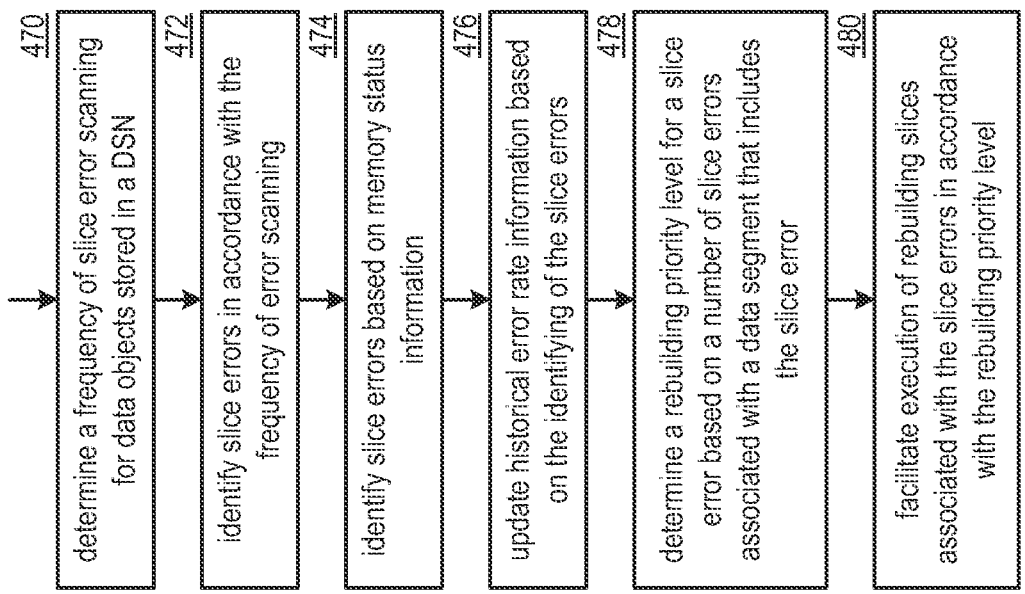
Figure 48A:
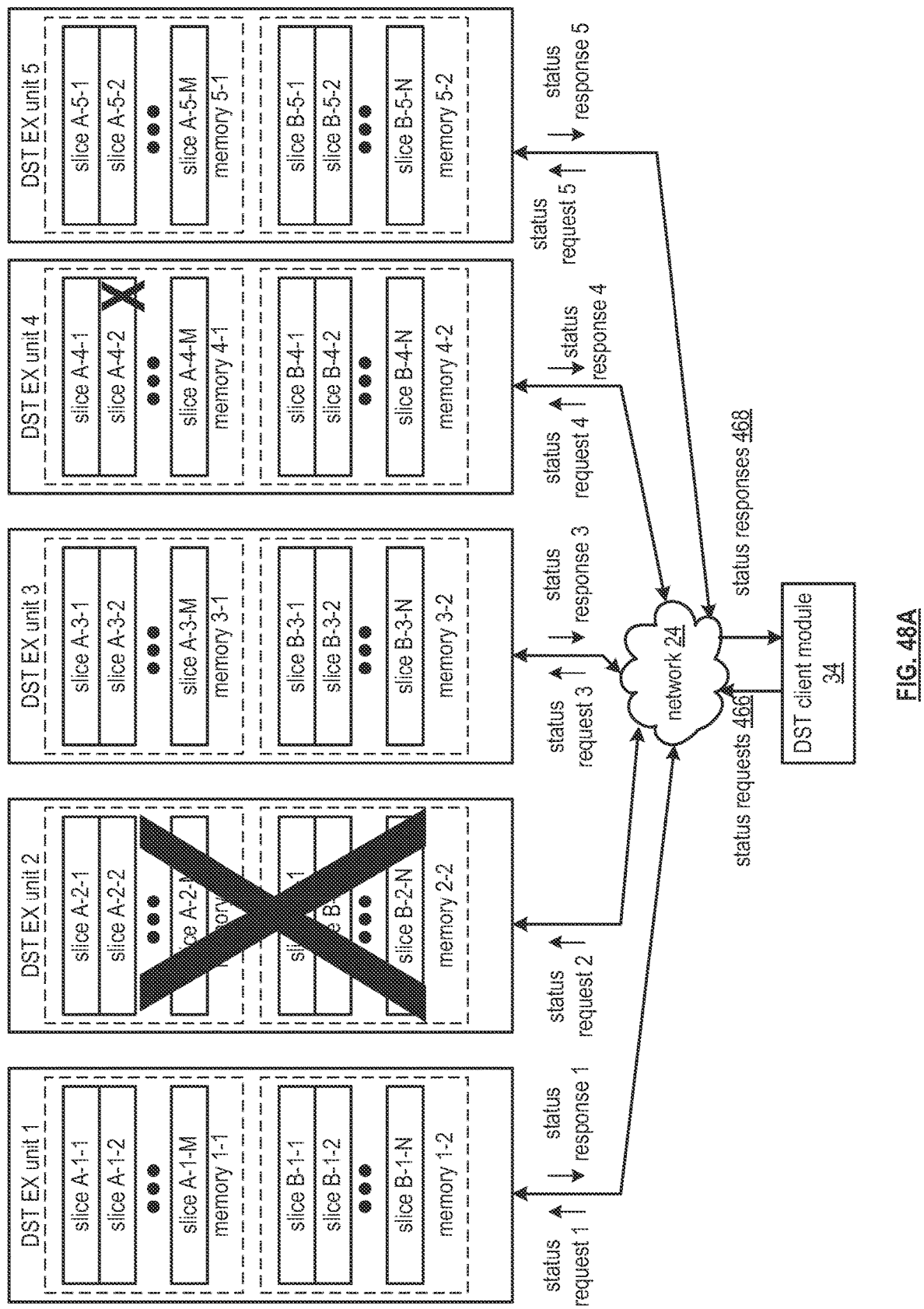
Figure 48B:
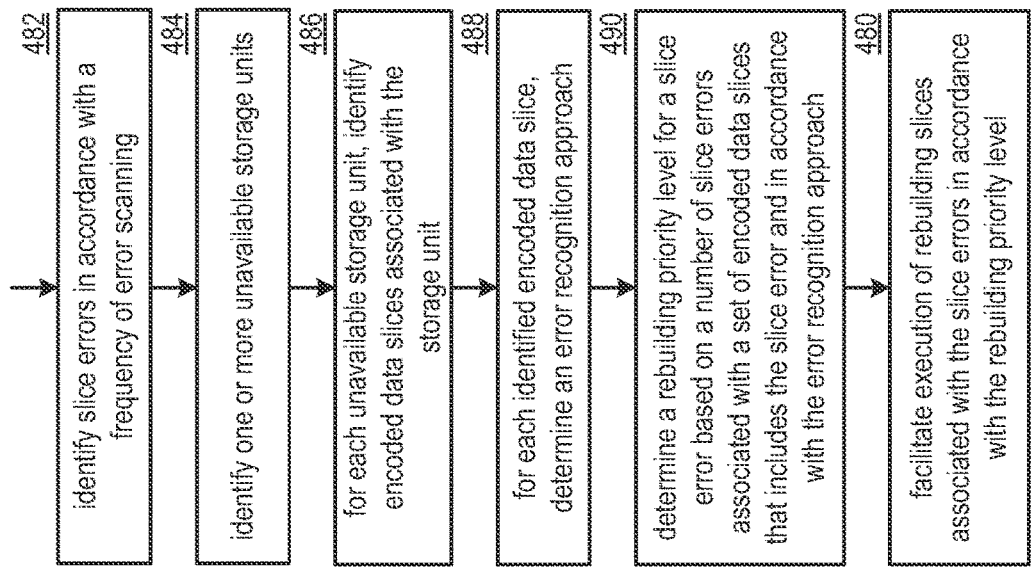

FIGS. 43A-B are schematic block diagrams of a dispersed storage network (DSN) in accordance with the present invention;

FIG. 43C is a flowchart illustrating an example of recovering data in accordance with the present invention;

FIG. 44A is a schematic block diagram of a dispersed storage network (DSN) in accordance with the present invention;

FIG. 44B is a flowchart illustrating another example of storing data in accordance with the present invention;

FIG. 45A is a schematic block diagram of a dispersed storage network (DSN) in accordance with the present invention;

FIG. 45B is a flowchart illustrating an example of reconfiguring a set of storage units in accordance with the present invention;

FIG. 46A is a schematic block diagram of a dispersed storage network (DSN) in accordance with the present invention;

FIG. 46B is a flowchart illustrating an example of detecting an anomaly in a dispersed storage network (DSN) in accordance with the present invention;

FIG. 47A is a schematic block diagram of a dispersed storage network (DSN) in accordance with the present invention;

FIG. 47B is a flowchart illustrating an example of detecting slice errors in accordance with the present invention;

FIG. 48A is a schematic block diagram of a dispersed storage network (DSN) in accordance with the present invention; and FIG. 48B is a flowchart illustrating another example of detecting slice errors in accordance with the present invention.

DETAILED DESCRIPTION OF THE INVENTION

Figure 1:
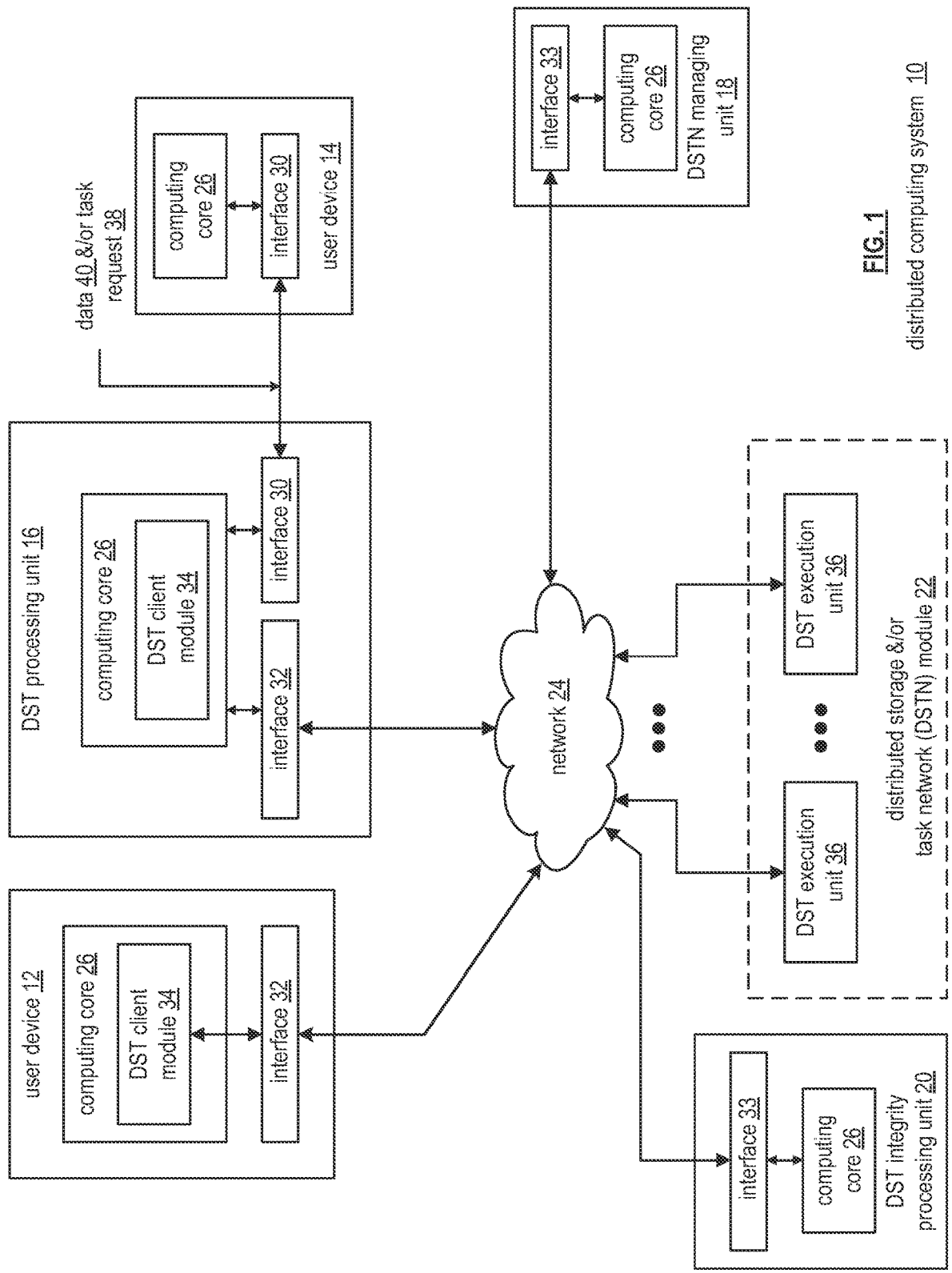
FIG. 1 is a schematic block diagram of an embodiment of a distributed computing system in accordance with the present invention.

FIG. 1 is a schematic block diagram of an embodiment of a distributed computing system 10 that includes a user device 12 and/or a user device 14, a distributed storage and/or task (DST) processing unit 16, a distributed storage and/or task network (DSTN) managing unit 18, a DST integrity processing unit 20, and a distributed storage and/or task network (DSTN) module 22. The components of the distributed computing system 10 are coupled via a network 24, which may include one or more wireless and/or wire lined communication systems; one or more private intranet systems and/or public internet systems; and/or one or more local area networks (LAN) and/or wide area networks (WAN).

The DSTN module 22 includes a plurality of distributed storage and/or task (DST) execution units 36 that may be located at geographically different sites (e.g., one in Chicago, one in Milwaukee, etc.). Each of the DST execution units is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc.

Each of the user devices 12-14, the DST processing unit 16, the DSTN managing unit 18, and the DST integrity processing unit 20 include a computing core 26 and may be a portable computing device and/or a fixed computing device. A portable computing device may be a social networking device, a gaming device, a cell phone, a smart phone, a personal digital assistant, a digital music player, a digital video player, a laptop computer, a handheld computer, a tablet, a video game controller, and/or any other portable device that includes a computing core. A fixed computing device may be a personal computer (PC), a computer server, a cable set-top box, a satellite receiver, a television set, a printer, a fax machine, home entertainment equipment, a video game console, and/or any type of home or office computing equipment. User device 12 and DST processing unit 16 are configured to include a DST client module 34.

With respect to interfaces, each interface 30, 32, and 33 includes software and/or hardware to support one or more communication links via the network 24 indirectly and/or directly. For example, interface 30 supports a communication link (e.g., wired, wireless, direct, via a LAN, via the network 24, etc.) between user device 14 and the DST processing unit 16. As another example, interface 32 supports communication links (e.g., a wired connection, a wireless connection, a LAN connection, and/or any other type of connection to/from the network 24) between user device 12 and the DSTN module 22 and between the DST processing unit 16 and the DSTN module 22. As yet another example, interface 33 supports a communication link for each of the DSTN managing unit 18 and DST integrity processing unit 20 to the network 24.

The distributed computing system 10 is operable to support dispersed storage (DS) error encoded data storage and retrieval, to support distributed task processing on received data, and/or to support distributed task processing on stored data. In general, and with respect to DS error encoded data storage and retrieval, the distributed computing system 10 supports three primary operations: storage management, data storage and retrieval (an example of which will be discussed with reference to FIGS. 20-26), and data storage integrity verification. In accordance with these three primary functions, data can be encoded, distributedly stored in physically different locations, and subsequently retrieved in a reliable and secure manner. Such a system is tolerant of a significant number of failures (e.g., up to a failure level, which may be greater than or equal to a pillar width minus a decode threshold minus one) that may result from individual storage device failures and/or network equipment failures without loss of data and without the need for a redundant or backup copy. Further, the system allows the data to be stored for an indefinite period of time without data loss and does so in a secure manner (e.g., the system is very resistant to attempts at hacking the data).

The second primary function (i.e., distributed data storage and retrieval) begins and ends with a user device 12-14. For instance, if a second type of user device 14 has data 40 to store in the DSTN module 22, it sends the data 40 to the DST processing unit 16 via its interface 30. The interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data 40.

To support storage management, the DSTN managing unit 18 performs DS management services. One such DS management service includes the DSTN managing unit 18 establishing distributed data storage parameters (e.g., vault creation, distributed storage parameters, security parameters, billing information, user profile information, etc.) for a user device 12-14 individually or as part of a group of user devices. For example, the DSTN managing unit 18 coordinates creation of a vault (e.g., a virtual memory block) within memory of the DSTN module 22 for a user device, a group of devices, or for public access and establishes per vault dispersed storage (DS) error encoding parameters for a vault. The DSTN managing unit 18 may facilitate storage of DS error encoding parameters for each vault of a plurality of vaults by updating registry information for the distributed computing system 10. The facilitating includes storing updated registry information in one or more of the DSTN module 22, the user device 12, the DST processing unit 16, and the DST integrity processing unit 20.

The DS error encoding parameters (e.g., or dispersed storage error coding parameters) include data segmenting information (e.g., how many segments data (e.g., a file, a group of files, a data block, etc.) is divided into), segment security information (e.g., per segment encryption, compression, integrity checksum, etc.), error coding information (e.g., pillar width, decode threshold, read threshold, write threshold, etc.), slicing information (e.g., the number of encoded data slices that will be created for each data segment); and slice security information (e.g., per encoded data slice encryption, compression, integrity checksum, etc.).

The DSTN managing unit 18 creates and stores user profile information (e.g., an access control list (ACL)) in local memory and/or within memory of the DSTN module 22. The user profile information includes authentication information, permissions, and/or the security parameters. The security parameters may include encryption/decryption scheme, one or more encryption keys, key generation scheme, and/or data encoding/decoding scheme.

The DSTN managing unit 18 creates billing information for a particular user, a user group, a vault access, public vault access, etc. For instance, the DSTN managing unit 18 tracks the number of times a user accesses a private vault and/or public vaults, which can be used to generate a per-access billing information. In another instance, the DSTN managing unit 18 tracks the amount of data stored and/or retrieved by a user device and/or a user group, which can be used to generate a per-data-amount billing information.

Another DS management service includes the DSTN managing unit 18 performing network operations, network administration, and/or network maintenance. Network operations includes authenticating user data allocation requests (e.g., read and/or write requests), managing creation of vaults, establishing authentication credentials for user devices, adding/deleting components (e.g., user devices, DST execution units, and/or DST processing units) from the distributed computing system 10, and/or establishing authentication credentials for DST execution units 36. Network administration includes monitoring devices and/or units for failures, maintaining vault information, determining device and/or unit activation status, determining device and/or unit loading, and/or determining any other system level operation that affects the performance level of the system 10. Network maintenance includes facilitating replacing, upgrading, repairing, and/or expanding a device and/or unit of the system 10.

To support data storage integrity verification within the distributed computing system 10, the DST integrity processing unit 20 performs rebuilding of 'bad' or missing encoded data slices. At a high level, the DST integrity processing unit 20 performs rebuilding by periodically attempting to retrieve/list encoded data slices, and/or slice names of the encoded data slices, from the DSTN module 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in memory of the DSTN module 22. Note that the DST integrity processing unit 20 may be a separate unit as shown, it may be included in the DSTN module 22, it may be included in the DST processing unit 16, and/or distributed among the DST execution units 36.

To support distributed task processing on received data, the distributed computing system 10 has two primary operations: DST (distributed storage and/or task processing) management and DST execution on received data (an example of which will be discussed with reference to FIGS. 3-19). With respect to the storage portion of the DST management, the DSTN managing unit 18 functions as previously described. With respect to the tasking processing of the DST management, the DSTN managing unit 18 performs distributed task processing (DTP) management services. One such DTP management service includes the DSTN managing unit 18 establishing DTP parameters (e.g., user-vault affiliation information, billing information, user-task information, etc.) for a user device 12-14 individually or as part of a group of user devices.

Another DTP management service includes the DSTN managing unit 18 performing DTP network operations, network administration (which is essentially the same as described above), and/or network maintenance (which is essentially the same as described above). Network operations include, but are not limited to, authenticating user task processing requests (e.g., valid request, valid user, etc.), authenticating results and/or partial results, establishing DTP authentication credentials for user devices, adding/deleting components (e.g., user devices, DST execution units, and/or DST processing units) from the distributed computing system, and/or establishing DTP authentication credentials for DST execution units.

To support distributed task processing on stored data, the distributed computing system 10 has two primary operations: DST (distributed storage and/or task) management and DST execution on stored data. With respect to the DST execution on stored data, if the second type of user device 14 has a task request 38 for execution by the DSTN module 22, it sends the task request 38 to the DST processing unit 16 via its interface 30. An example of DST execution on stored data will be discussed in greater detail with reference to FIGS. 27-39. With respect to the DST management, it is substantially similar to the DST management to support distributed task processing on received data.

Figure 2:
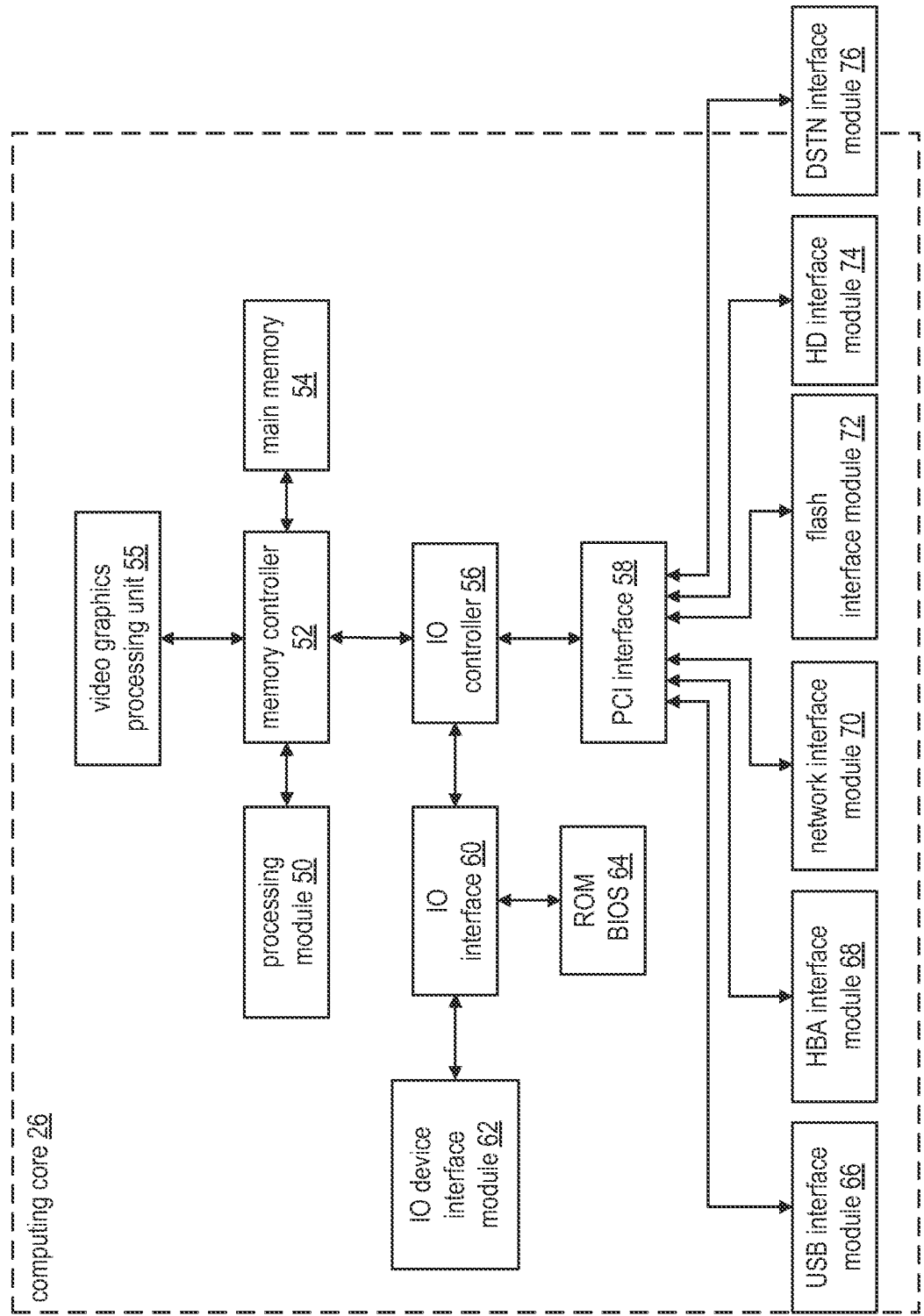
FIG. 2 is a schematic block diagram of an embodiment of a computing core in accordance with the present invention.

FIG. 2 is a schematic block diagram of an embodiment of a computing core 26 that includes a processing module 50, a memory controller 52, main memory 54, a video graphics processing unit 55, an input/output (TO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSTN interface module 76.

The DSTN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSTN interface module 76 and/or the network interface module 70 may function as the interface 30 of the user device 14 of FIG. 1. Further note that the IO device interface module 62 and/or the memory interface modules may be collectively or individually referred to as IO ports.

Figure 3:
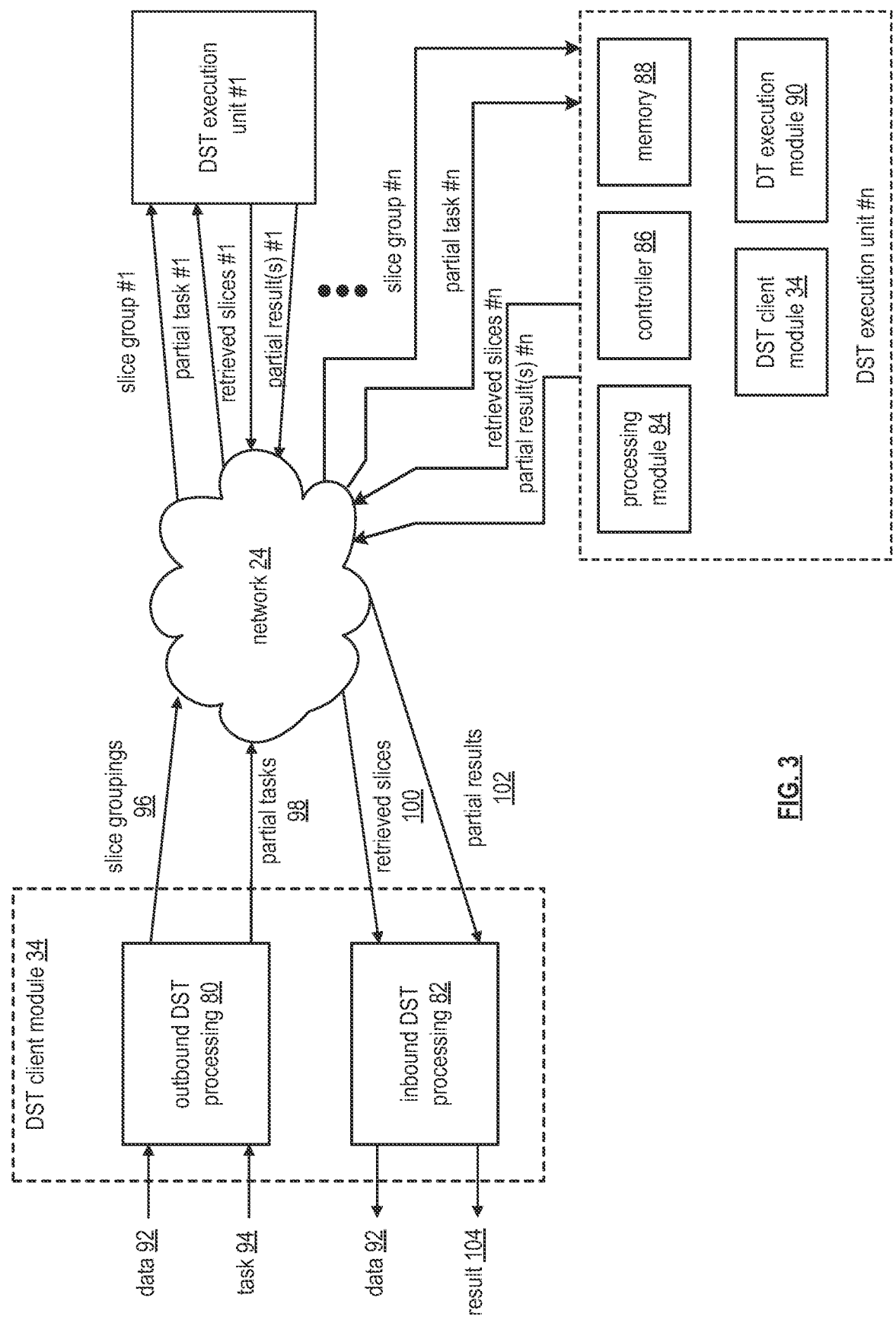
FIG. 3 is a diagram of an example of a distributed storage and task processing in accordance with the present invention.

FIG. 3 is a diagram of an example of the distributed computing system performing a distributed storage and task processing operation. The distributed computing system includes a DST (distributed storage and/or task) client module 34 (which may be in user device 14 and/or in DST processing unit 16 of FIG. 1), a network 24, a plurality of DST execution units 1-n that includes two or more DST execution units 36 of FIG. 1 (which form at least a portion of DSTN module 22 of FIG. 1), a DST managing module (not shown), and a DST integrity verification module (not shown). The DST client module 34 includes an outbound DST processing section 80 and an inbound DST processing section 82. Each of the DST execution units 1-n includes a controller 86, a processing module 84, memory 88, a DT (distributed task) execution module 90, and a DST client module 34.

In an example of operation, the DST client module 34 receives data 92 and one or more tasks 94 to be performed upon the data 92. The data 92 may be of any size and of any content, where, due to the size (e.g., greater than a few Terabytes), the content (e.g., secure data, etc.), and/or task(s) (e.g., MIPS intensive), distributed processing of the task(s) on the data is desired. For example, the data 92 may be one or more digital books, a copy of a company's emails, a large-scale Internet search, a video security file, one or more entertainment video files (e.g., television programs, movies, etc.), data files, and/or any other large amount of data (e.g., greater than a few Terabytes).

Within the DST client module 34, the outbound DST processing section 80 receives the data 92 and the task(s) 94. The outbound DST processing section 80 processes the data 92 to produce slice groupings 96. As an example of such processing, the outbound DST processing section 80 partitions the data 92 into a plurality of data partitions. For each data partition, the outbound DST processing section 80 dispersed storage (DS) error encodes the data partition to produce encoded data slices and groups the encoded data slices into a slice grouping 96. In addition, the outbound DST processing section 80 partitions the task 94 into partial tasks 98, where the number of partial tasks 98 may correspond to the number of slice groupings 96.

The outbound DST processing section 80 then sends, via the network 24, the slice groupings 96 and the partial tasks 98 to the DST execution units 1-n of the DSTN module 22 of FIG. 1. For example, the outbound DST processing section 80 sends slice group 1 and partial task 1 to DST execution unit 1. As another example, the outbound DST processing section 80 sends slice group #n and partial task #n to DST execution unit #n.

Each DST execution unit performs its partial task 98 upon its slice group 96 to produce partial results 102. For example, DST execution unit #1 performs partial task #1 on slice group #1 to produce a partial result #1, for results. As a more specific example, slice group #1 corresponds to a data partition of a series of digital books and the partial task #1 corresponds to searching for specific phrases, recording where the phrase is found, and establishing a phrase count. In this more specific example, the partial result #1 includes information as to where the phrase was found and includes the phrase count.

Upon completion of generating their respective partial results 102, the DST execution units send, via the network 24, their partial results 102 to the inbound DST processing section 82 of the DST client module 34. The inbound DST processing section 82 processes the received partial results 102 to produce a result 104. Continuing with the specific example of the preceding paragraph, the inbound DST processing section 82 combines the phrase count from each of the DST execution units 36 to produce a total phrase count. In addition, the inbound DST processing section 82 combines the 'where the phrase was found' information from each of the DST execution units 36 within their respective data partitions to produce 'where the phrase was found' information for the series of digital books.

In another example of operation, the DST client module 34 requests retrieval of stored data within the memory of the DST execution units 36 (e.g., memory of the DSTN module). In this example, the task 94 is retrieve data stored in the memory of the DSTN module. Accordingly, the outbound DST processing section 80 converts the task 94 into a plurality of partial tasks 98 and sends the partial tasks 98 to the respective DST execution units 1-n.

In response to the partial task 98 of retrieving stored data, a DST execution unit 36 identifies the corresponding encoded data slices 100 and retrieves them. For example, DST execution unit #1 receives partial task #1 and retrieves, in response thereto, retrieved slices #1. The DST execution units 36 send their respective retrieved slices 100 to the inbound DST processing section 82 via the network 24.

The inbound DST processing section 82 converts the retrieved slices 100 into data 92. For example, the inbound DST processing section 82 de-groups the retrieved slices 100 to produce encoded slices per data partition. The inbound DST processing section 82 then DS error decodes the encoded slices per data partition to produce data partitions. The inbound DST processing section 82 de-partitions the data partitions to recapture the data 92.

Figure 4:
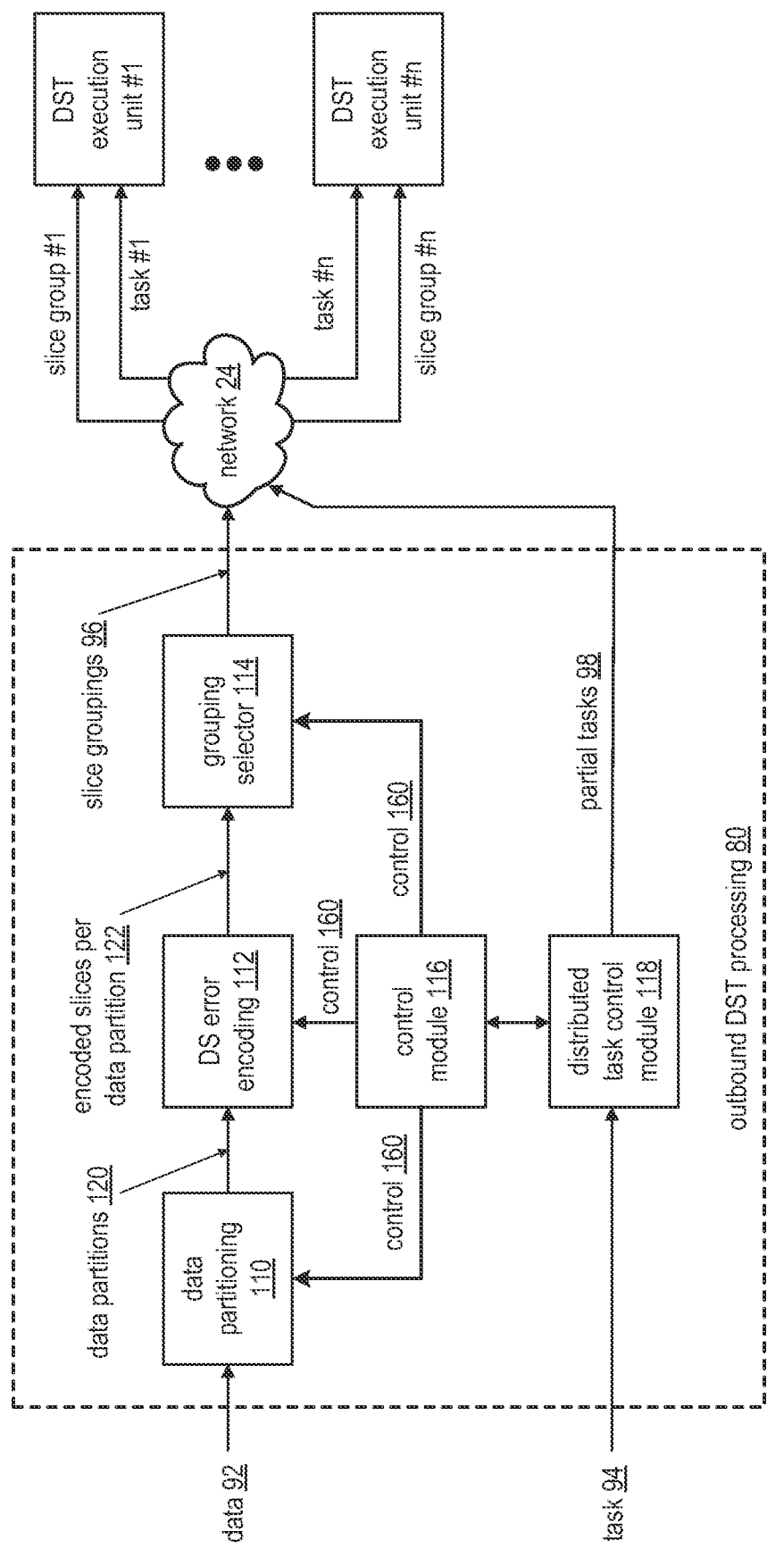
FIG. 4 is a schematic block diagram of an embodiment of an outbound distributed storage and/or task (DST) processing in accordance with the present invention.

FIG. 4 is a schematic block diagram of an embodiment of an outbound distributed storage and/or task (DST) processing section 80 of a DST client module 34 FIG. 1 coupled to a DSTN module 22 of a FIG. 1 (e.g., a plurality of n DST execution units 36) via a network 24. The outbound DST processing section 80 includes a data partitioning module 110, a dispersed storage (DS) error encoding module 112, a grouping selector module 114, a control module 116, and a distributed task control module 118.

In an example of operation, the data partitioning module 110 partitions data 92 into a plurality of data partitions 120. The number of partitions and the size of the partitions may be selected by the control module 116 via control 160 based on the data 92 (e.g., its size, its content, etc.), a corresponding task 94 to be performed (e.g., simple, complex, single step, multiple steps, etc.), DS encoding parameters (e.g., pillar width, decode threshold, write threshold, segment security parameters, slice security parameters, etc.), capabilities of the DST execution units 36 (e.g., processing resources, availability of processing recourses, etc.), and/or as may be inputted by a user, system administrator, or other operator (human or automated). For example, the data partitioning module 110 partitions the data 92 (e.g., 100 Terabytes) into 100,000 data segments, each being 1 Gigabyte in size. Alternatively, the data partitioning module 110 partitions the data 92 into a plurality of data segments, where some of data segments are of a different size, are of the same size, or a combination thereof.

The DS error encoding module 112 receives the data partitions 120 in a serial manner, a parallel manner, and/or a combination thereof. For each data partition 120, the DS error encoding module 112 DS error encodes the data partition 120 in accordance with control information 160 from the control module 116 to produce encoded data slices 122. The DS error encoding includes segmenting the data partition into data segments, segment security processing (e.g., encryption, compression, watermarking, integrity check (e.g., CRC), etc.), error encoding, slicing, and/or per slice security processing (e.g., encryption, compression, watermarking, integrity check (e.g., CRC), etc.). The control information 160 indicates which steps of the DS error encoding are active for a given data partition and, for active steps, indicates the parameters for the step. For example, the control information 160 indicates that the error encoding is active and includes error encoding parameters (e.g., pillar width, decode threshold, write threshold, read threshold, type of error encoding, etc.).

The grouping selector module 114 groups the encoded slices 122 of a data partition into a set of slice groupings 96. The number of slice groupings corresponds to the number of DST execution units 36 identified for a particular task 94. For example, if five DST execution units 36 are identified for the particular task 94, the grouping selector module groups the encoded slices 122 of a data partition into five slice groupings 96. The grouping selector module 114 outputs the slice groupings 96 to the corresponding DST execution units 36 via the network 24.

The distributed task control module 118 receives the task 94 and converts the task 94 into a set of partial tasks 98. For example, the distributed task control module 118 receives a task to find where in the data (e.g., a series of books) a phrase occurs and a total count of the phrase usage in the data. In this example, the distributed task control module 118 replicates the task 94 for each DST execution unit 36 to produce the partial tasks 98. In another example, the distributed task control module 118 receives a task to find where in the data a first phrase occurs, where in the data a second phrase occurs, and a total count for each phrase usage in the data. In this example, the distributed task control module 118 generates a first set of partial tasks 98 for finding and counting the first phrase and a second set of partial tasks for finding and counting the second phrase. The distributed task control module 118 sends respective first and/or second partial tasks 98 to each DST execution unit 36.

Figure 5:
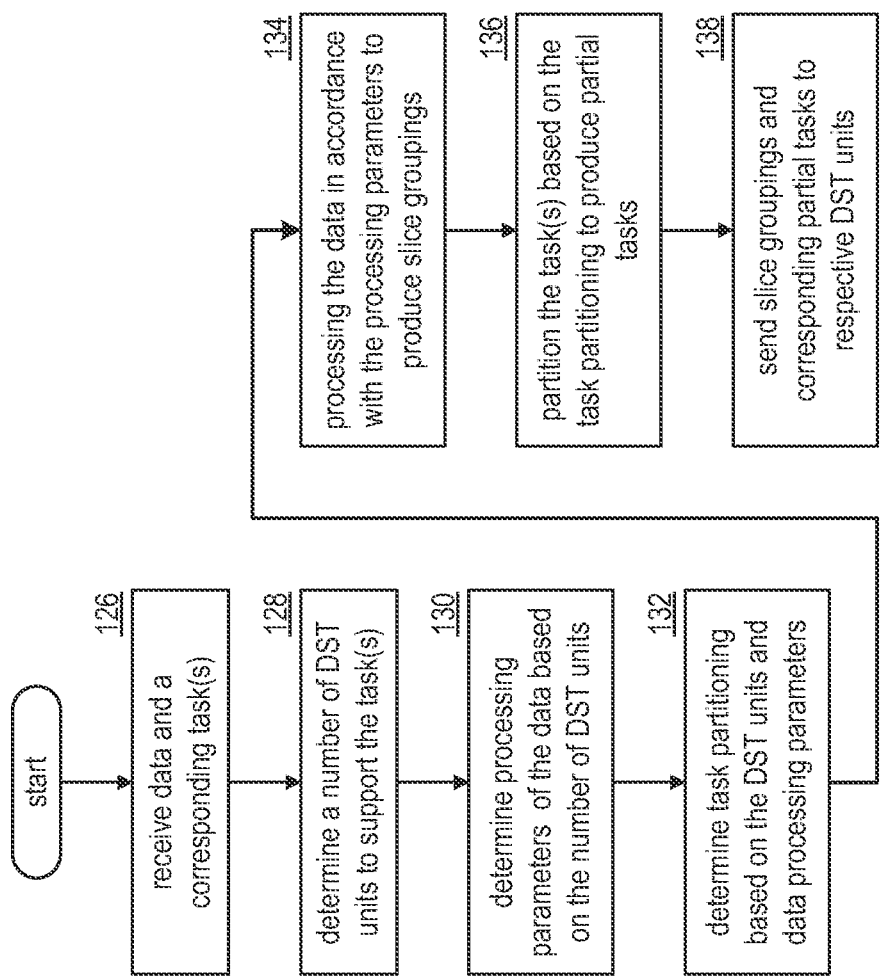
FIG. 5 is a logic diagram of an example of a method for outbound DST processing in accordance with the present invention.

FIG. 5 is a logic diagram of an example of a method for outbound distributed storage and task (DST) processing that begins at step 126 where a DST client module receives data and one or more corresponding tasks. The method continues at step 128 where the DST client module determines a number of DST units to support the task for one or more data partitions. For example, the DST client module may determine the number of DST units to support the task based on the size of the data, the requested task, the content of the data, a predetermined number (e.g., user indicated, system administrator determined, etc.), available DST units, capability of the DST units, and/or any other factor regarding distributed task processing of the data. The DST client module may select the same DST units for each data partition, may select different DST units for the data partitions, or a combination thereof.

The method continues at step 130 where the DST client module determines processing parameters of the data based on the number of DST units selected for distributed task processing. The processing parameters include data partitioning information, DS encoding parameters, and/or slice grouping information. The data partitioning information includes a number of data partitions, size of each data partition, and/or organization of the data partitions (e.g., number of data blocks in a partition, the size of the data blocks, and arrangement of the data blocks). The DS encoding parameters include segmenting information, segment security information, error encoding information (e.g., dispersed storage error encoding function parameters including one or more of pillar width, decode threshold, write threshold, read threshold, generator matrix), slicing information, and/or per slice security information. The slice grouping information includes information regarding how to arrange the encoded data slices into groups for the selected DST units. As a specific example, if the DST client module determines that five DST units are needed to support the task, then it determines that the error encoding parameters include a pillar width of five and a decode threshold of three.

The method continues at step 132 where the DST client module determines task partitioning information (e.g., how to partition the tasks) based on the selected DST units and data processing parameters. The data processing parameters include the processing parameters and DST unit capability information. The DST unit capability information includes the number of DT (distributed task) execution units, execution capabilities of each DT execution unit (e.g., MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, memory information (e.g., type, size, availability, etc.)), and/or any information germane to executing one or more tasks.

The method continues at step 134 where the DST client module processes the data in accordance with the processing parameters to produce slice groupings. The method continues at step 136 where the DST client module partitions the task based on the task partitioning information to produce a set of partial tasks. The method continues at step 138 where the DST client module sends the slice groupings and the corresponding partial tasks to respective DST units.

Figure 6:
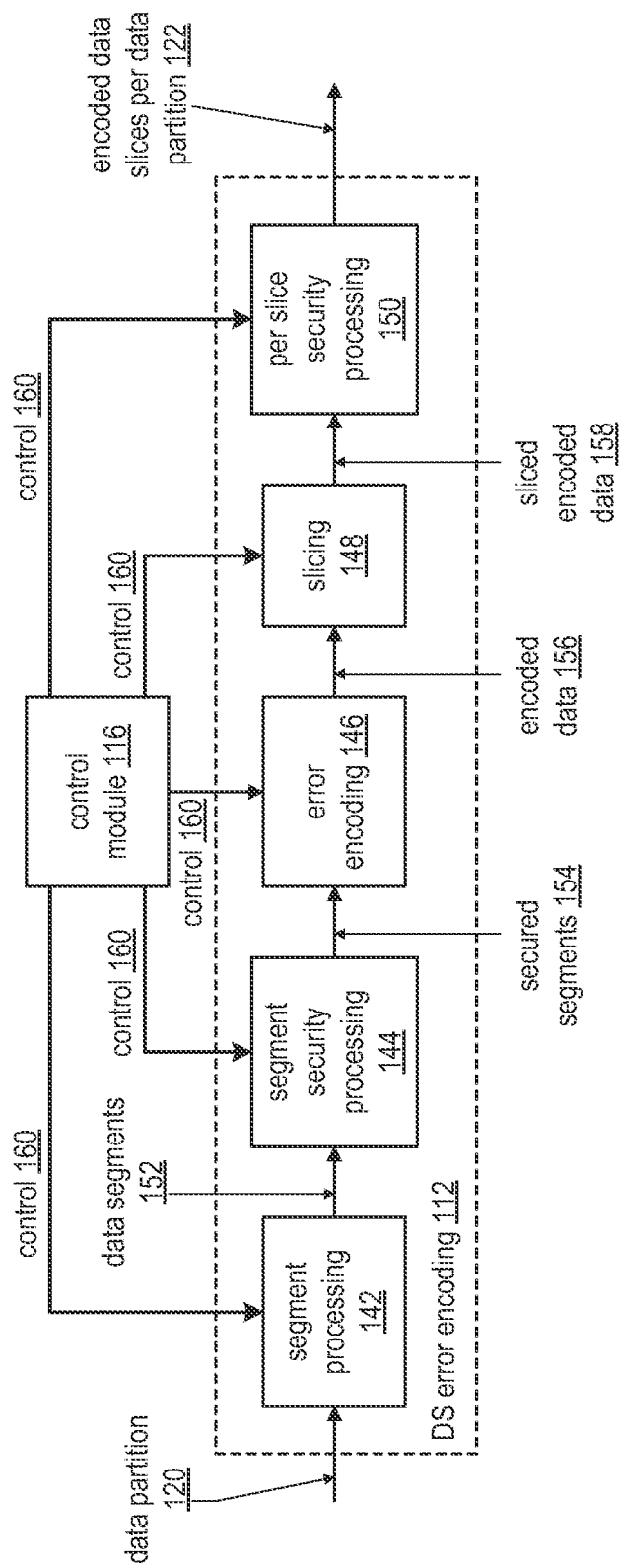
FIG. 6 is a schematic block diagram of an embodiment of a dispersed error encoding in accordance with the present invention.

FIG. 6 is a schematic block diagram of an embodiment of the dispersed storage (DS) error encoding module 112 of an outbound distributed storage and task (DST) processing section. The DS error encoding module 112 includes a segment processing module 142, a segment security processing module 144, an error encoding module 146, a slicing module 148, and a per slice security processing module 150. Each of these modules is coupled to a control module 116 to receive control information 160 therefrom.

In an example of operation, the segment processing module 142 receives a data partition 120 from a data partitioning module and receives segmenting information as the control information 160 from the control module 116. The segmenting information indicates how the segment processing module 142 is to segment the data partition 120. For example, the segmenting information indicates how many rows to segment the data based on a decode threshold of an error encoding scheme, indicates how many columns to segment the data into based on a number and size of data blocks within the data partition 120, and indicates how many columns to include in a data segment 152. The segment processing module 142 segments the data 120 into data segments 152 in accordance with the segmenting information.

The segment security processing module 144, when enabled by the control module 116, secures the data segments 152 based on segment security information received as control information 160 from the control module 116. The segment security information includes data compression, encryption, watermarking, integrity check (e.g., cyclic redundancy check (CRC), etc.), and/or any other type of digital security. For example, when the segment security processing module 144 is enabled, it may compress a data segment 152, encrypt the compressed data segment, and generate a CRC value for the encrypted data segment to produce a secure data segment 154. When the segment security processing module 144 is not enabled, it passes the data segments 152 to the error encoding module 146 or is bypassed such that the data segments 152 are provided to the error encoding module 146.

The error encoding module 146 encodes the secure data segments 154 in accordance with error correction encoding parameters received as control information 160 from the control module 116. The error correction encoding parameters (e.g., also referred to as dispersed storage error coding parameters) include identifying an error correction encoding scheme (e.g., forward error correction algorithm, a Reed-Solomon based algorithm, an online coding algorithm, an information dispersal algorithm, etc.), a pillar width, a decode threshold, a read threshold, a write threshold, etc. For example, the error correction encoding parameters identify a specific error correction encoding scheme, specifies a pillar width of five, and specifies a decode threshold of three. From these parameters, the error encoding module 146 encodes a data segment 154 to produce an encoded data segment 156.

The slicing module 148 slices the encoded data segment 156 in accordance with the pillar width of the error correction encoding parameters received as control information 160. For example, if the pillar width is five, the slicing module 148 slices an encoded data segment 156 into a set of five encoded data slices. As such, for a plurality of encoded data segments 156 for a given data partition, the slicing module outputs a plurality of sets of encoded data slices 158.

The per slice security processing module 150, when enabled by the control module 116, secures each encoded data slice 158 based on slice security information received as control information 160 from the control module 116. The slice security information includes data compression, encryption, watermarking, integrity check (e.g., CRC, etc.), and/or any other type of digital security. For example, when the per slice security processing module 150 is enabled, it compresses an encoded data slice 158, encrypts the compressed encoded data slice, and generates a CRC value for the encrypted encoded data slice to produce a secure encoded data slice 122. When the per slice security processing module 150 is not enabled, it passes the encoded data slices 158 or is bypassed such that the encoded data slices 158 are the output of the DS error encoding module 112. Note that the control module 116 may be omitted and each module stores its own parameters.

Figure 7:
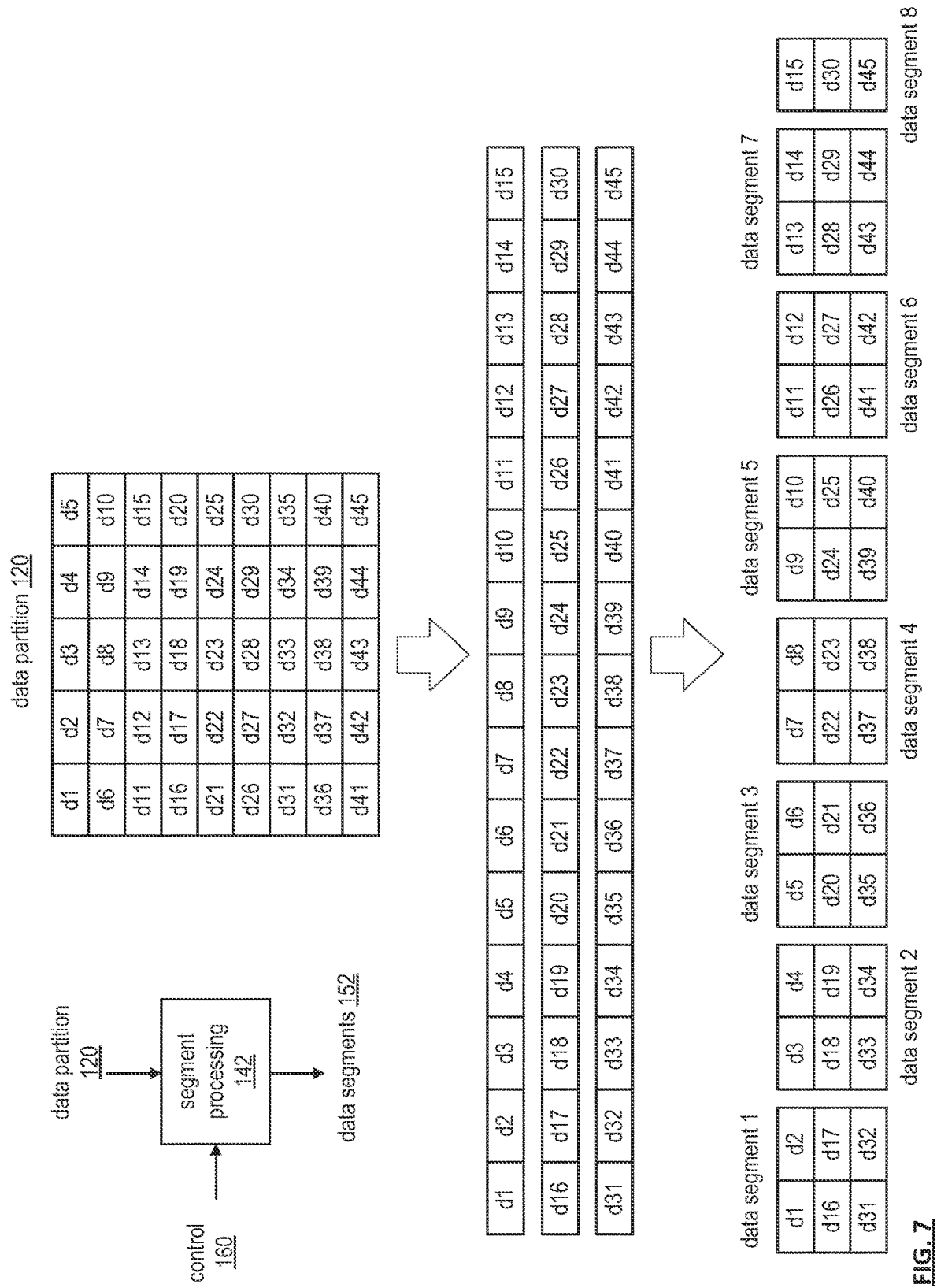
FIG. 7 is a diagram of an example of a segment processing of the dispersed error encoding in accordance with the present invention.

FIG. 7 is a diagram of an example of a segment processing of a dispersed storage (DS) error encoding module. In this example, a segment processing module 142 receives a data partition 120 that includes 45 data blocks (e.g., d1-d45), receives segmenting information (i.e., control information 160) from a control module, and segments the data partition 120 in accordance with the control information 160 to produce data segments 152. Each data block may be of the same size as other data blocks or of a different size. In addition, the size of each data block may be a few bytes to megabytes of data. As previously mentioned, the segmenting information indicates how many rows to segment the data partition into, indicates how many columns to segment the data partition into, and indicates how many columns to include in a data segment.

In this example, the decode threshold of the error encoding scheme is three; as such the number of rows to divide the data partition into is three. The number of columns for each row is set to 15, which is based on the number and size of data blocks. The data blocks of the data partition are arranged in rows and columns in a sequential order (i.e., the first row includes the first 15 data blocks; the second row includes the second 15 data blocks; and the third row includes the last 15 data blocks).

With the data blocks arranged into the desired sequential order, they are divided into data segments based on the segmenting information. In this example, the data partition is divided into 8 data segments; the first 7 include 2 columns of three rows and the last includes 1 column of three rows. Note that the first row of the 8 data segments is in sequential order of the first 15 data blocks; the second row of the 8 data segments in sequential order of the second 15 data blocks; and the third row of the 8 data segments in sequential order of the last 15 data blocks. Note that the number of data blocks, the grouping of the data blocks into segments, and size of the data blocks may vary to accommodate the desired distributed task processing function.

Figure 8:
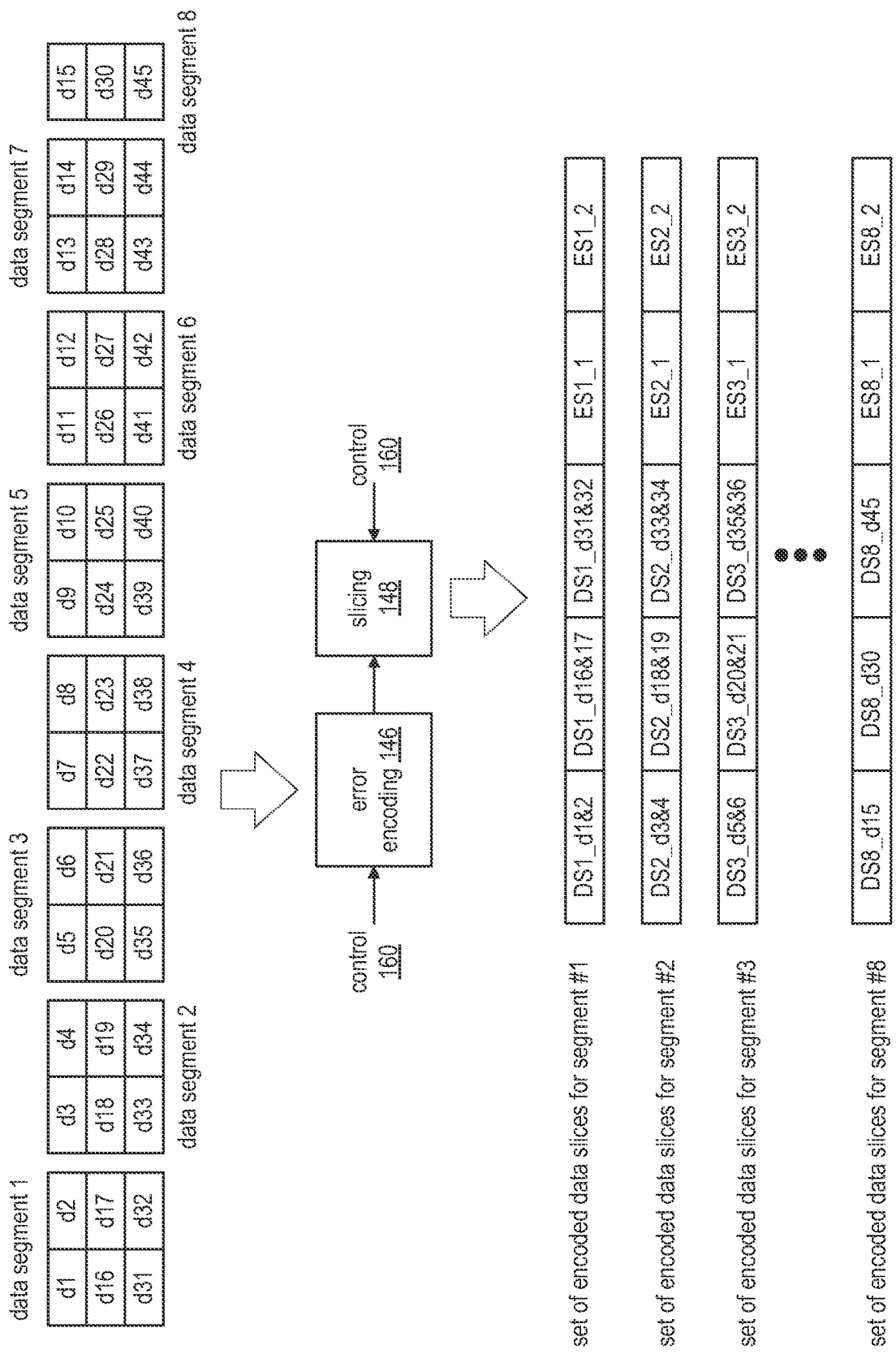
FIG. 8 is a diagram of an example of error encoding and slicing processing of the dispersed error encoding in accordance with the present invention.

FIG. 8 is a diagram of an example of error encoding and slicing processing of the dispersed error encoding processing the data segments of FIG. 7. In this example, data segment 1 includes 3 rows with each row being treated as one word for encoding. As such, data segment 1 includes three words for encoding: word 1 including data blocks d1 and d2, word 2 including data blocks d16 and d17, and word 3 including data blocks d31 and d32. Each of data segments 2-7 includes three words where each word includes two data blocks. Data segment 8 includes three words where each word includes a single data block (e.g., d15, d30, and d45).

In operation, an error encoding module 146 and a slicing module 148 convert each data segment into a set of encoded data slices in accordance with error correction encoding parameters as control information 160. More specifically, when the error correction encoding parameters indicate a unity matrix Reed-Solomon based encoding algorithm, 5 pillars, and decode threshold of 3, the first three encoded data slices of the set of encoded data slices for a data segment are substantially similar to the corresponding word of the data segment. For instance, when the unity matrix Reed-Solomon based encoding algorithm is applied to data segment 1, the content of the first encoded data slice (DS1_d1&2) of the first set of encoded data slices (e.g., corresponding to data segment 1) is substantially similar to content of the first word (e.g., d1 & d2); the content of the second encoded data slice (DS1_d16&17) of the first set of encoded data slices is substantially similar to content of the second word (e.g., d16 & d17); and the content of the third encoded data slice (DS1_d31&32) of the first set of encoded data slices is substantially similar to content of the third word (e.g., d31 & d32).

The content of the fourth and fifth encoded data slices (e.g., ES1_1 and ES1_2) of the first set of encoded data slices include error correction data based on the first-third words of the first data segment. With such an encoding and slicing scheme, retrieving any three of the five encoded data slices allows the data segment to be accurately reconstructed.

The encoding and slicing of data segments 2-7 yield sets of encoded data slices similar to the set of encoded data slices of data segment 1. For instance, the content of the first encoded data slice (DS2_d3&4) of the second set of encoded data slices (e.g., corresponding to data segment 2) is substantially similar to content of the first word (e.g., d3 & d4); the content of the second encoded data slice (DS2_d18&19) of the second set of encoded data slices is substantially similar to content of the second word (e.g., d18 & d19); and the content of the third encoded data slice (DS2_d33&34) of the second set of encoded data slices is substantially similar to content of the third word (e.g., d33 & d34). The content of the fourth and fifth encoded data slices (e.g., ES1_1 and ES1_2) of the second set of encoded data slices includes error correction data based on the first-third words of the second data segment.

Figure 9:
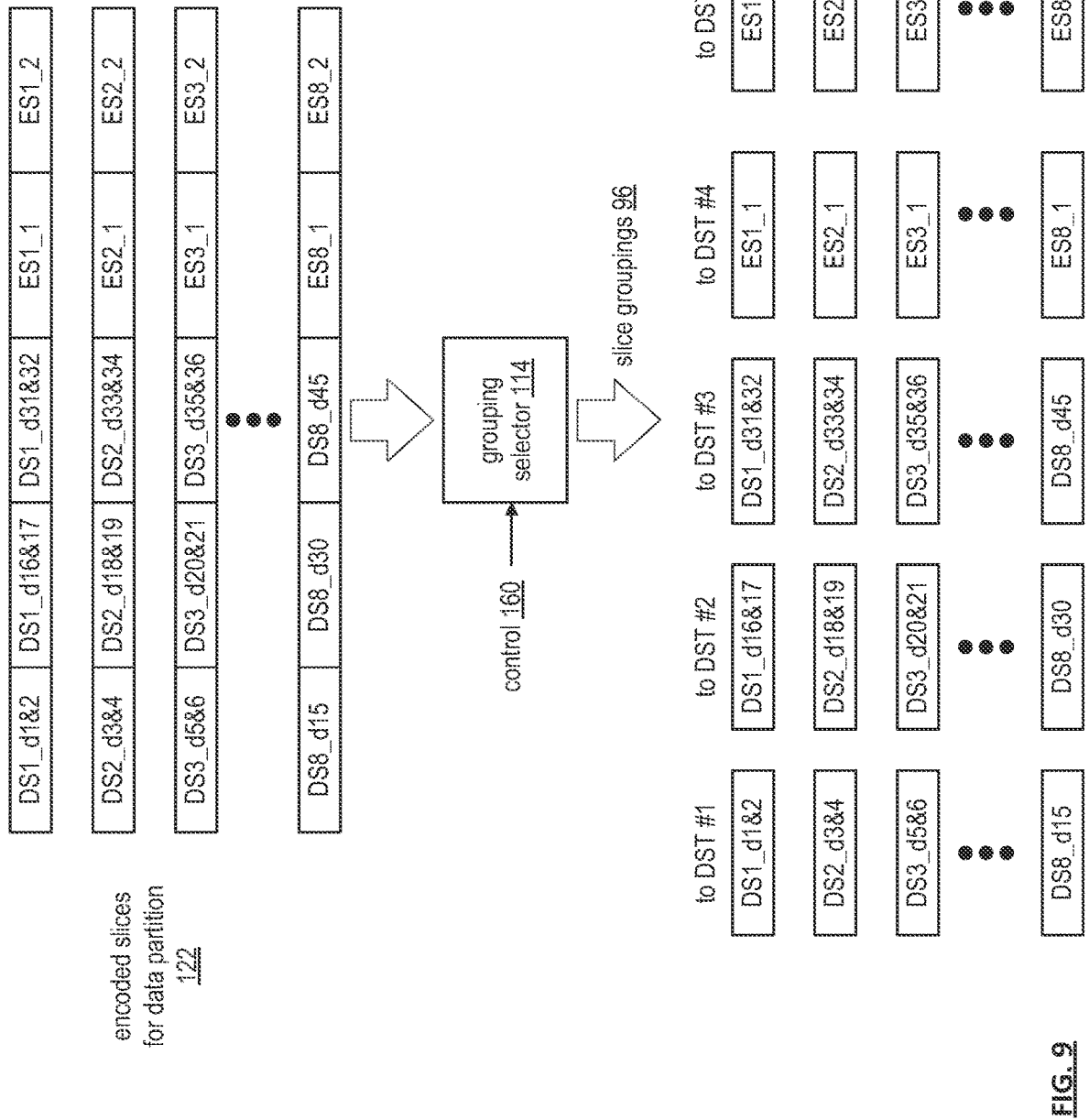
FIG. 9 is a diagram of an example of grouping selection processing of the outbound DST processing in accordance with the present invention.

FIG. 9 is a diagram of an example of grouping selection processing of an outbound distributed storage and task (DST) processing in accordance with group selection information as control information 160 from a control module. Encoded slices for data partition 122 are grouped in accordance with the control information 160 to produce slice groupings 96. In this example, a grouping selector module 114 organizes the encoded data slices into five slice groupings (e.g., one for each DST execution unit of a distributed storage and task network (DSTN) module). As a specific example, the grouping selector module 114 creates a first slice grouping for a DST execution unit #1, which includes first encoded slices of each of the sets of encoded slices. As such, the first DST execution unit receives encoded data slices corresponding to data blocks 1-15 (e.g., encoded data slices of contiguous data).

The grouping selector module 114 also creates a second slice grouping for a DST execution unit #2, which includes second encoded slices of each of the sets of encoded slices. As such, the second DST execution unit receives encoded data slices corresponding to data blocks 16-30. The grouping selector module 114 further creates a third slice grouping for DST execution unit #3, which includes third encoded slices of each of the sets of encoded slices. As such, the third DST execution unit receives encoded data slices corresponding to data blocks 31-45.

The grouping selector module 114 creates a fourth slice grouping for DST execution unit #4, which includes fourth encoded slices of each of the sets of encoded slices. As such, the fourth DST execution unit receives encoded data slices corresponding to first error encoding information (e.g., encoded data slices of error coding (EC) data). The grouping selector module 114 further creates a fifth slice grouping for DST execution unit #5, which includes fifth encoded slices of each of the sets of encoded slices. As such, the fifth DST execution unit receives encoded data slices corresponding to second error encoding information.

Figure 10:
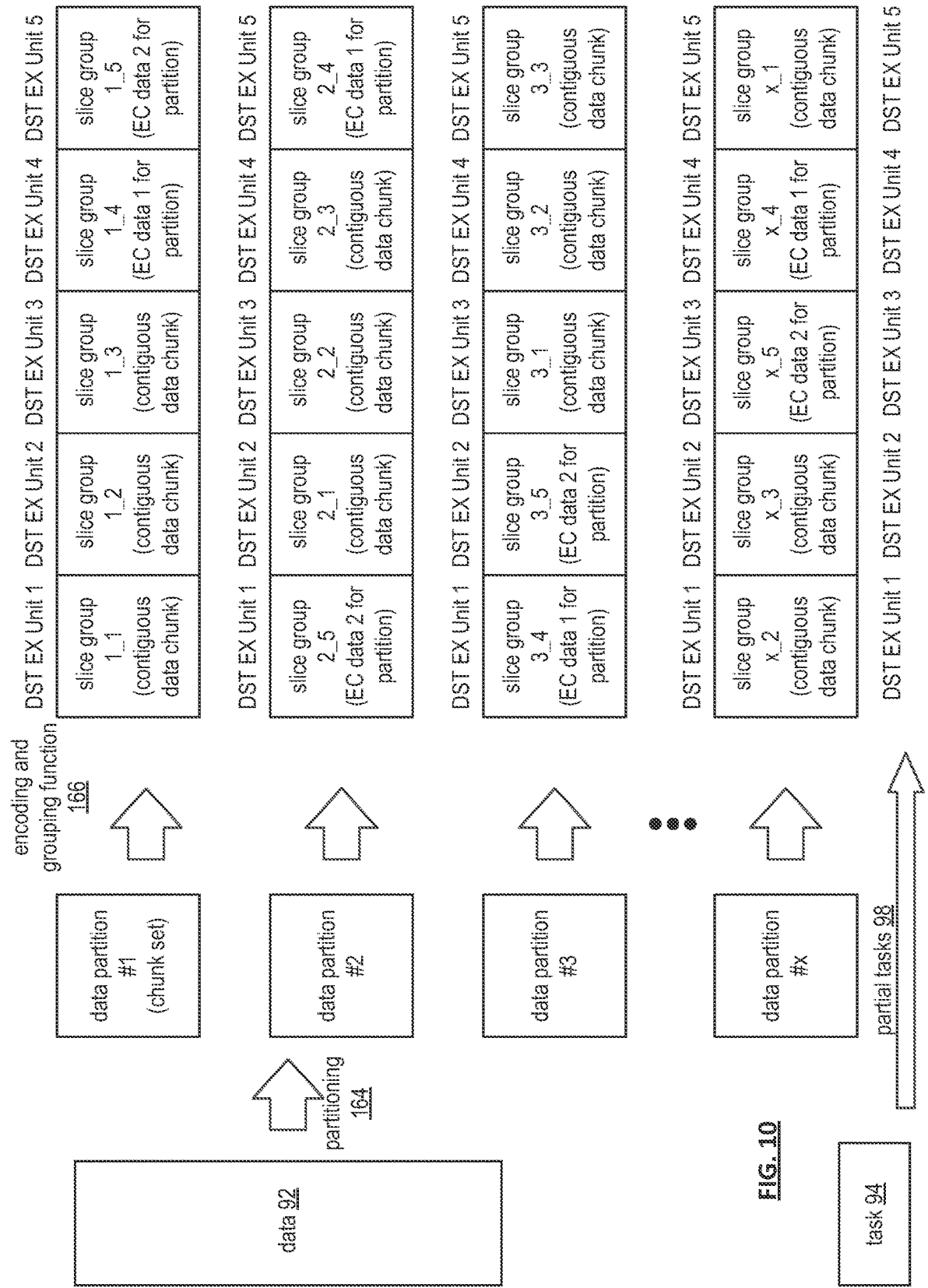
FIG. 10 is a diagram of an example of converting data into slice groups in accordance with the present invention.

FIG. 10 is a diagram of an example of converting data 92 into slice groups that expands on the preceding figures. As shown, the data 92 is partitioned in accordance with a partitioning function 164 into a plurality of data partitions (1-x, where x is an integer greater than 4). Each data partition (or chunkset of data) is encoded and grouped into slice groupings as previously discussed by an encoding and grouping function 166. For a given data partition, the slice groupings are sent to distributed storage and task (DST)

execution units. From data partition to data partition, the ordering of the slice groupings to the DST execution units may vary.

For example, the slice groupings of data partition #1 is sent to the DST execution units such that the first DST execution receives first encoded data slices of each of the sets of encoded data slices, which corresponds to a first continuous data chunk of the first data partition (e.g., refer to FIG. 9), a second DST execution receives second encoded data slices of each of the sets of encoded data slices, which corresponds to a second continuous data chunk of the first data partition, etc.

For the second data partition, the slice groupings may be sent to the DST execution units in a different order than it was done for the first data partition. For instance, the first slice grouping of the second data partition (e.g., slice group 2_1) is sent to the second DST execution unit; the second slice grouping of the second data partition (e.g., slice group 2_2) is sent to the third DST execution unit; the third slice grouping of the second data partition (e.g., slice group 2_3) is sent to the fourth DST execution unit; the fourth slice grouping of the second data partition (e.g., slice group 2_4, which includes first error coding information) is sent to the fifth DST execution unit; and the fifth slice grouping of the second data partition (e.g., slice group 2_5, which includes second error coding information) is sent to the first DST execution unit.

The pattern of sending the slice groupings to the set of DST execution units may vary in a predicted pattern, a random pattern, and/or a combination thereof from data partition to data partition. In addition, from data partition to data partition, the set of DST execution units may change. For example, for the first data partition, DST execution units 1-5 may be used; for the second data partition, DST execution units 6-10 may be used; for the third data partition, DST execution units 3-7 may be used; etc. As is also shown, the task is divided into partial tasks that are sent to the DST execution units in conjunction with the slice groupings of the data partitions.

Figure 11:
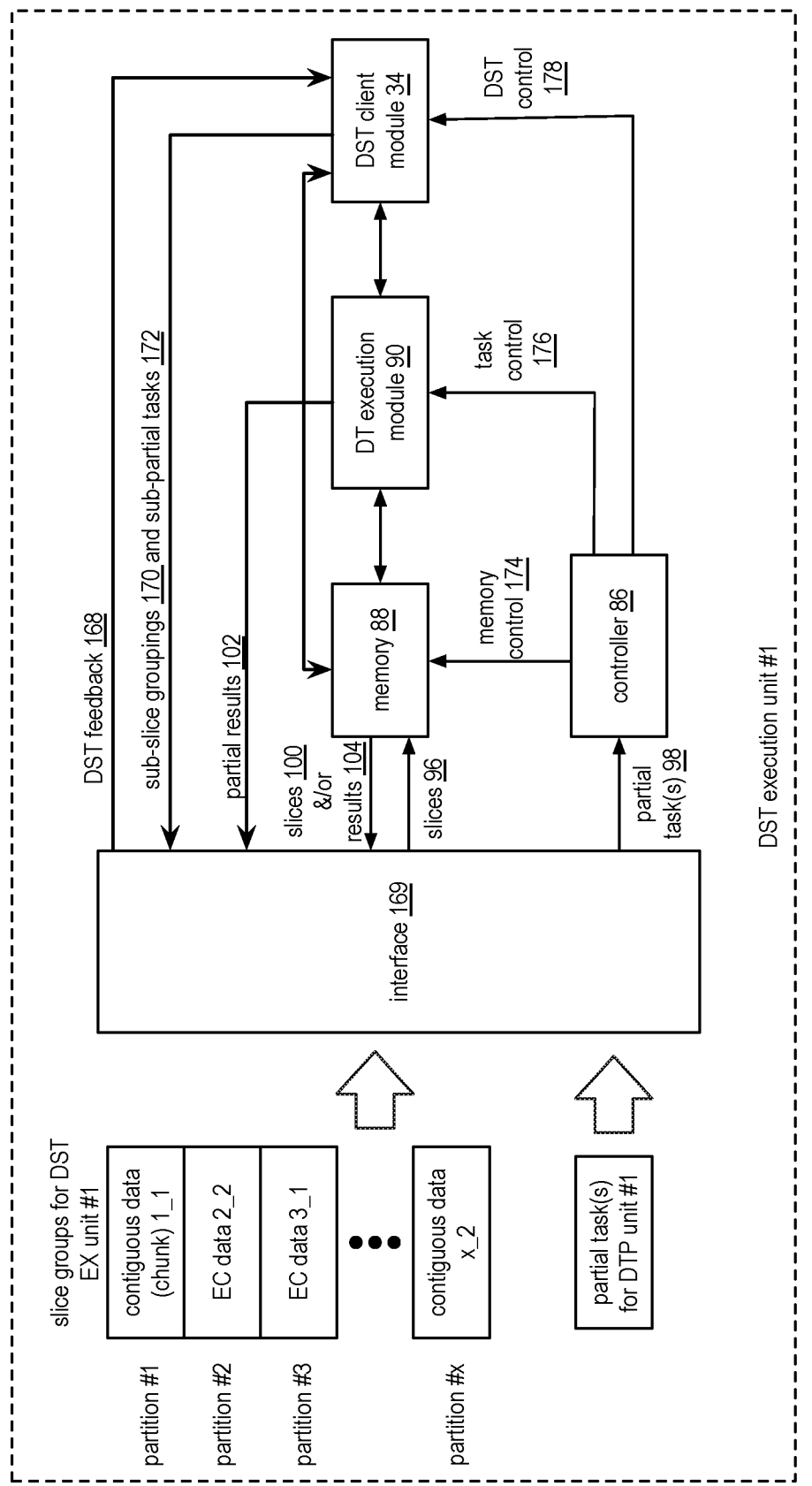
FIG. 11 is a schematic block diagram of an embodiment of a DST execution unit in accordance with the present invention.

FIG. 11 is a schematic block diagram of an embodiment of a DST (distributed storage and/or task) execution unit that includes an interface 169, a controller 86, memory 88, one or more DT (distributed task) execution modules 90, and a DST client module 34. The memory 88 is of sufficient size to store a significant number of encoded data slices (e.g., thousands of slices to hundreds-of-millions of slices) and may include one or more hard drives and/or one or more solid-state memory devices (e.g., flash memory, DRAM, etc.).

In an example of storing a slice group, the DST execution module receives a slice grouping 96 (e.g., slice group #1) via interface 169. The slice grouping 96 includes, per partition, encoded data slices of contiguous data or encoded data slices of error coding (EC) data. For slice group #1, the DST execution module receives encoded data slices of contiguous data for partitions #1 and #x (and potentially others between 3 and x) and receives encoded data slices of EC data for partitions #2 and #3 (and potentially others between 3 and x). Examples of encoded data slices of contiguous data and encoded data slices of error coding (EC) data are discussed with reference to FIG. 9. The memory 88 stores the encoded data slices of slice groupings 96 in accordance with memory control information 174 it receives from the controller 86.

The controller 86 (e.g., a processing module, a CPU, etc.) generates the memory control information 174 based on a partial task(s) 98 and distributed computing information (e.g., user information (e.g., user ID, distributed computing permissions, data access permission, etc.), vault information (e.g., virtual memory assigned to user, user group, temporary storage for task processing, etc.), task validation information, etc.). For example, the controller 86 interprets the partial task(s) 98 in light of the distributed computing information to determine whether a requestor is authorized to perform the task 98, is authorized to access the data, and/or is authorized to perform the task on this particular data. When the requestor is authorized, the controller 86 determines, based on the task 98 and/or another input, whether the encoded data slices of the slice grouping 96 are to be temporarily stored or permanently stored. Based on the foregoing, the controller 86 generates the memory control information 174 to write the encoded data slices of the slice grouping 96 into the memory 88 and to indicate whether the slice grouping 96 is permanently stored or temporarily stored.

With the slice grouping 96 stored in the memory 88, the controller 86 facilitates execution of the partial task(s) 98. In an example, the controller 86 interprets the partial task 98 in light of the capabilities of the DT execution module(s) 90. The capabilities include one or more of MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, etc. If the controller 86 determines that the DT execution module(s) 90 have sufficient capabilities, it generates task control information 176.

The task control information 176 may be a generic instruction (e.g., perform the task on the stored slice grouping) or a series of operational codes. In the former instance, the DT execution module 90 includes a co-processor function specifically configured (fixed or programmed) to perform the desired task 98. In the latter instance, the DT execution module 90 includes a general processor topology where the controller stores an algorithm corresponding to the particular task 98. In this instance, the controller 86 provides the operational codes (e.g., assembly language, source code of a programming language, object code, etc.) of the algorithm to the DT execution module 90 for execution.

Depending on the nature of the task 98, the DT execution module 90 may generate intermediate partial results 102 that are stored in the memory 88 or in a cache memory (not shown) within the DT execution module 90. In either case, when the DT execution module 90 completes execution of the partial task 98, it outputs one or more partial results 102. The partial results 102 may also be stored in memory 88.

If, when the controller 86 is interpreting whether capabilities of the DT execution module(s) 90 can support the partial task 98, the controller 86 determines that the DT execution module(s) 90 cannot adequately support the task 98 (e.g., does not have the right resources, does not have sufficient available resources, available resources would be too slow, etc.), it then determines whether the partial task 98 should be fully offloaded or partially offloaded.

If the controller 86 determines that the partial task 98 should be fully offloaded, it generates DST control information 178 and provides it to the DST client module 34. The DST control information 178 includes the partial task 98, memory storage information regarding the slice grouping 96, and distribution instructions. The distribution instructions instruct the DST client module 34 to divide the partial task 98 into sub-partial tasks 172, to divide the slice grouping 96 into sub-slice groupings 170, and identify other DST execution units. The DST client module 34 functions in a similar manner as the DST client module 34 of FIGS. 3-10 to produce the sub-partial tasks 172 and the sub-slice groupings 170 in accordance with the distribution instructions.

The DST client module 34 receives DST feedback 168 (e.g., sub-partial results), via the interface 169, from the DST execution units to which the task was offloaded. The DST client module 34 provides the sub-partial results to the DST execution unit, which processes the sub-partial results to produce the partial result(s) 102.

If the controller 86 determines that the partial task 98 should be partially offloaded, it determines what portion of the task 98 and/or slice grouping 96 should be processed locally and what should be offloaded. For the portion that is being locally processed, the controller 86 generates task control information 176 as previously discussed. For the portion that is being offloaded, the controller 86 generates DST control information 178 as previously discussed.

When the DST client module 34 receives DST feedback 168 (e.g., sub-partial results) from the DST executions units to which a portion of the task was offloaded, it provides the sub-partial results to the DT execution module 90. The DT execution module 90 processes the sub-partial results with the sub-partial results it created to produce the partial result(s) 102.

The memory 88 may be further utilized to retrieve one or more of stored slices 100, stored results 104, partial results 102 when the DT execution module 90 stores partial results 102 and/or results 104 in the memory 88. For example, when the partial task 98 includes a retrieval request, the controller 86 outputs the memory control 174 to the memory 88 to facilitate retrieval of slices 100 and/or results 104.

Figure 12:
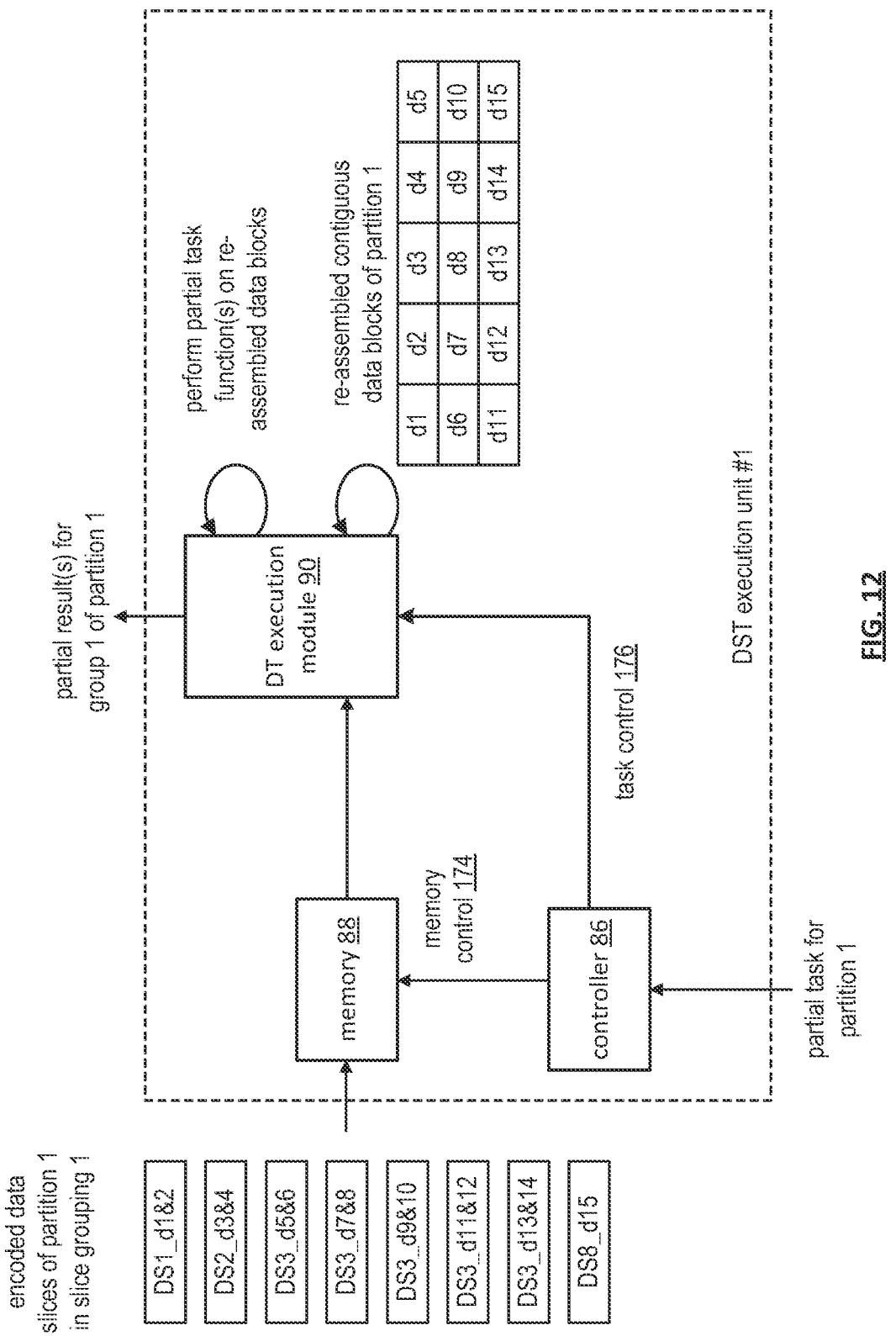
FIG. 12 is a schematic block diagram of an example of operation of a DST execution unit in accordance with the present invention.

FIG. 12 is a schematic block diagram of an example of operation of a distributed storage and task (DST) execution unit storing encoded data slices and executing a task thereon. To store the encoded data slices of a partition 1 of slice grouping 1, a controller 86 generates write commands as memory control information 174 such that the encoded slices are stored in desired locations (e.g., permanent or temporary) within memory 88.

Once the encoded slices are stored, the controller 86 provides task control information 176 to a distributed task (DT) execution module 90. As a first step of executing the task in accordance with the task control information 176, the DT execution module 90 retrieves the encoded slices from memory 88. The DT execution module 90 then reconstructs contiguous data blocks of a data partition. As shown for this example, reconstructed contiguous data blocks of data partition 1 include data blocks 1-15 (e.g., d1-d15).

With the contiguous data blocks reconstructed, the DT execution module 90 performs the task on the reconstructed contiguous data blocks. For example, the task may be to search the reconstructed contiguous data blocks for a particular word or phrase, identify where in the reconstructed contiguous data blocks the particular word or phrase occurred, and/or count the occurrences of the particular word or phrase on the reconstructed contiguous data blocks. The DST execution unit continues in a similar manner for the encoded data slices of other partitions in slice grouping 1. Note that with using the unity matrix error encoding scheme previously discussed, if the encoded data slices of contiguous data are uncorrupted, the decoding of them is a relatively straightforward process of extracting the data.

If, however, an encoded data slice of contiguous data is corrupted (or missing), it can be rebuilt by accessing other DST execution units that are storing the other encoded data slices of the set of encoded data slices of the corrupted encoded data slice. In this instance, the DST execution unit having the corrupted encoded data slices retrieves at least three encoded data slices (of contiguous data and of error coding data) in the set from the other DST execution units (recall for this example, the pillar width is 5 and the decode threshold is 3). The DST execution unit decodes the retrieved data slices using the DS error encoding parameters to recapture the corresponding data segment. The DST execution unit then re-encodes the data segment using the DS error encoding parameters to rebuild the corrupted encoded data slice. Once the encoded data slice is rebuilt, the DST execution unit functions as previously described.

Figure 13:
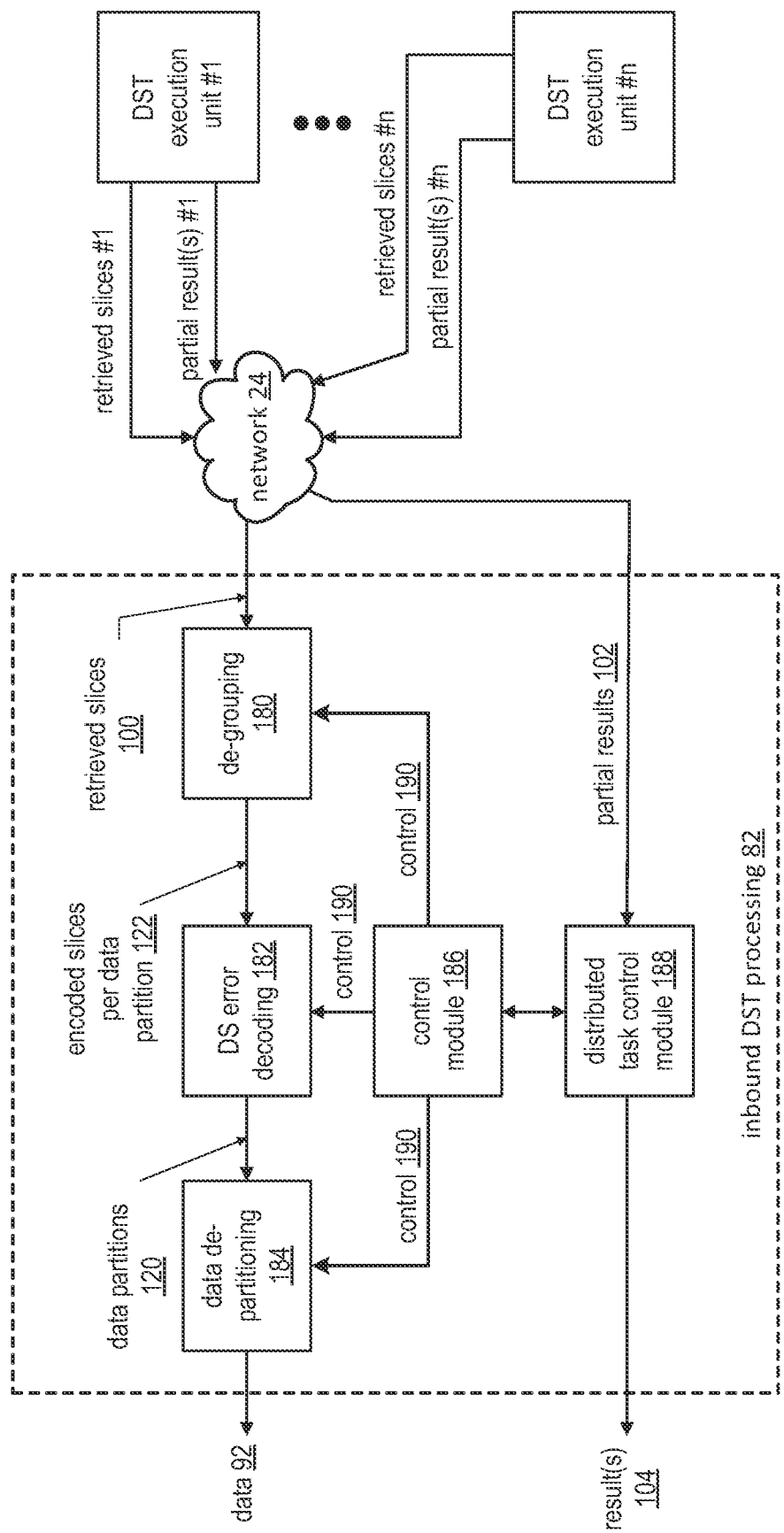
FIG. 13 is a schematic block diagram of an embodiment of an inbound distributed storage and/or task (DST) processing in accordance with the present invention.

FIG. 13 is a schematic block diagram of an embodiment of an inbound distributed storage and/or task (DST) processing section 82 of a DST client module coupled to DST execution units of a distributed storage and task network (DSTN) module via a network 24. The inbound DST processing section 82 includes a de-grouping module 180, a DS (dispersed storage) error decoding module 182, a data de-partitioning module 184, a control module 186, and a distributed task control module 188. Note that the control module 186 and/or the distributed task control module 188 may be separate modules from corresponding ones of outbound DST processing section or may be the same modules.

In an example of operation, the DST execution units have completed execution of corresponding partial tasks on the corresponding slice groupings to produce partial results 102. The inbound DST processing section 82 receives the partial results 102 via the distributed task control module 188. The inbound DST processing section 82 then processes the partial results 102 to produce a final result, or results 104. For example, if the task was to find a specific word or phrase within data, the partial results 102 indicate where in each of the prescribed portions of the data the corresponding DST execution units found the specific word or phrase. The distributed task control module 188 combines the individual partial results 102 for the corresponding portions of the data into a final result 104 for the data as a whole.

In another example of operation, the inbound DST processing section 82 is retrieving stored data from the DST execution units (i.e., the DSTN module). In this example, the DST execution units output encoded data slices 100 corresponding to the data retrieval requests. The de-grouping module 180 receives retrieved slices 100 and de-groups them to produce encoded data slices per data partition 122. The DS error decoding module 182 decodes, in accordance with DS error encoding parameters, the encoded data slices per data partition 122 to produce data partitions 120.

The data de-partitioning module 184 combines the data partitions 120 into the data 92. The control module 186 controls the conversion of retrieved slices 100 into the data 92 using control signals 190 to each of the modules. For instance, the control module 186 provides de-grouping information to the de-grouping module 180, provides the DS error encoding parameters to the DS error decoding module 182, and provides de-partitioning information to the data de-partitioning module 184.

Figure 14:
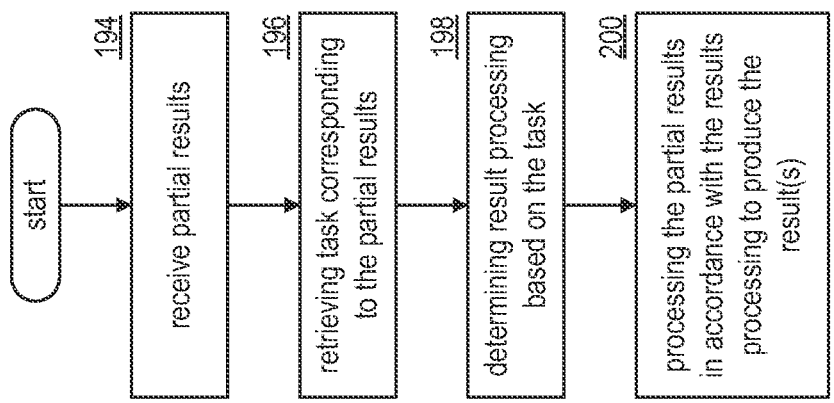
FIG. 14 is a logic diagram of an example of a method for inbound DST processing in accordance with the present invention.

FIG. 14 is a logic diagram of an example of a method that is executable by distributed storage and task (DST) client module regarding inbound DST processing. The method begins at step 194 where the DST client module receives partial results. The method continues at step 196 where the DST client module retrieves the task corresponding to the partial results. For example, the partial results include header information that identifies the requesting entity, which correlates to the requested task.

The method continues at step 198 where the DST client module determines result processing information based on the task. For example, if the task were to identify a particular word or phrase within the data, the result processing information would indicate to aggregate the partial results for the corresponding portions of the data to produce the final result. As another example, if the task were to count the occurrences of a particular word or phrase within the data, results of processing the information would indicate to add the partial results to produce the final results. The method continues at step 200 where the DST client module processes the partial results in accordance with the result processing information to produce the final result or results.

Figure 15:
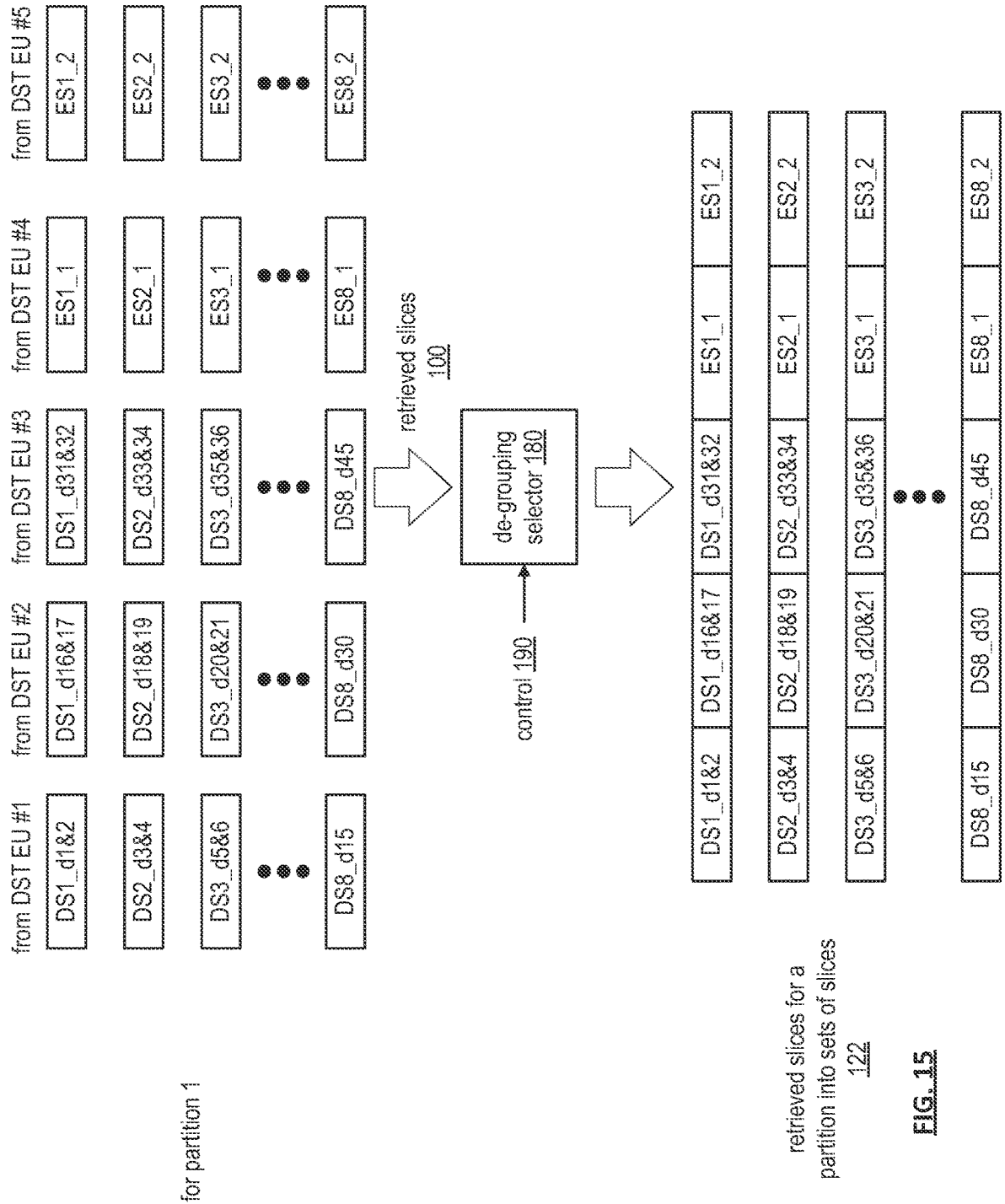
FIG. 15 is a diagram of an example of de-grouping selection processing of the inbound DST processing in accordance with the present invention.

FIG. 15 is a diagram of an example of de-grouping selection processing of an inbound distributed storage and task (DST) processing section of a DST client module. In general, this is an inverse process of the grouping module of the outbound DST processing section of FIG. 9. Accordingly, for each data partition (e.g., partition #1), the de-grouping module retrieves the corresponding slice grouping from the DST execution units (EU) (e.g., DST 1-5).

As shown, DST execution unit #1 provides a first slice grouping, which includes the first encoded slices of each of the sets of encoded slices (e.g., encoded data slices of contiguous data of data blocks 1-15); DST execution unit #2 provides a second slice grouping, which includes the second encoded slices of each of the sets of encoded slices (e.g., encoded data slices of contiguous data of data blocks 16-30); DST execution unit #3 provides a third slice grouping, which includes the third encoded slices of each of the sets of encoded slices (e.g., encoded data slices of contiguous data of data blocks 31-45); DST execution unit #4 provides a fourth slice grouping, which includes the fourth encoded slices of each of the sets of encoded slices (e.g., first encoded data slices of error coding (EC) data); and DST execution unit #5 provides a fifth slice grouping, which includes the fifth encoded slices of each of the sets of encoded slices (e.g., first encoded data slices of error coding (EC) data).

The de-grouping module de-groups the slice groupings (e.g., received slices 100) using a de-grouping selector 180 controlled by a control signal 190 as shown in the example to produce a plurality of sets of encoded data slices (e.g., retrieved slices for a partition into sets of slices 122). Each set corresponding to a data segment of the data partition.

Figure 16:
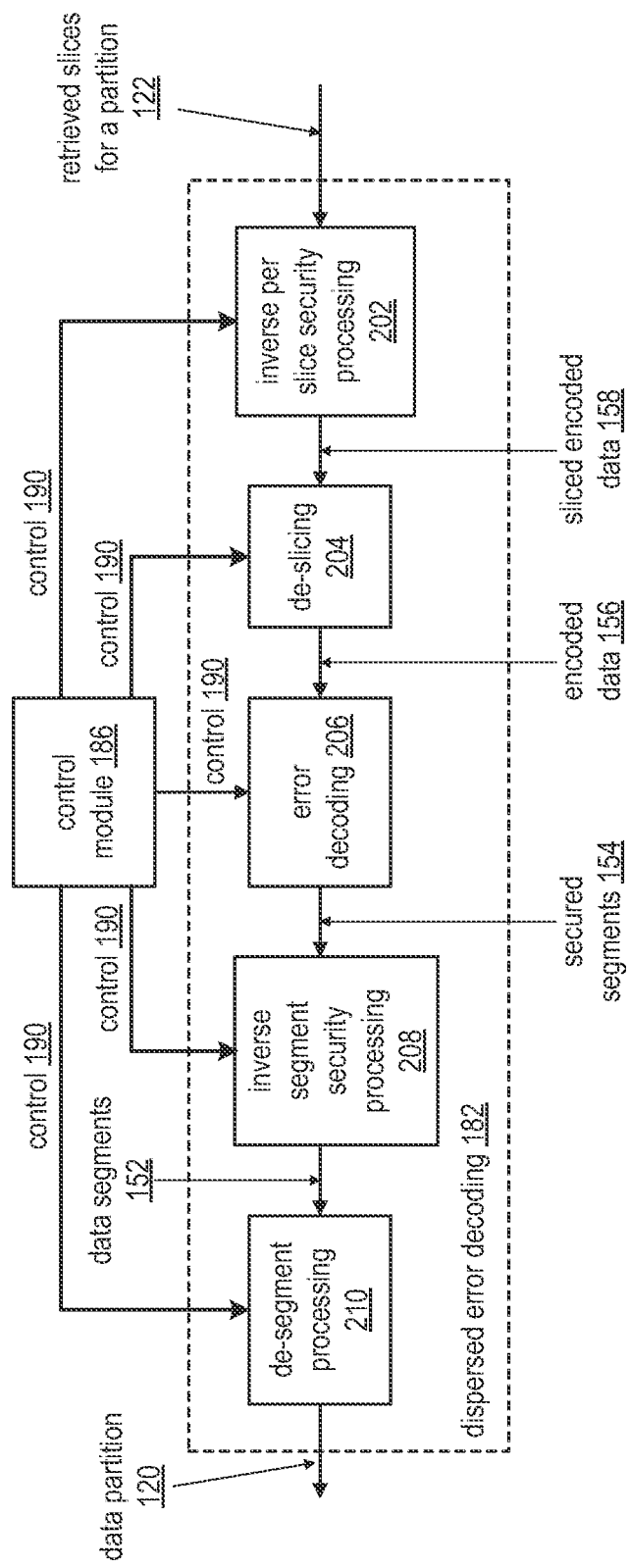
FIG. 16 is a schematic block diagram of an embodiment of a dispersed error decoding in accordance with the present invention.

FIG. 16 is a schematic block diagram of an embodiment of a dispersed storage (DS) error decoding module 182 of an inbound distributed storage and task (DST) processing section. The DS error decoding module 182 includes an inverse per slice security processing module 202, a de-slicing module 204, an error decoding module 206, an inverse segment security module 208, a de-segmenting processing module 210, and a control module 186.

In an example of operation, the inverse per slice security processing module 202, when enabled by the control module 186, unsecures each encoded data slice 122 based on slice de-security information received as control information 190 (e.g., the compliment of the slice security information discussed with reference to FIG. 6) received from the control module 186. The slice security information includes data decompression, decryption, de-watermarking, integrity check (e.g., CRC verification, etc.), and/or any other type of digital security. For example, when the inverse per slice security processing module 202 is enabled, it verifies integrity information (e.g., a CRC value) of each encoded data slice 122, it decrypts each verified encoded data slice, and decompresses each decrypted encoded data slice to produce slice encoded data 158. When the inverse per slice security processing module 202 is not enabled, it passes the encoded data slices 122 as the sliced encoded data 158 or is bypassed such that the retrieved encoded data slices 122 are provided as the sliced encoded data 158.

The de-slicing module 204 de-slices the sliced encoded data 158 into encoded data segments 156 in accordance with a pillar width of the error correction encoding parameters received as control information 190 from the control module 186. For example, if the pillar width is five, the de-slicing module 204 de-slices a set of five encoded data slices into an encoded data segment 156. The error decoding module 206 decodes the encoded data segments 156 in accordance with error correction decoding parameters received as control information 190 from the control module 186 to produce secure data segments 154. The error correction decoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction decoding parameters identify a specific error correction encoding scheme, specify a pillar width of five, and specify a decode threshold of three.

The inverse segment security processing module 208, when enabled by the control module 186, unsecures the secured data segments 154 based on segment security information received as control information 190 from the control module 186. The segment security information includes data decompression, decryption, de-watermarking, integrity check (e.g., CRC, etc.) verification, and/or any other type of digital security. For example, when the inverse segment security processing module 208 is enabled, it verifies integrity information (e.g., a CRC value) of each secure data segment 154, it decrypts each verified secured data segment, and decompresses each decrypted secure data segment to produce a data segment 152. When the inverse segment security processing module 208 is not enabled, it passes the decoded data segment 154 as the data segment 152 or is bypassed.

The de-segment processing module 210 receives the data segments 152 and receives de-segmenting information as control information 190 from the control module 186. The de-segmenting information indicates how the de-segment processing module 210 is to de-segment the data segments 152 into a data partition 120. For example, the de-segmenting information indicates how the rows and columns of data segments are to be rearranged to yield the data partition 120.

Figure 17:
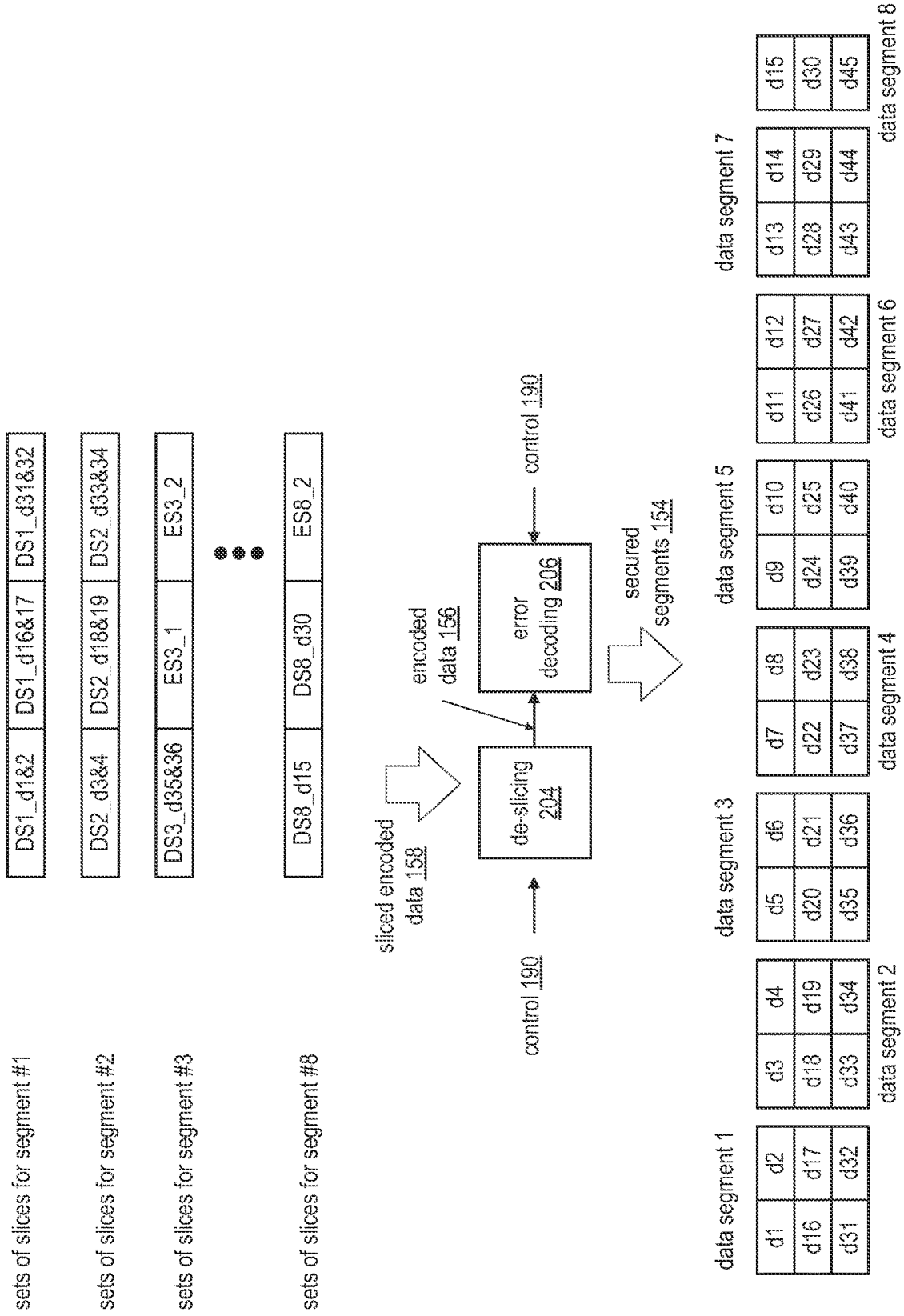
FIG. 17 is a diagram of an example of de-slicing and error decoding processing of the dispersed error decoding in accordance with the present invention.

FIG. 17 is a diagram of an example of de-slicing and error decoding processing of a dispersed error decoding module. A de-slicing module 204 receives at least a decode threshold number of encoded data slices 158 for each data segment in accordance with control information 190 and provides encoded data 156. In this example, a decode threshold is three. As such, each set of encoded data slices 158 is shown to have three encoded data slices per data segment. The de-slicing module 204 may receive three encoded data slices per data segment because an associated distributed storage and task (DST) client module requested retrieving only three encoded data slices per segment or selected three of the retrieved encoded data slices per data segment. As shown, which is based on the unity matrix encoding previously discussed with reference to FIG. 8, an encoded data slice may be a data-based encoded data slice (e.g., DS1_$d$1&$d$2) or an error code based encoded data slice (e.g., ES3_1).

An error decoding module 206 decodes the encoded data 156 of each data segment in accordance with the error correction decoding parameters of control information 190 to produce secured segments 154. In this example, data segment 1 includes 3 rows with each row being treated as one word for encoding. As such, data segment 1 includes three words: word 1 including data blocks d1 and d2, word 2 including data blocks d16 and d17, and word 3 including data blocks d31 and d32. Each of data segments 2-7 includes three words where each word includes two data blocks. Data segment 8 includes three words where each word includes a single data block (e.g., d15, d30, and d45).

Figure 18:
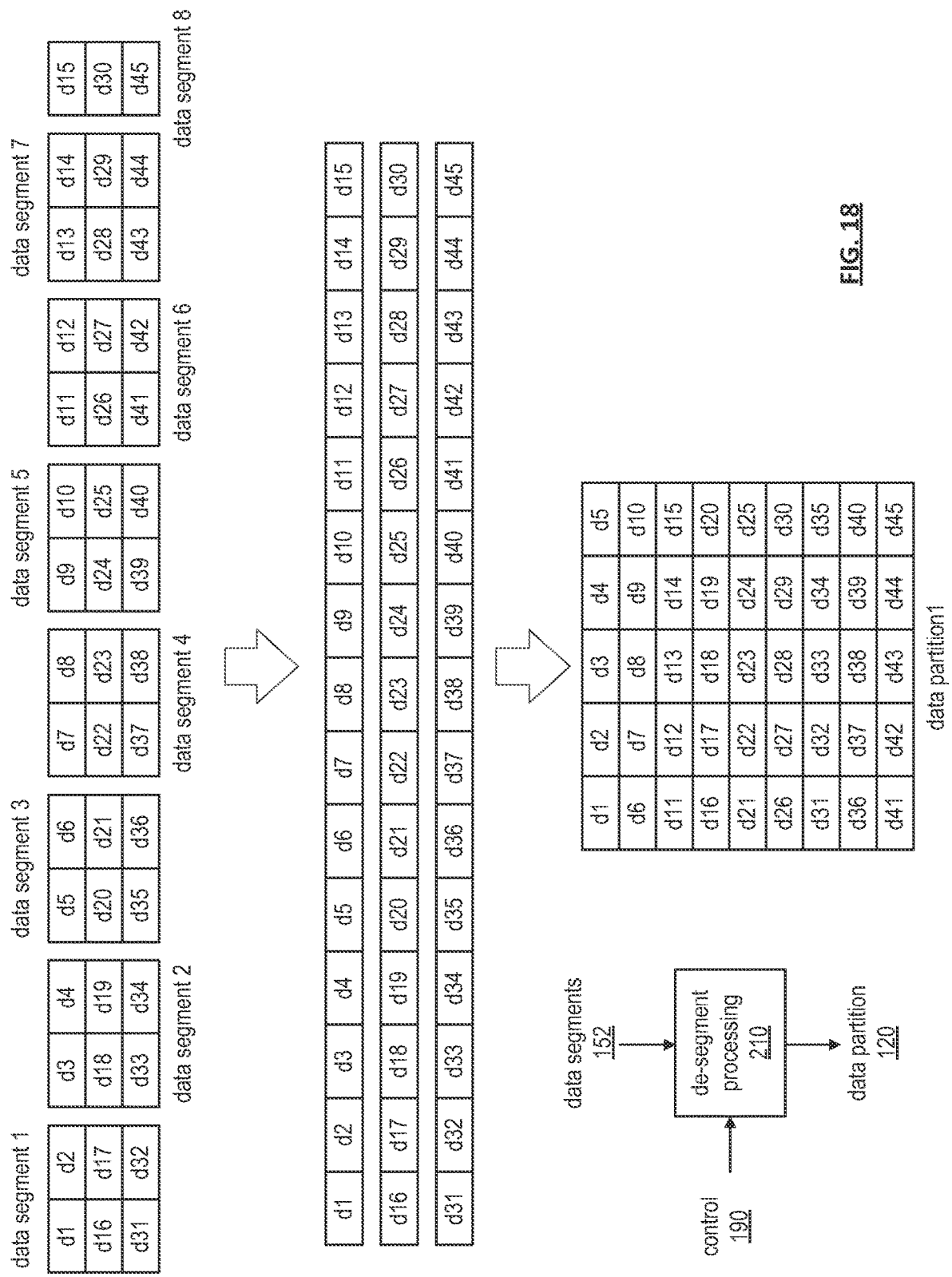
FIG. 18 is a diagram of an example of a de-segment processing of the dispersed error decoding in accordance with the present invention.

FIG. 18 is a diagram of an example of de-segment processing of an inbound distributed storage and task (DST) processing. In this example, a de-segment processing module 210 receives data segments 152 (e.g., 1-8) and rearranges the data blocks of the data segments into rows and columns in accordance with de-segmenting information of control information 190 to produce a data partition 120. Note that the number of rows is based on the decode threshold (e.g., 3 in this specific example) and the number of columns is based on the number and size of the data blocks.

The de-segmenting module 210 converts the rows and columns of data blocks into the data partition 120. Note that each data block may be of the same size as other data blocks or of a different size. In addition, the size of each data block may be a few bytes to megabytes of data.

Figure 19:
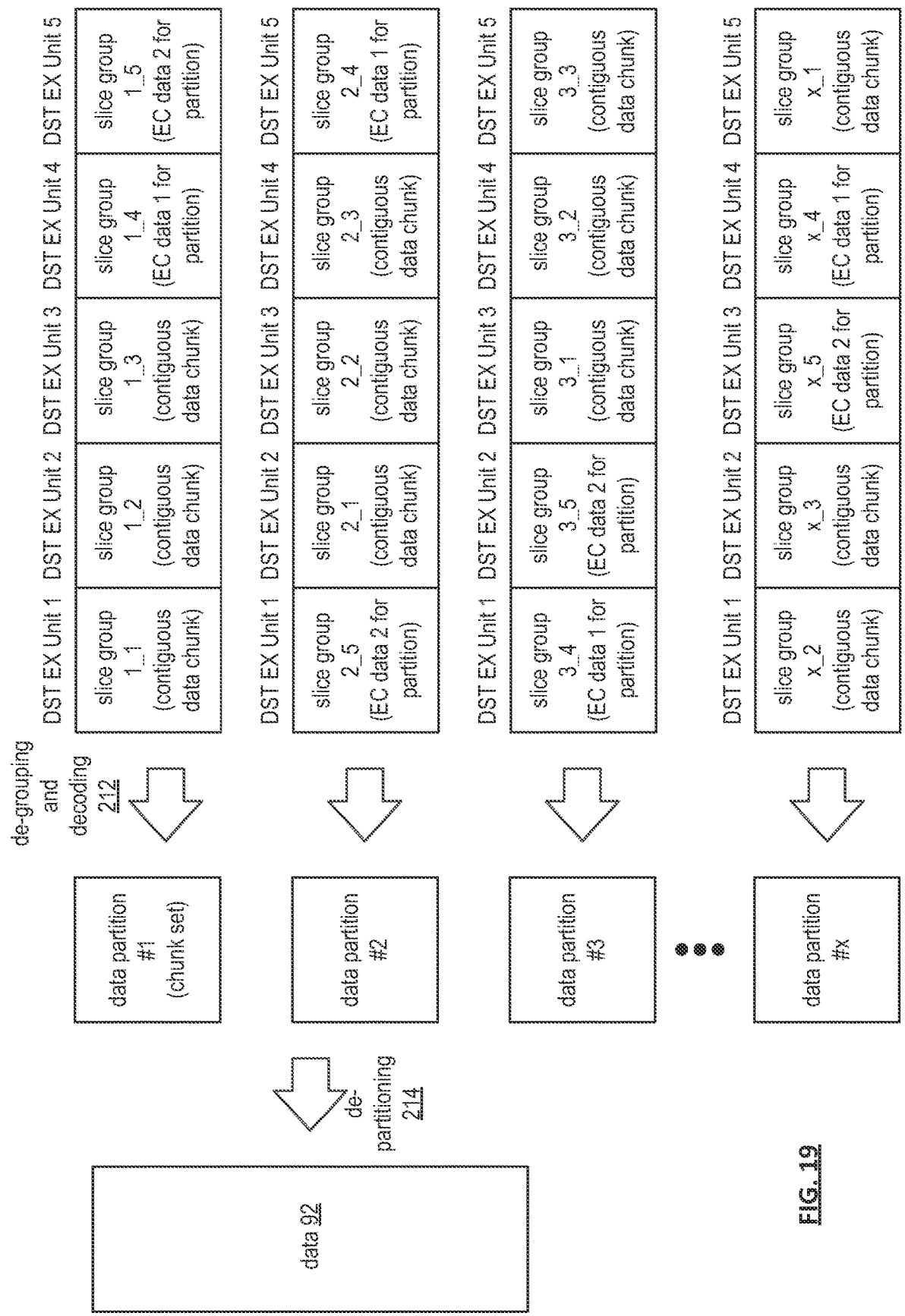
FIG. 19 is a diagram of an example of converting slice groups into data in accordance with the present invention.

FIG. 19 is a diagram of an example of converting slice groups into data 92 within an inbound distributed storage and task (DST) processing section. As shown, the data 92 is reconstructed from a plurality of data partitions (1-x, where x is an integer greater than 4). Each data partition (or chunk set of data) is decoded and re-grouped using a de-grouping and decoding function 212 and a de-partition function 214 from slice groupings as previously discussed. For a given data partition, the slice groupings (e.g., at least a decode threshold per data segment of encoded data slices) are received from DST execution units. From data partition to data partition, the ordering of the slice groupings received from the DST execution units may vary as discussed with reference to FIG. 10.

Figure 20:
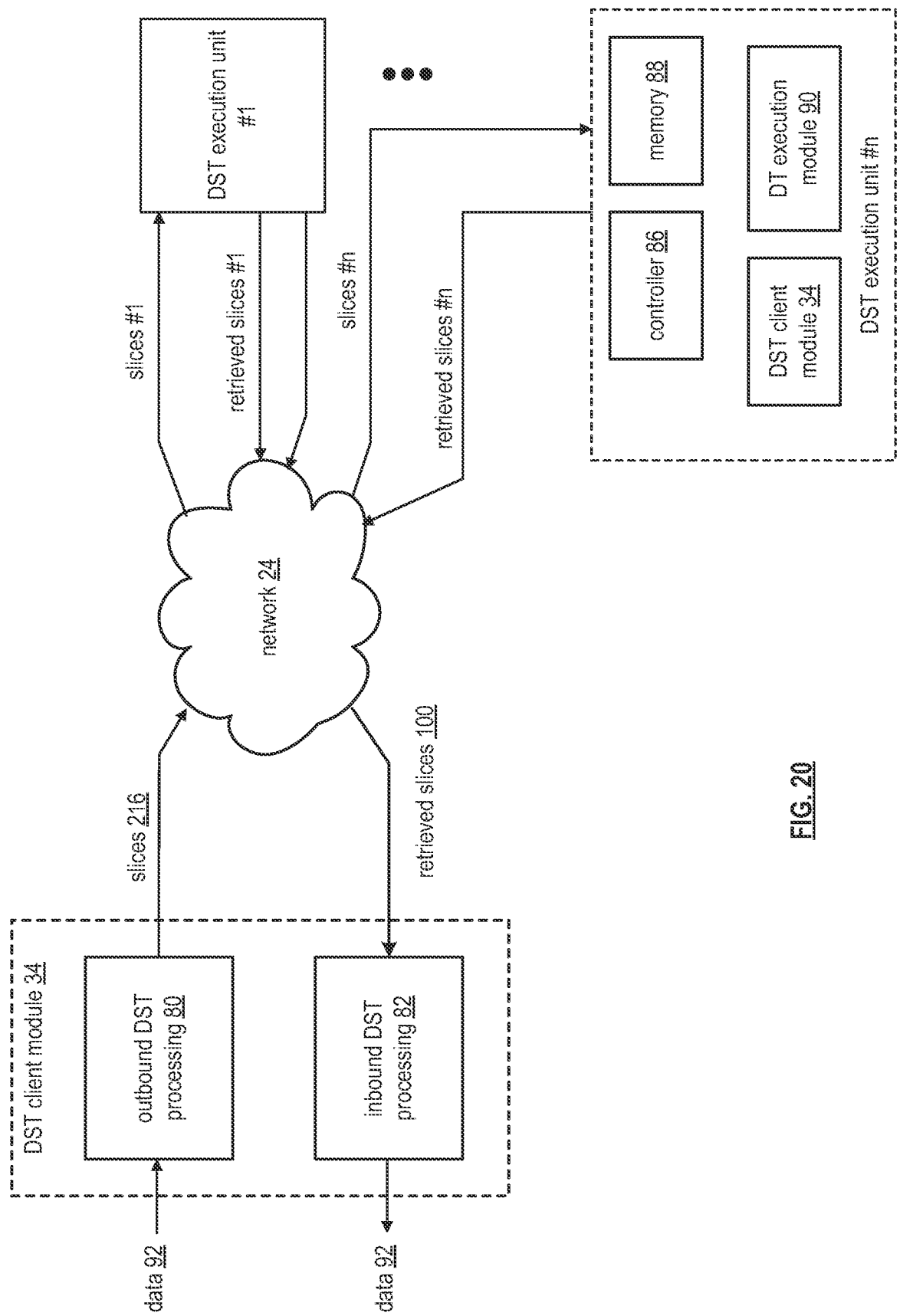
FIG. 20 is a diagram of an example of a distributed storage within the distributed computing system in accordance with the present invention.

FIG. 20 is a diagram of an example of a distributed storage and/or retrieval within the distributed computing system. The distributed computing system includes a plurality of distributed storage and/or task (DST) processing client modules 34 (one shown) coupled to a distributed storage and/or task processing network (DSTN) module, or multiple DSTN modules, via a network 24. The DST client module 34 includes an outbound DST processing section 80 and an inbound DST processing section 82. The DSTN module includes a plurality of DST execution units. Each DST execution unit includes a controller 86, memory 88, one or more distributed task (DT) execution modules 90, and a DST client module 34.

In an example of data storage, the DST client module 34 has data 92 that it desires to store in the DSTN module. The data 92 may be a file (e.g., video, audio, text, graphics, etc.), a data object, a data block, an update to a file, an update to a data block, etc. In this instance, the outbound DST processing module 80 converts the data 92 into encoded data slices 216 as will be further described with reference to FIGS. 21-23. The outbound DST processing module 80 sends, via the network 24, to the DST execution units for storage as further described with reference to FIG. 24.

In an example of data retrieval, the DST client module 34 issues a retrieve request to the DST execution units for the desired data 92. The retrieve request may address each DST executions units storing encoded data slices of the desired data, address a decode threshold number of DST execution units, address a read threshold number of DST execution units, or address some other number of DST execution units. In response to the request, each addressed DST execution unit retrieves its encoded data slices 100 of the desired data and sends them to the inbound DST processing section 82, via the network 24.

When, for each data segment, the inbound DST processing section 82 receives at least a decode threshold number of encoded data slices 100, it converts the encoded data slices 100 into a data segment. The inbound DST processing section 82 aggregates the data segments to produce the retrieved data 92.

Figure 21:
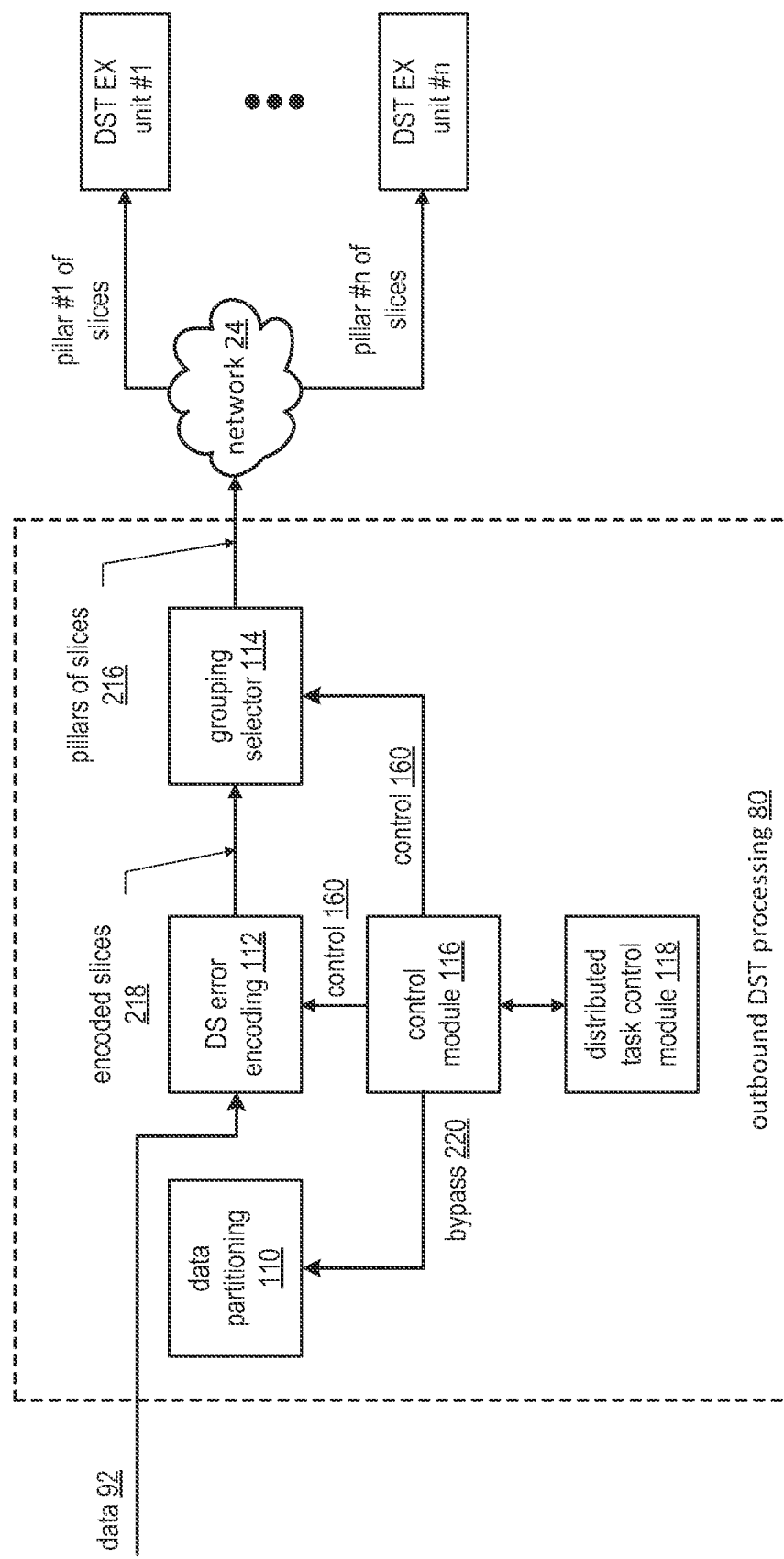
FIG. 21 is a schematic block diagram of an example of operation of outbound distributed storage and/or task (DST) processing for storing data in accordance with the present invention.

FIG. 21 is a schematic block diagram of an embodiment of an outbound distributed storage and/or task (DST) processing section 80 of a DST client module coupled to a distributed storage and task network (DSTN) module (e.g., a plurality of DST execution units) via a network 24. The outbound DST processing section 80 includes a data partitioning module 110, a dispersed storage (DS) error encoding module 112, a grouping selector module 114, a control module 116, and a distributed task control module 118.

In an example of operation, the data partitioning module 110 is by-passed such that data 92 is provided directly to the DS error encoding module 112. The control module 116 coordinates the by-passing of the data partitioning module 110 by outputting a bypass 220 message to the data partitioning module 110.

The DS error encoding module 112 receives the data 92 in a serial manner, a parallel manner, and/or a combination thereof. The DS error encoding module 112 DS error encodes the data in accordance with control information 160 from the control module 116 to produce encoded data slices 218. The DS error encoding includes segmenting the data 92 into data segments, segment security processing (e.g., encryption, compression, watermarking, integrity check (e.g., CRC, etc.)), error encoding, slicing, and/or per slice security processing (e.g., encryption, compression, watermarking, integrity check (e.g., CRC, etc.)). The control information 160 indicates which steps of the DS error encoding are active for the data 92 and, for active steps, indicates the parameters for the step. For example, the control information 160 indicates that the error encoding is active and includes error encoding parameters (e.g., pillar width, decode threshold, write threshold, read threshold, type of error encoding, etc.).

The grouping selector module 114 groups the encoded slices 218 of the data segments into pillars of slices 216. The number of pillars corresponds to the pillar width of the DS error encoding parameters. In this example, the distributed task control module 118 facilitates the storage request.

Figure 22:
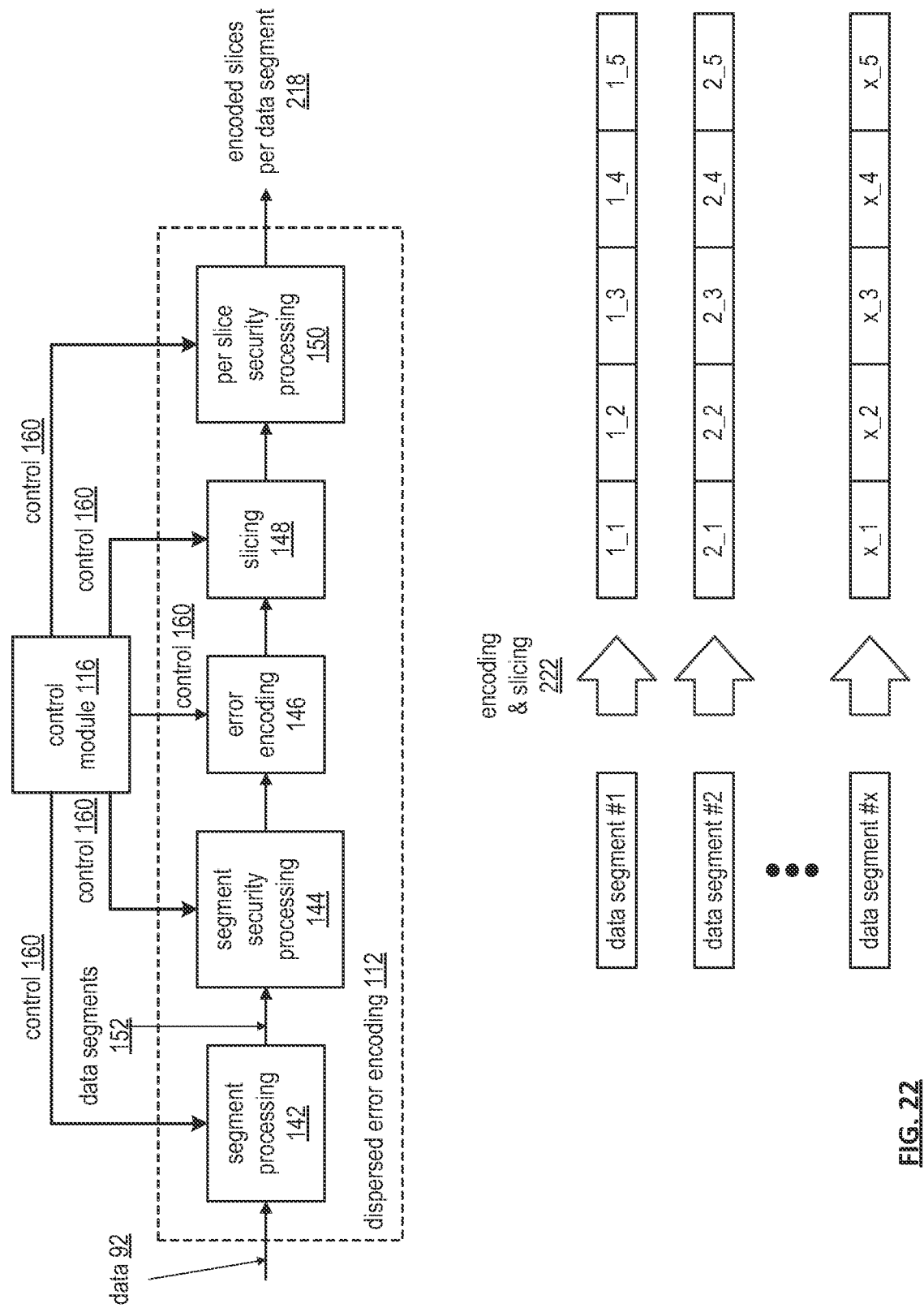
FIG. 22 is a schematic block diagram of an example of a dispersed error encoding for the example of FIG. 21 in accordance with the present invention.

FIG. 22 is a schematic block diagram of an example of a dispersed storage (DS) error encoding module 112 for the example of FIG. 21. The DS error encoding module 112 includes a segment processing module 142, a segment security processing module 144, an error encoding module 146, a slicing module 148, and a per slice security processing module 150. Each of these modules is coupled to a control module 116 to receive control information 160 therefrom.

In an example of operation, the segment processing module 142 receives data 92 and receives segmenting information as control information 160 from the control module 116. The segmenting information indicates how the segment processing module is to segment the data. For example, the segmenting information indicates the size of each data segment. The segment processing module 142 segments the data 92 into data segments 152 in accordance with the segmenting information.

The segment security processing module 144, when enabled by the control module 116, secures the data segments 152 based on segment security information received as control information 160 from the control module 116. The segment security information includes data compression, encryption, watermarking, integrity check (e.g., CRC, etc.), and/or any other type of digital security. For example, when the segment security processing module 144 is enabled, it compresses a data segment 152, encrypts the compressed data segment, and generates a CRC value for the encrypted data segment to produce a secure data segment. When the segment security processing module 144 is not enabled, it passes the data segments 152 to the error encoding module 146 or is bypassed such that the data segments 152 are provided to the error encoding module 146.

The error encoding module 146 encodes the secure data segments in accordance with error correction encoding parameters received as control information 160 from the control module 116. The error correction encoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction encoding parameters identify a specific error correction encoding scheme, specifies a pillar width of five, and specifies a decode threshold of three. From these parameters, the error encoding module 146 encodes a data segment to produce an encoded data segment.

The slicing module 148 slices the encoded data segment in accordance with a pillar width of the error correction encoding parameters. For example, if the pillar width is five, the slicing module slices an encoded data segment into a set of five encoded data slices. As such, for a plurality of data segments, the slicing module 148 outputs a plurality of sets of encoded data slices as shown within encoding and slicing function 222 as described.

The per slice security processing module 150, when enabled by the control module 116, secures each encoded data slice based on slice security information received as control information 160 from the control module 116. The slice security information includes data compression, encryption, watermarking, integrity check (e.g., CRC, etc.), and/or any other type of digital security. For example, when the per slice security processing module 150 is enabled, it may compress an encoded data slice, encrypt the compressed encoded data slice, and generate a CRC value for the encrypted encoded data slice to produce a secure encoded data slice tweaking. When the per slice security processing module 150 is not enabled, it passes the encoded data slices or is bypassed such that the encoded data slices 218 are the output of the DS error encoding module 112.

Figure 23:
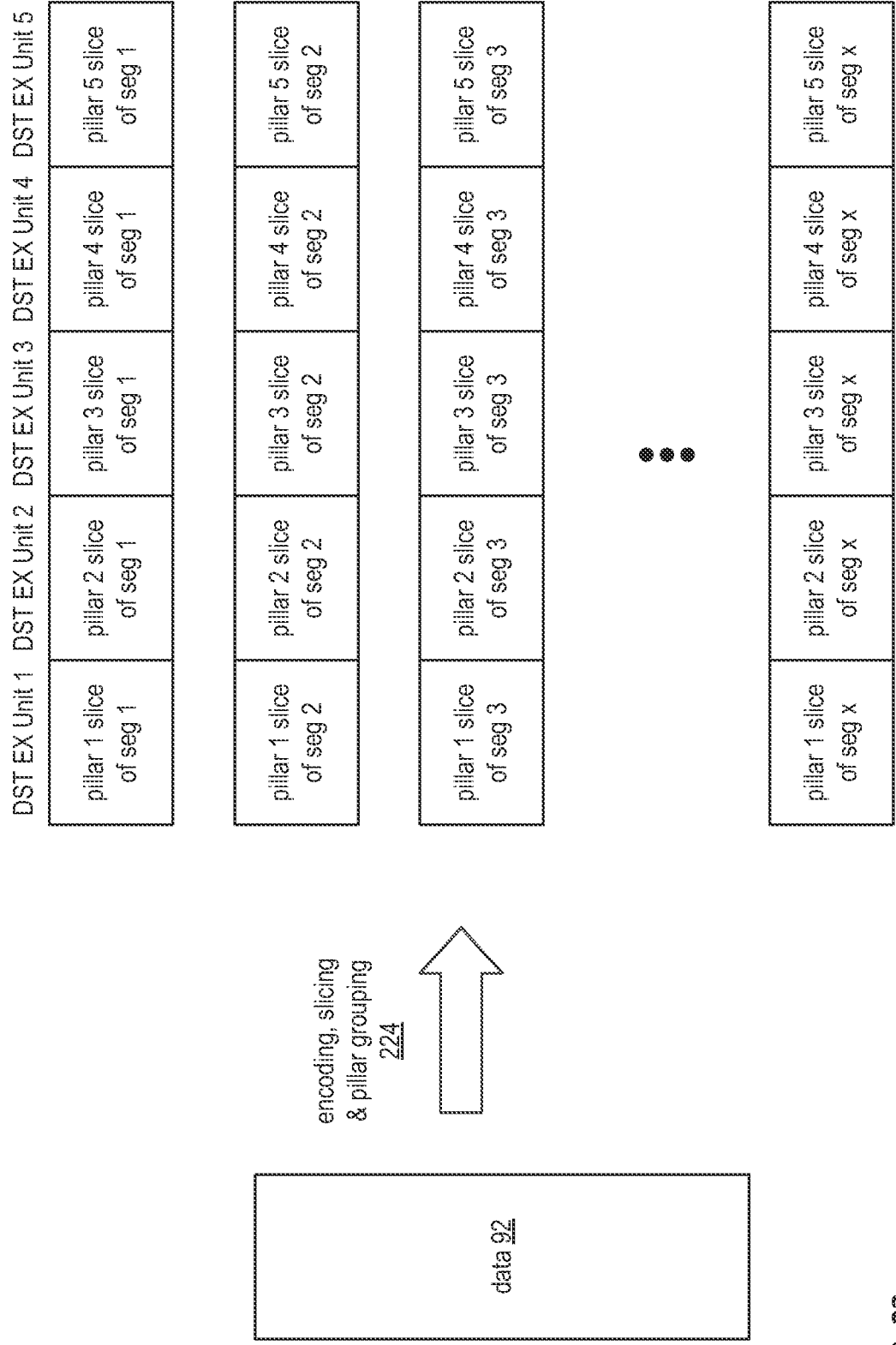
FIG. 23 is a diagram of an example of converting data into pillar slice groups for storage in accordance with the present invention.

FIG. 23 is a diagram of an example of converting data 92 into pillar slice groups utilizing encoding, slicing and pillar grouping function 224 for storage in memory of a distributed storage and task network (DSTN) module. As previously discussed the data 92 is encoded and sliced into a plurality of sets of encoded data slices; one set per data segment. The grouping selector module organizes the sets of encoded data slices into pillars of data slices. In this example, the DS error encoding parameters include a pillar width of 5 and a decode threshold of 3. As such, for each data segment, 5 encoded data slices are created.

The grouping selector module takes the first encoded data slice of each of the sets and forms a first pillar, which may be sent to the first DST execution unit. Similarly, the grouping selector module creates the second pillar from the second slices of the sets; the third pillar from the third slices of the sets; the fourth pillar from the fourth slices of the sets; and the fifth pillar from the fifth slices of the set.

Figure 24:
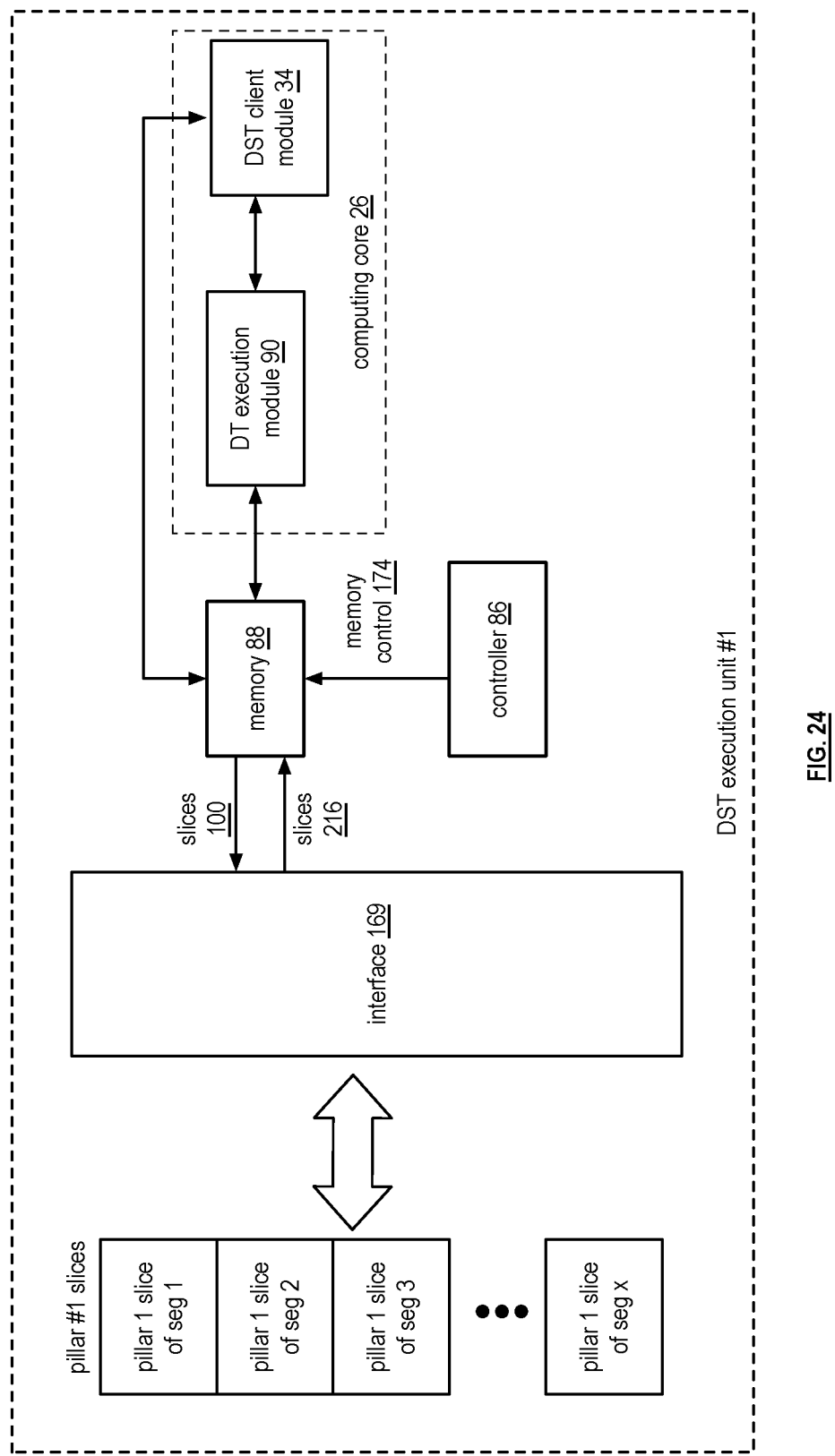
FIG. 24 is a schematic block diagram of an example of a storage operation of a DST execution unit in accordance with the present invention.

FIG. 24 is a schematic block diagram of an embodiment of a distributed storage and/or task (DST) execution unit that includes an interface 169, a controller 86, memory 88, one or more distributed task (DT) execution modules 90, and a DST client module 34. A computing core 26 may be utilized to implement the one or more DT execution modules 90 and the DST client module 34. The memory 88 is of sufficient size to store a significant number of encoded data slices (e.g., thousands of slices to hundreds-of-millions of slices) and may include one or more hard drives and/or one or more solid-state memory devices (e.g., flash memory, DRAM, etc.).

In an example of storing a pillar of slices 216, the DST execution unit receives, via interface 169, a pillar of slices 216 (e.g., pillar #1 slices). The memory 88 stores the encoded data slices 216 of the pillar of slices in accordance with memory control information 174 it receives from the controller 86. The controller 86 (e.g., a processing module, a CPU, etc.) generates the memory control information 174 based on distributed storage information (e.g., user information (e.g., user ID, distributed storage permissions, data access permission, etc.), vault information (e.g., virtual memory assigned to user, user group, etc.), etc.). Similarly, when retrieving slices, the DST execution unit receives, via interface 169, a slice retrieval request. The memory 88 retrieves the slice in accordance with memory control information 174 it receives from the controller 86. The memory 88 outputs the slice 100, via the interface 169, to a requesting entity.

Figure 25:
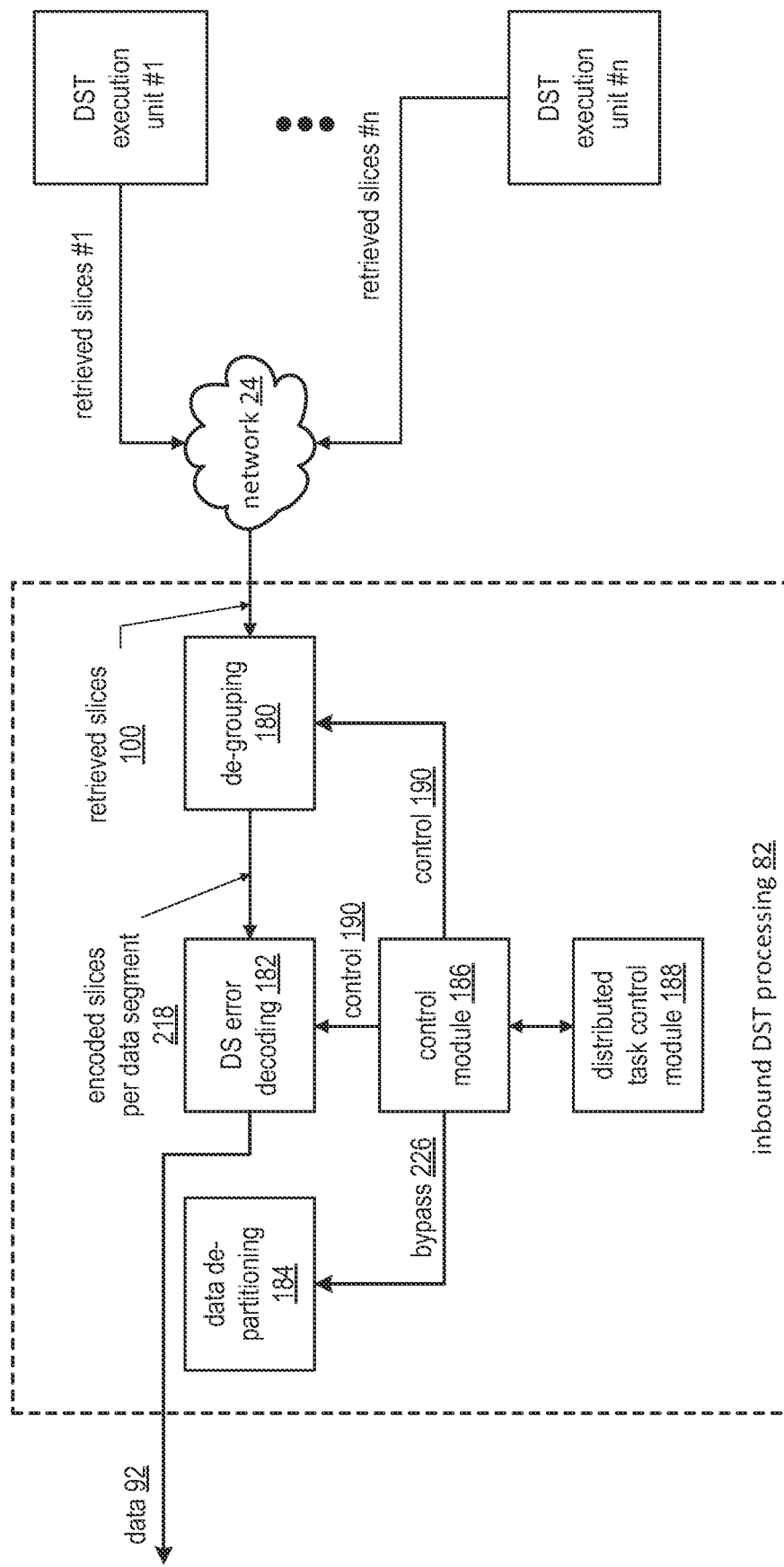
FIG. 25 is a schematic block diagram of an example of operation of inbound distributed storage and/or task (DST) processing for retrieving dispersed error encoded data in accordance with the present invention.

FIG. 25 is a schematic block diagram of an example of operation of an inbound distributed storage and/or task (DST) processing section 82 for retrieving dispersed error encoded data 92. The inbound DST processing section 82 includes a de-grouping module 180, a dispersed storage (DS) error decoding module 182, a data de-partitioning module 184, a control module 186, and a distributed task control module 188. Note that the control module 186 and/or the distributed task control module 188 may be separate modules from corresponding ones of an outbound DST processing section or may be the same modules.

In an example of operation, the inbound DST processing section 82 is retrieving stored data 92 from the DST execution units (i.e., the DSTN module). In this example, the DST execution units output encoded data slices corresponding to data retrieval requests from the distributed task control module 188. The de-grouping module 180 receives pillars of slices 100 and de-groups them in accordance with control information 190 from the control module 186 to produce sets of encoded data slices 218. The DS error decoding module 182 decodes, in accordance with the DS error encoding parameters received as control information 190 from the control module 186, each set of encoded data slices 218 to produce data segments, which are aggregated into retrieved data 92. The data de-partitioning module 184 is by-passed in this operational mode via a bypass signal 226 of control information 190 from the control module 186.

Figure 26:
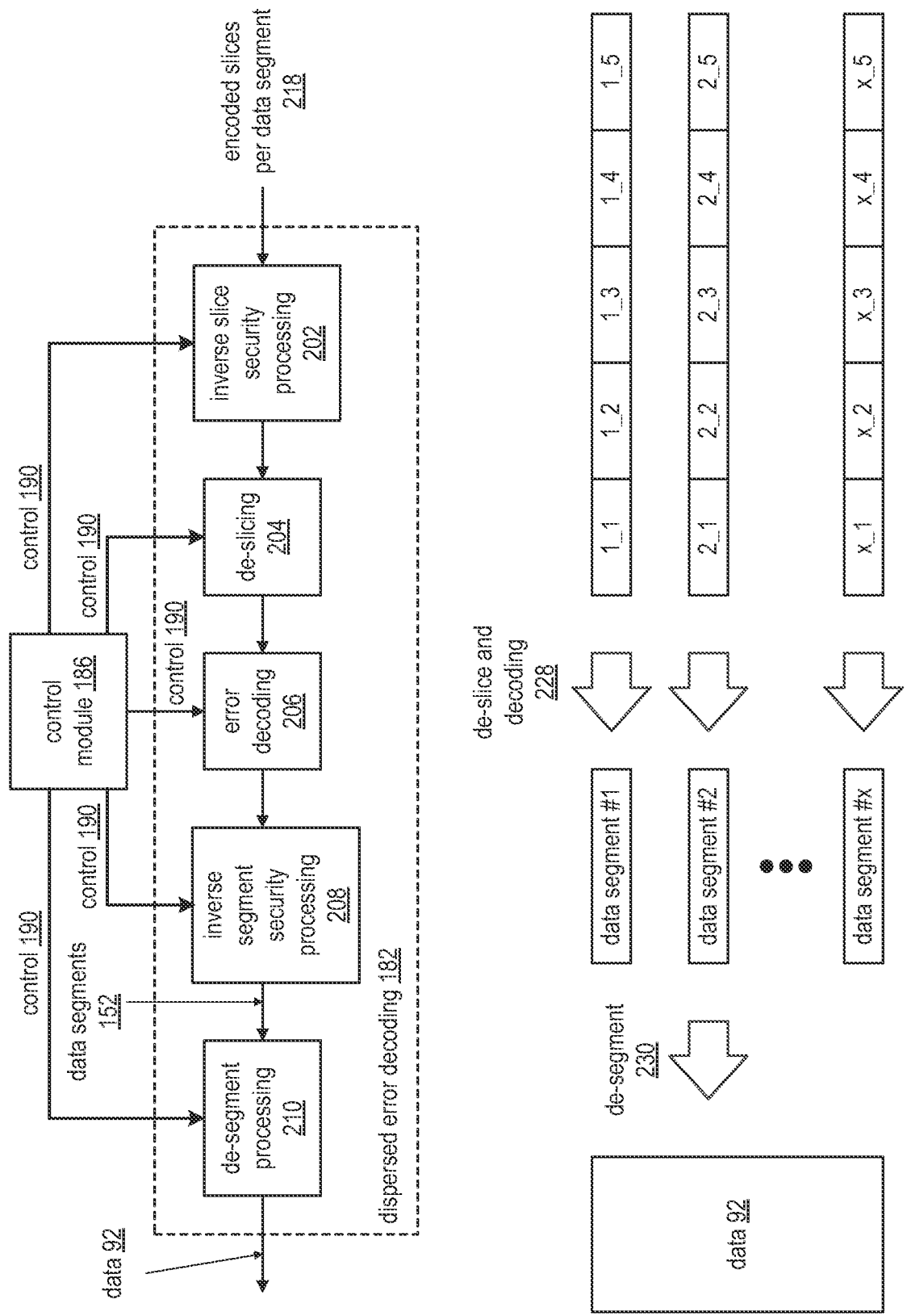
FIG. 26 is a schematic block diagram of an example of a dispersed error decoding for the example of FIG. 25 in accordance with the present invention.

FIG. 26 is a schematic block diagram of an embodiment of a dispersed storage (DS) error decoding module 182 of an inbound distributed storage and task (DST) processing section. The DS error decoding module 182 includes an inverse per slice security processing module 202, a de-slicing module 204, an error decoding module 206, an inverse segment security module 208, and a de-segmenting processing module 210. The dispersed error decoding module 182 is operable to de-slice and decode encoded slices per data segment 218 utilizing a de-slicing and decoding function 228 to produce a plurality of data segments that are de-segmented utilizing a de-segment function 230 to recover data 92.

In an example of operation, the inverse per slice security processing module 202, when enabled by the control module 186 via control information 190, unsecures each encoded data slice 218 based on slice de-security information (e.g., the compliment of the slice security information discussed with reference to FIG. 6) received as control information 190 from the control module 186. The slice de-security information includes data decompression, decryption, de-watermarking, integrity check (e.g., CRC verification, etc.), and/or any other type of digital security. For example, when the inverse per slice security processing module 202 is enabled, it verifies integrity information (e.g., a CRC value) of each encoded data slice 218, it decrypts each verified encoded data slice, and decompresses each decrypted encoded data slice to produce slice encoded data. When the inverse per slice security processing module 202 is not enabled, it passes the encoded data slices 218 as the sliced encoded data or is bypassed such that the retrieved encoded data slices 218 are provided as the sliced encoded data.

The de-slicing module 204 de-slices the sliced encoded data into encoded data segments in accordance with a pillar width of the error correction encoding parameters received as control information 190 from a control module 186. For example, if the pillar width is five, the de-slicing module de-slices a set of five encoded data slices into an encoded data segment. Alternatively, the encoded data segment may include just three encoded data slices (e.g., when the decode threshold is 3).

The error decoding module 206 decodes the encoded data segments in accordance with error correction decoding parameters received as control information 190 from the control module 186 to produce secure data segments. The error correction decoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction decoding parameters identify a specific error correction encoding scheme, specify a pillar width of five, and specify a decode threshold of three.

The inverse segment security processing module 208, when enabled by the control module 186, unsecures the secured data segments based on segment security information received as control information 190 from the control module 186. The segment security information includes data decompression, decryption, de-watermarking, integrity check (e.g., CRC, etc.) verification, and/or any other type of digital security. For example, when the inverse segment security processing module is enabled, it verifies integrity information (e.g., a CRC value) of each secure data segment, it decrypts each verified secured data segment, and decompresses each decrypted secure data segment to produce a data segment 152. When the inverse segment security processing module 208 is not enabled, it passes the decoded data segment 152 as the data segment or is bypassed. The de-segmenting processing module 210 aggregates the data segments 152 into the data 92 in accordance with control information 190 from the control module 186.

Figure 27:
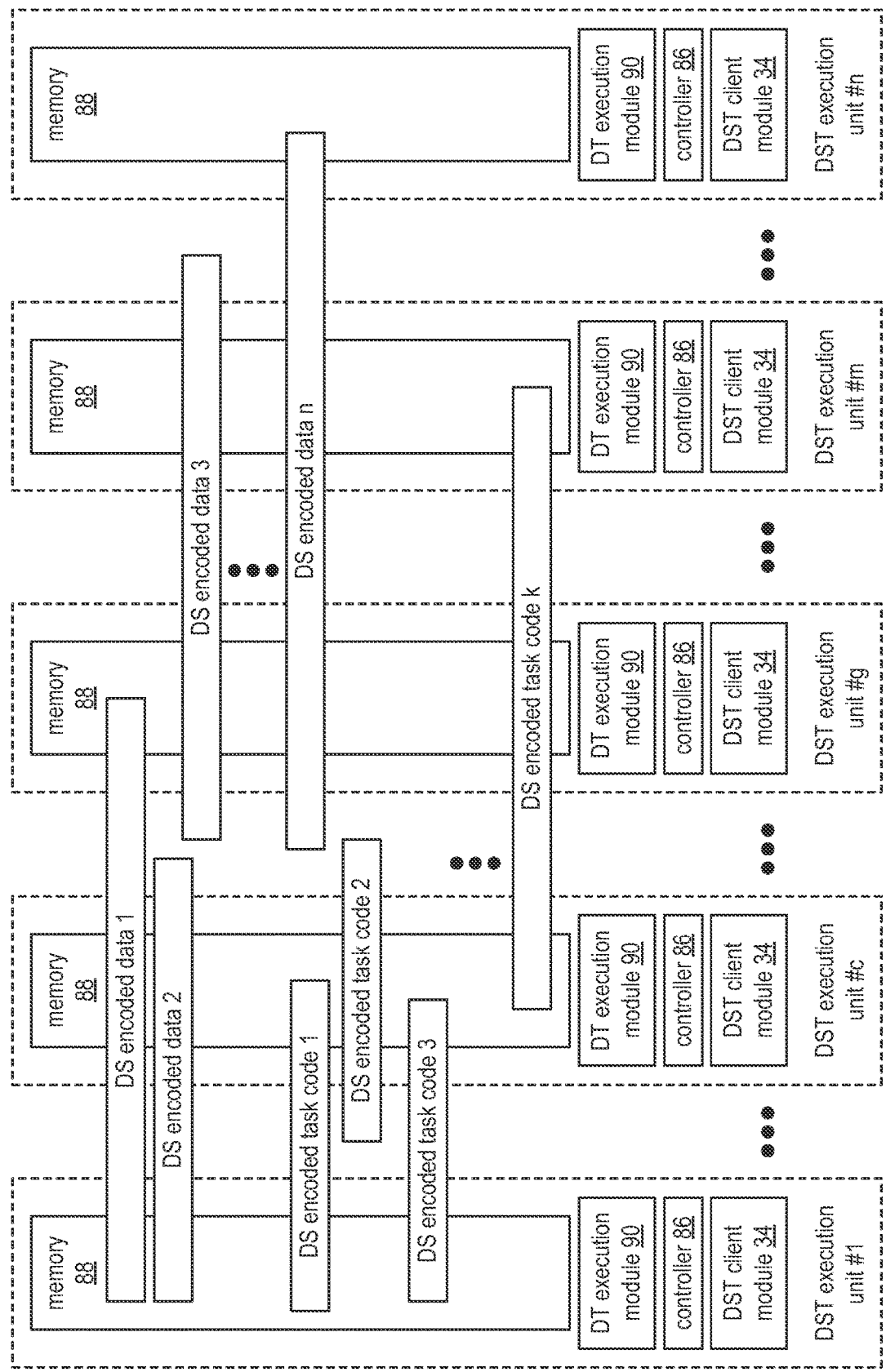
FIG. 27 is a schematic block diagram of an example of a distributed storage and task processing network (DSTN) module storing a plurality of data and a plurality of task codes in accordance with the present invention.

FIG. 27 is a schematic block diagram of an example of a distributed storage and task processing network (DSTN) module that includes a plurality of distributed storage and task (DST) execution units (#1 through #n, where, for example, n is an integer greater than or equal to three). Each of the DST execution units includes a DST client module 34, a controller 86, one or more DT (distributed task) execution modules 90, and memory 88.

In this example, the DSTN module stores, in the memory of the DST execution units, a plurality of DS (dispersed storage) encoded data (e.g., 1 through n, where n is an integer greater than or equal to two) and stores a plurality of DS encoded task codes (e.g., 1 through k, where k is an integer greater than or equal to two). The DS encoded data may be encoded in accordance with one or more examples described with reference to FIGS. 3-19 (e.g., organized in slice groupings) or encoded in accordance with one or more examples described with reference to FIGS. 20-26 (e.g., organized in pillar groups). The data that is encoded into the DS encoded data may be of any size and/or of any content. For example, the data may be one or more digital books, a copy of a company's emails, a large-scale Internet search, a video security file, one or more entertainment video files (e.g., television programs, movies, etc.), data files, and/or any other large amount of data (e.g., greater than a few Terabytes).

The tasks that are encoded into the DS encoded task code may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc. The tasks may be encoded into the DS encoded task code in accordance with one or more examples described with reference to FIGS. 3-19 (e.g., organized in slice groupings) or encoded in accordance with one or more examples described with reference to FIGS. 20-26 (e.g., organized in pillar groups).

In an example of operation, a DST client module of a user device or of a DST processing unit issues a DST request to the DSTN module. The DST request may include a request to retrieve stored data, or a portion thereof, may include a request to store data that is included with the DST request, may include a request to perform one or more tasks on stored data, may include a request to perform one or more tasks on data included with the DST request, etc. In the cases where the DST request includes a request to store data or to retrieve data, the client module and/or the DSTN module processes the request as previously discussed with reference to one or more of FIGS. 3-19 (e.g., slice groupings) and/or 20-26 (e.g., pillar groupings). In the case where the DST request includes a request to perform one or more tasks on data included with the DST request, the DST client module and/or the DSTN module process the DST request as previously discussed with reference to one or more of FIGS. 3-19.

In the case where the DST request includes a request to perform one or more tasks on stored data, the DST client module and/or the DSTN module processes the DST request as will be described with reference to one or more of FIGS. 28-39. In general, the DST client module identifies data and one or more tasks for the DSTN module to execute upon the identified data. The DST request may be for a one-time execution of the task or for an on-going execution of the task. As an example of the latter, as a company generates daily emails, the DST request may be to daily search new emails for inappropriate content and, if found, record the content, the email sender(s), the email recipient(s), email routing information, notify human resources of the identified email, etc.

Figure 28:
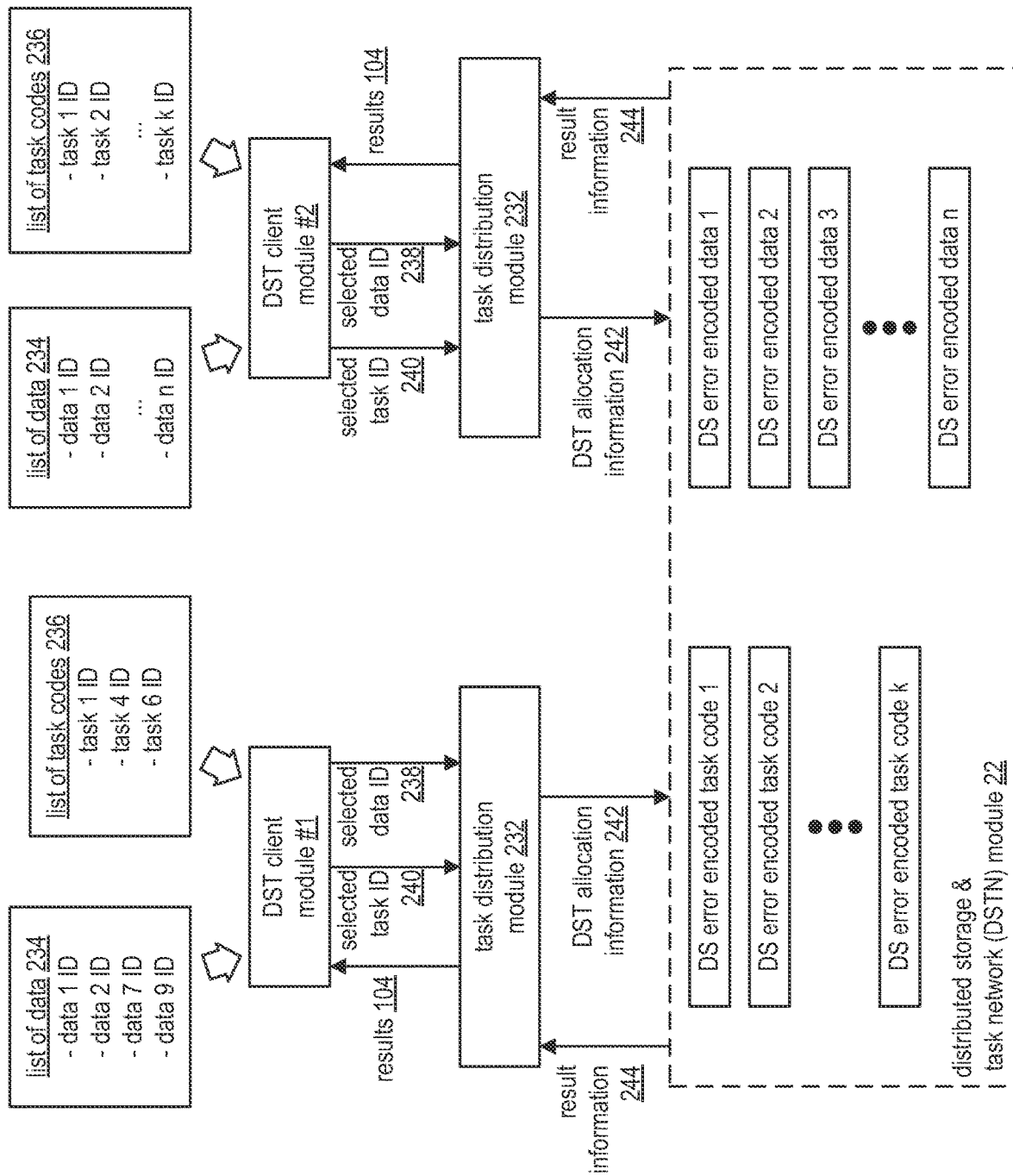
FIG. 28 is a schematic block diagram of an example of the distributed computing system performing tasks on stored data in accordance with the present invention.

FIG. 28 is a schematic block diagram of an example of a distributed computing system performing tasks on stored data. In this example, two distributed storage and task (DST) client modules 1-2 are shown: the first may be associated with a user device and the second may be associated with a DST processing unit or a high priority user device (e.g., high priority clearance user, system administrator, etc.). Each DST client module includes a list of stored data 234 and a list of tasks codes 236. The list of stored data 234 includes one or more entries of data identifying information, where each entry identifies data stored in the DSTN module 22. The data identifying information (e.g., data ID) includes one or more of a data file name, a data file directory listing, DSTN addressing information of the data, a data object identifier, etc. The list of tasks 236 includes one or more entries of task code identifying information, when each entry identifies task codes stored in the DSTN module 22. The task code identifying information (e.g., task ID) includes one or more of a task file name, a task file directory listing, DSTN addressing information of the task, another type of identifier to identify the task, etc.

As shown, the list of data 234 and the list of tasks 236 are each smaller in number of entries for the first DST client module than the corresponding lists of the second DST client module. This may occur because the user device associated with the first DST client module has fewer privileges in the distributed computing system than the device associated with the second DST client module. Alternatively, this may occur because the user device associated with the first DST client module serves fewer users than the device associated with the second DST client module and is restricted by the distributed computing system accordingly. As yet another alternative, this may occur through no restraints by the distributed computing system, it just occurred because the operator of the user device associated with the first DST client module has selected fewer data and/or fewer tasks than the operator of the device associated with the second DST client module.

In an example of operation, the first DST client module selects one or more data entries 238 and one or more tasks 240 from its respective lists (e.g., selected data ID and selected task ID). The first DST client module sends its selections to a task distribution module 232. The task distribution module 232 may be within a stand-alone device of the distributed computing system, may be within the user device that contains the first DST client module, or may be within the DSTN module 22.

Regardless of the task distribution module's location, it generates DST allocation information 242 from the selected task ID 240 and the selected data ID 238. The DST allocation information 242 includes data partitioning information, task execution information, and/or intermediate result information. The task distribution module 232 sends the DST allocation information 242 to the DSTN module 22. Note that one or more examples of the DST allocation information will be discussed with reference to one or more of FIGS. 29-39.

The DSTN module 22 interprets the DST allocation information 242 to identify the stored DS encoded data (e.g., DS error encoded data 2) and to identify the stored DS error encoded task code (e.g., DS error encoded task code 1). In addition, the DSTN module 22 interprets the DST allocation information 242 to determine how the data is to be partitioned and how the task is to be partitioned. The DSTN module 22 also determines whether the selected DS error encoded data 238 needs to be converted from pillar grouping to slice grouping. If so, the DSTN module 22 converts the selected DS error encoded data into slice groupings and stores the slice grouping DS error encoded data by overwriting the pillar grouping DS error encoded data or by storing it in a different location in the memory of the DSTN module 22 (i.e., does not overwrite the pillar grouping DS encoded data).

The DSTN module 22 partitions the data and the task as indicated in the DST allocation information 242 and sends the portions to selected DST execution units of the DSTN module 22. Each of the selected DST execution units performs its partial task(s) on its slice groupings to produce partial results. The DSTN module 22 collects the partial results from the selected DST execution units and provides them, as result information 244, to the task distribution module. The result information 244 may be the collected partial results, one or more final results as produced by the DSTN module 22 from processing the partial results in accordance with the DST allocation information 242, or one or more intermediate results as produced by the DSTN module 22 from processing the partial results in accordance with the DST allocation information 242.

The task distribution module 232 receives the result information 244 and provides one or more final results 104 therefrom to the first DST client module. The final result(s) 104 may be result information 244 or a result(s) of the task distribution module's processing of the result information 244.

In concurrence with processing the selected task of the first DST client module, the distributed computing system may process the selected task(s) of the second DST client module on the selected data(s) of the second DST client module. Alternatively, the distributed computing system may process the second DST client module's request subsequent to, or preceding, that of the first DST client module. Regardless of the ordering and/or parallel processing of the DST client module requests, the second DST client module provides its selected data 238 and selected task 240 to a task distribution module 232. If the task distribution module 232 is a separate device of the distributed computing system or within the DSTN module, the task distribution modules 232 coupled to the first and second DST client modules may be the same module. The task distribution module 232 processes the request of the second DST client module in a similar manner as it processed the request of the first DST client module.

Figure 29:
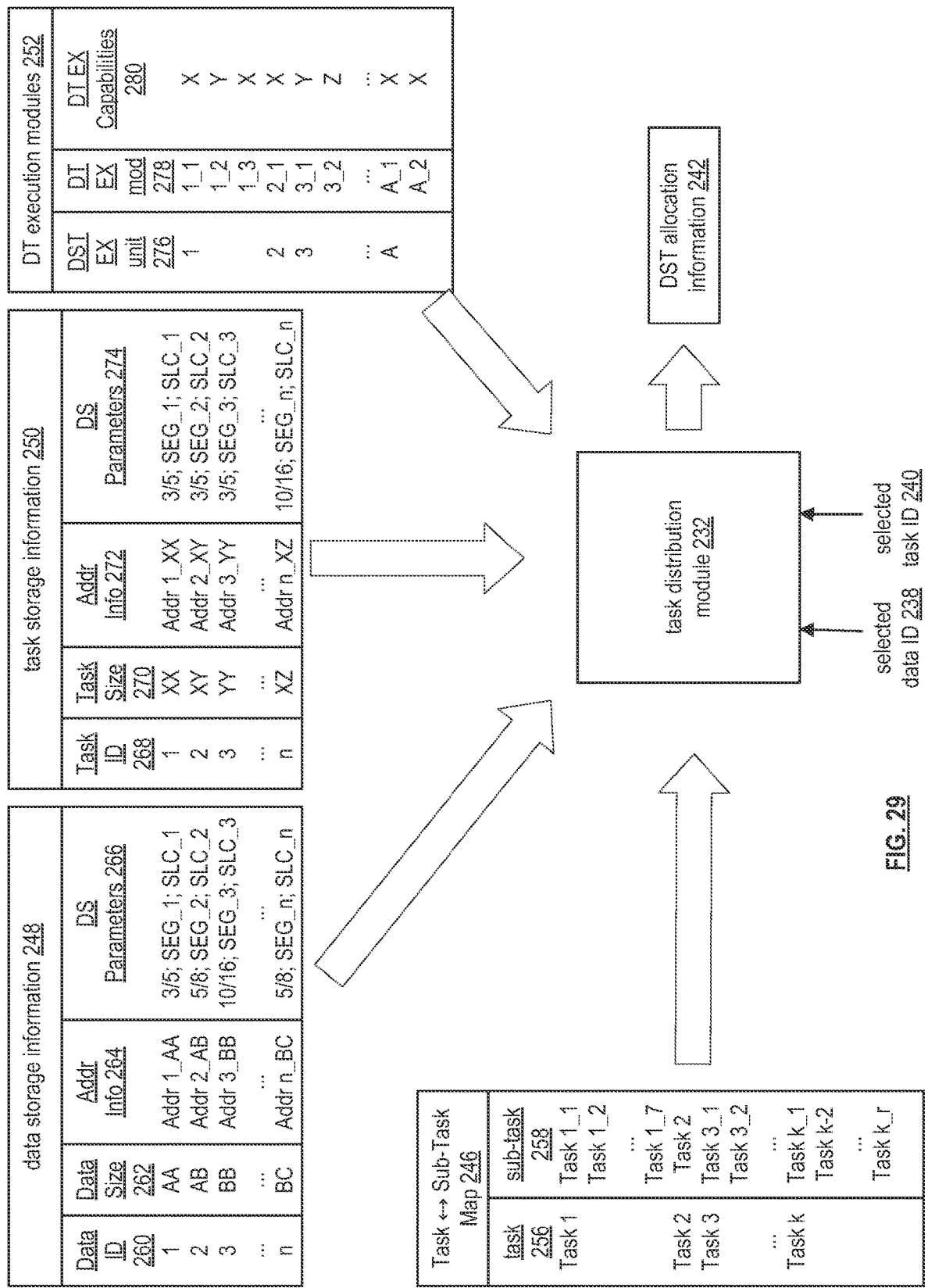
FIG. 29 is a schematic block diagram of an embodiment of a task distribution module facilitating the example of FIG. 28 in accordance with the present invention.

FIG. 29 is a schematic block diagram of an embodiment of a task distribution module 232 facilitating the example of FIG. 28. The task distribution module 232 includes a plurality of tables it uses to generate distributed storage and task (DST) allocation information 242 for selected data and selected tasks received from a DST client module. The tables include data storage information 248, task storage information 250, distributed task (DT) execution module information 252, and task ⇔ sub-task mapping information 246.

The data storage information table 248 includes a data identification (ID) field 260, a data size field 262, an addressing information field 264, distributed storage (DS) information 266, and may further include other information regarding the data, how it is stored, and/or how it can be processed. For example, DS encoded data #1 has a data ID of 1, a data size of AA (e.g., a byte size of a few Terabytes or more), addressing information of Addr_1_AA, and DS parameters of 3/5; SEG_1; and SLC_1. In this example, the addressing information may be a virtual address corresponding to the virtual address of the first storage word (e.g., one or more bytes) of the data and information on how to calculate the other addresses, may be a range of virtual addresses for the storage words of the data, physical addresses of the first storage word or the storage words of the data, may be a list of slice names of the encoded data slices of the data, etc. The DS parameters may include identity of an error encoding scheme, decode threshold/ pillar width (e.g., 3/5 for the first data entry), segment security information (e.g., SEG_1), per slice security information (e.g., SLC_1), and/or any other information regarding how the data was encoded into data slices.

The task storage information table 250 includes a task identification (ID) field 268, a task size field 270, an addressing information field 272, distributed storage (DS) information 274, and may further include other information regarding the task, how it is stored, and/or how it can be used to process data. For example, DS encoded task #2 has a task ID of 2, a task size of XY, addressing information of Addr_2_XY, and DS parameters of 3/5; SEG_2; and SLC_2. In this example, the addressing information may be a virtual address corresponding to the virtual address of the first storage word (e.g., one or more bytes) of the task and information on how to calculate the other addresses, may be a range of virtual addresses for the storage words of the task, physical addresses of the first storage word or the storage words of the task, may be a list of slices names of the encoded slices of the task code, etc. The DS parameters may include identity of an error encoding scheme, decode threshold/pillar width (e.g., 3/5 for the first data entry), segment security information (e.g., SEG_2), per slice security information (e.g., SLC_2), and/or any other information regarding how the task was encoded into encoded task slices. Note that the segment and/or the per-slice security information include a type of encryption (if enabled), a type of compression (if enabled), watermarking information (if enabled), and/or an integrity check scheme (if enabled).

The task ⇔ sub-task mapping information table 246 includes a task field 256 and a sub-task field 258. The task field 256 identifies a task stored in the memory of a distributed storage and task network (DSTN) module and the corresponding sub-task fields 258 indicates whether the task includes sub-tasks and, if so, how many and if any of the sub-tasks are ordered. In this example, the task ⇔ sub-task mapping information table 246 includes an entry for each task stored in memory of the DSTN module (e.g., task 1 through task k). In particular, this example indicates that task 1 includes 7 sub-tasks; task 2 does not include sub-tasks, and task k includes r number of sub-tasks (where r is an integer greater than or equal to two).

The DT execution module table 252 includes a DST execution unit ID field 276, a DT execution module ID field 278, and a DT execution module capabilities field 280. The DST execution unit ID field 276 includes the identity of DST units in the DSTN module. The DT execution module ID field 278 includes the identity of each DT execution unit in each DST unit. For example, DST unit 1 includes three DT executions modules (e.g., 1_1, 1_2, and 1_3). The DT execution capabilities field 280 includes identity of the capabilities of the corresponding DT execution unit. For example, DT execution module 1_1 includes capabilities X, where X includes one or more of MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, memory information (e.g., type, size, availability, etc.), and/or any information germane to executing one or more tasks.

From these tables, the task distribution module 232 generates the DST allocation information 242 to indicate where the data is stored, how to partition the data, where the task is stored, how to partition the task, which DT execution units should perform which partial task on which data partitions, where and how intermediate results are to be stored, etc. If multiple tasks are being performed on the same data or different data, the task distribution module factors such information into its generation of the DST allocation information.

Figure 30:
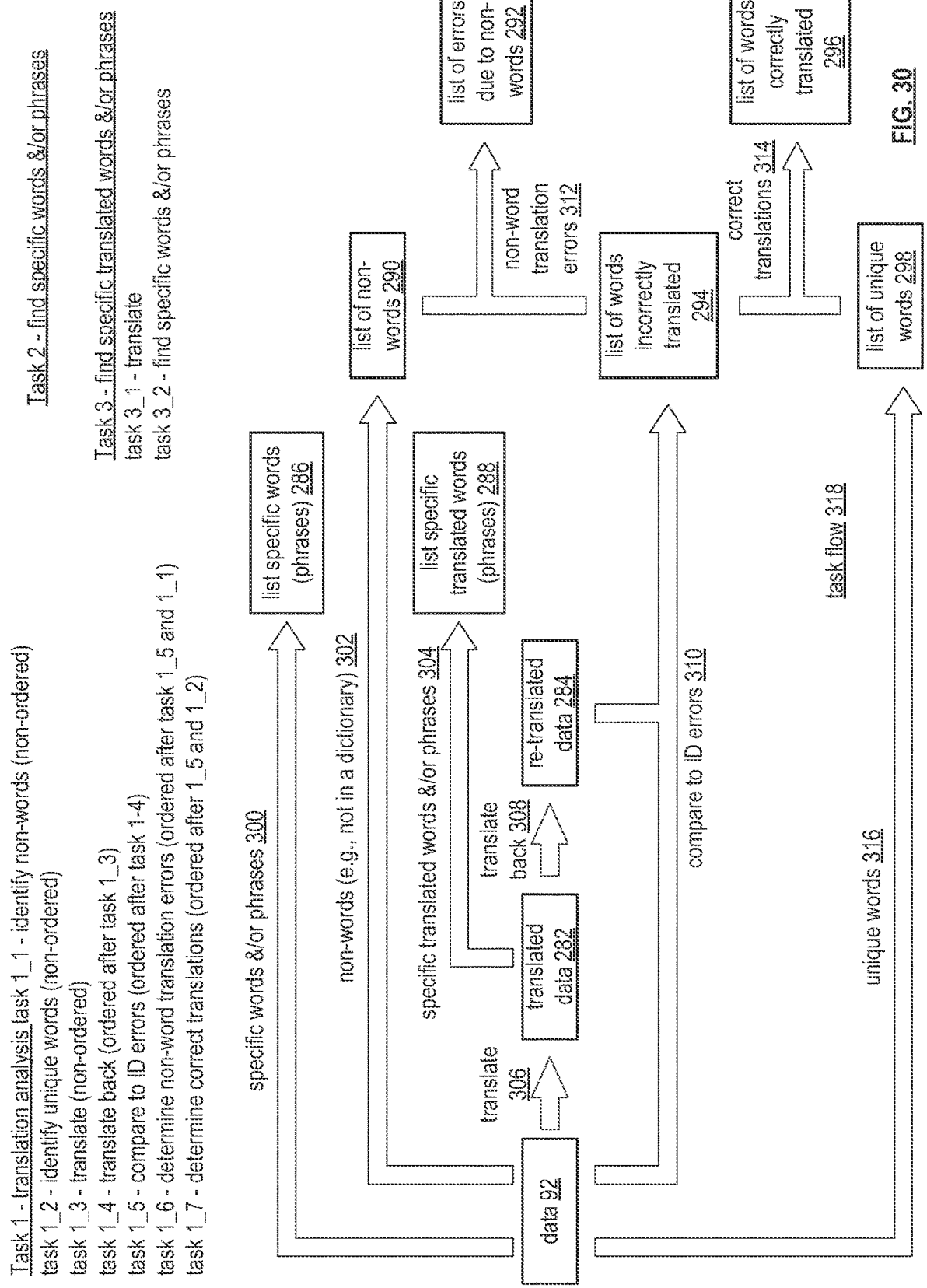
FIG. 30 is a diagram of a specific example of the distributed computing system performing tasks on stored data in accordance with the present invention.

FIG. 30 is a diagram of a specific example of a distributed computing system performing tasks on stored data as a task flow 318. In this example, selected data 92 is data 2 and selected tasks are tasks 1, 2, and 3. Task 1 corresponds to analyzing translation of data from one language to another (e.g., human language or computer language); task 2 corresponds to finding specific words and/or phrases in the data; and task 3 corresponds to finding specific translated words and/or phrases in translated data.

In this example, task 1 includes 7 sub-tasks: task 1_1—identify non-words (non-ordered); task 1_2—identify unique words (non-ordered); task 1_3—translate (non-ordered); task 1_4—translate back (ordered after task 1_3); task 1_5—compare to ID errors (ordered after task 1-4); task 1_6—determine non-word translation errors (ordered after task 1_5 and 1_1); and task 1_7—determine correct translations (ordered after 1_5 and 1_2). The sub-task further indicates whether they are an ordered task (i.e., are dependent on the outcome of another task) or non-order (i.e., are independent of the outcome of another task). Task 2 does not include sub-tasks and task 3 includes two sub-tasks: task 3_1 translate; and task 3_2 find specific word or phrase in translated data.

In general, the three tasks collectively are selected to analyze data for translation accuracies, translation errors, translation anomalies, occurrence of specific words or phrases in the data, and occurrence of specific words or phrases on the translated data. Graphically, the data 92 is translated 306 into translated data 282; is analyzed for specific words and/or phrases 300 to produce a list of specific words and/or phrases 286; is analyzed for non-words 302 (e.g., not in a reference dictionary) to produce a list of non-words 290; and is analyzed for unique words 316 included in the data 92 (i.e., how many different words are included in the data) to produce a list of unique words 298. Each of these tasks is independent of each other and can therefore be processed in parallel if desired.

The translated data 282 is analyzed (e.g., sub-task 3_2) for specific translated words and/or phrases 304 to produce a list of specific translated words and/or phrases 288. The translated data 282 is translated back 308 (e.g., sub-task 1_4) into the language of the original data to produce re-translated data 284. These two tasks are dependent on the translate task (e.g., task 1_3) and thus must be ordered after the translation task, which may be in a pipelined ordering or a serial ordering. The re-translated data 284 is then compared 310 with the original data 92 to find words and/or phrases that did not translate (one way and/or the other) properly to produce a list of incorrectly translated words 294. As such, the comparing task (e.g., sub-task 1_5) 310 is ordered after the translation 306 and re-translation tasks 308 (e.g., sub-tasks 1_3 and 1_4).

The list of words incorrectly translated 294 is compared 312 to the list of non-words 290 to identify words that were not properly translated because the words are non-words to produce a list of errors due to non-words 292. In addition, the list of words incorrectly translated 294 is compared 314 to the list of unique words 298 to identify unique words that were properly translated to produce a list of correctly translated words 296. The comparison may also identify unique words that were not properly translated to produce a list of unique words that were not properly translated. Note that each list of words (e.g., specific words and/or phrases, non-words, unique words, translated words and/or phrases, etc.) may include the word and/or phrase, how many times it is used, where in the data it is used, and/or any other information requested regarding a word and/or phrase.

Figure 31:
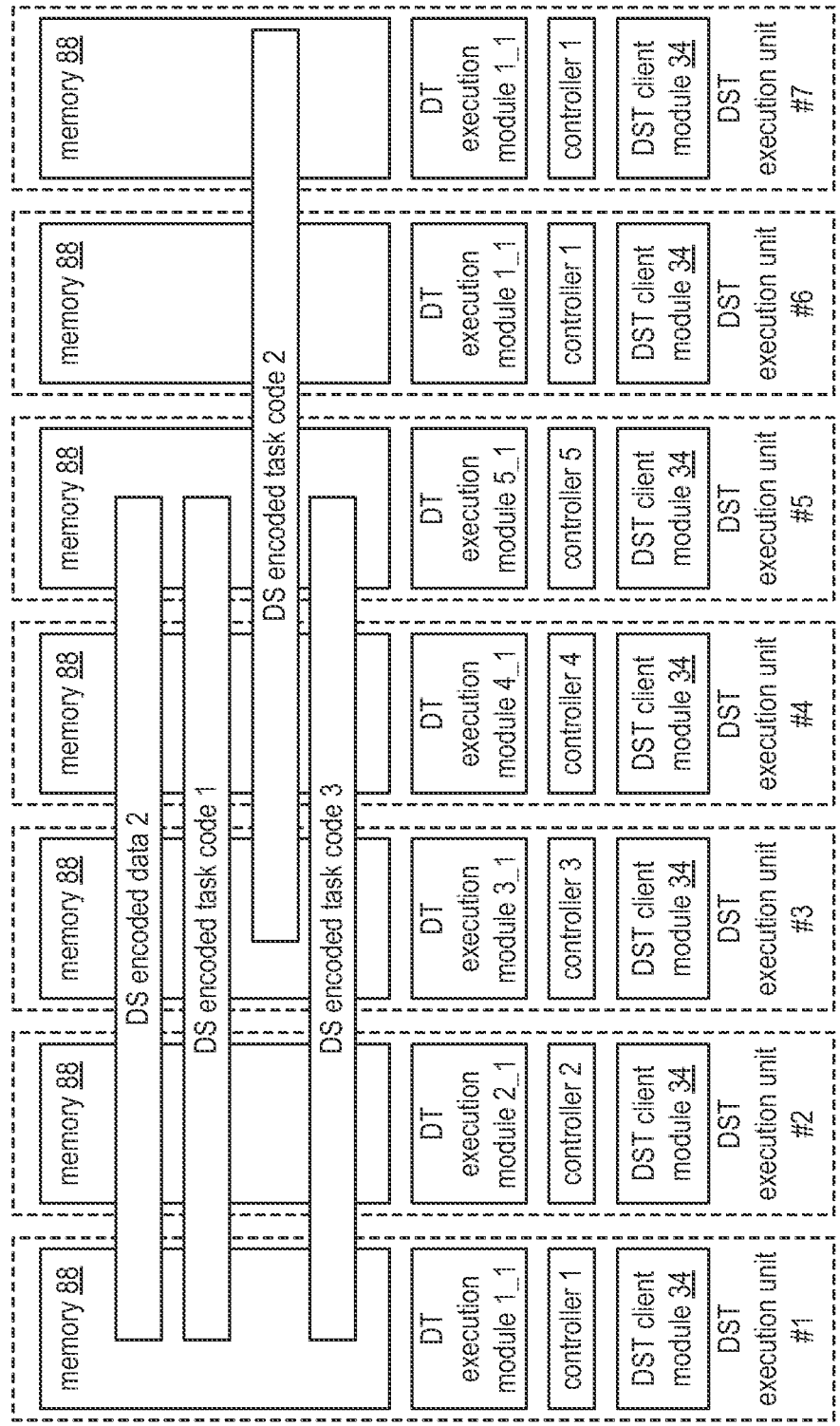
FIG. 31 is a schematic block diagram of an example of a distributed storage and task processing network (DSTN) module storing data and task codes for the example of FIG. 30 in accordance with the present invention.

FIG. 31 is a schematic block diagram of an example of a distributed storage and task processing network (DSTN) module storing data and task codes for the example of FIG. 30. As shown, DS encoded data 2 is stored as encoded data slices across the memory (e.g., stored in memories 88) of DST execution units 1-5; the DS encoded task code 1 (of task 1) and DS encoded task 3 are stored as encoded task slices across the memory of DST execution units 1-5; and DS encoded task code 2 (of task 2) is stored as encoded task slices across the memory of DST execution units 3-7. As indicated in the data storage information table and the task storage information table of FIG. 29, the respective data/task has DS parameters of 3/5 for their decode threshold/pillar width; hence spanning the memory of five DST execution units.

FIG. 32 is a diagram of an example of distributed storage and task (DST) allocation information 242 for the example of FIG. 30. The DST allocation information 242 includes data partitioning information 320, task execution information 322, and intermediate result information 324. The data partitioning information 320 includes the data identifier (ID), the number of partitions to split the data into, address information for each data partition, and whether the DS encoded data has to be transformed from pillar grouping to slice grouping. The task execution information 322 includes tabular information having a task identification field 326, a task ordering field 328, a data partition field ID 330, and a set of DT execution modules 332 to use for the distributed task processing per data partition. The intermediate result information 324 includes tabular information having a name ID field 334, an ID of the DST execution unit assigned to process the corresponding intermediate result 336, a scratch pad storage field 338, and an intermediate result storage field 340.

Continuing with the example of FIG. 30, where tasks 1-3 are to be distributedly performed on data 2, the data partitioning information includes the ID of data 2. In addition, the task distribution module determines whether the DS encoded data 2 is in the proper format for distributed computing (e.g., was stored as slice groupings). If not, the task distribution module indicates that the DS encoded data 2 format needs to be changed from the pillar grouping format to the slice grouping format, which will be done by the DSTN module. In addition, the task distribution module determines the number of partitions to divide the data into (e.g., 2_1 through 2_z) and addressing information for each partition.

The task distribution module generates an entry in the task execution information section for each sub-task to be performed. For example, task 1_1 (e.g., identify non-words on the data) has no task ordering (i.e., is independent of the results of other sub-tasks), is to be performed on data partitions 2_1 through 2_z by DT execution modules 1_1, 2_1, 3_1, 4_1, and 5_1. For instance, DT execution modules 1_1, 2_1, 3_1, 4_1, and 5_1 search for non-words in data partitions 2_1 through 2_z to produce task 1_1 intermediate results (R1-1, which is a list of non-words). Task 1_2 (e.g., identify unique words) has similar task execution information as task 1_1 to produce task 1_2 intermediate results (R1-2, which is the list of unique words).

Task 1_3 (e.g., translate) includes task execution information as being non-ordered (i.e., is independent), having DT execution modules 1_1, 2_1, 3_1, 4_1, and 5_1 translate data partitions 2_1 through 2_4 and having DT execution modules 1_2, 2_2, 3_2, 4_2, and 5_2 translate data partitions 2_5 through 2_z to produce task 1_3 intermediate results (R1-3, which is the translated data). In this example, the data partitions are grouped, where different sets of DT execution modules perform a distributed sub-task (or task) on each data partition group, which allows for further parallel processing.

Task 1_4 (e.g., translate back) is ordered after task 1_3 and is to be executed on task 1_3's intermediate result (e.g., R1-3_1) (e.g., the translated data). DT execution modules 1_1, 2_1, 3_1, 4_1, and 5_1 are allocated to translate back task 1_3 intermediate result partitions R1-3_1 through R1-3_4 and DT execution modules 1_2, 2_2, 6_1, 7_1, and 7_2 are allocated to translate back task 1_3 intermediate result partitions R1-3_5 through R1-3_z to produce task 1-4 intermediate results (R1-4, which is the translated back data).

Task 1_5 (e.g., compare data and translated data to identify translation errors) is ordered after task 1_4 and is to be executed on task 1_4's intermediate results (R4-1) and on the data. DT execution modules 1_1, 2_1, 3_1, 4_1, and 5_1 are allocated to compare the data partitions (2_1 through 2_z) with partitions of task 1-4 intermediate results partitions R1-4_1 through R1-4_z to produce task 1_5 intermediate results (R1-5, which is the list words translated incorrectly).

Task 1_6 (e.g., determine non-word translation errors) is ordered after tasks 1_1 and 1_5 and is to be executed on tasks 1_1's and 1_5's intermediate results (R1-1 and R1-5). DT execution modules 1_1, 2_1, 3_1, 4_1, and 5_1 are allocated to compare the partitions of task 1_1 intermediate results (R1-1_1 through R1-1_z) with partitions of task 1-5 intermediate results partitions (R1-5_1 through R1-5_z) to produce task 1_6 intermediate results (R1-6, which is the list translation errors due to non-words).

Task 1_7 (e.g., determine words correctly translated) is ordered after tasks 1_2 and 1_5 and is to be executed on tasks 1_2's and 1_5's intermediate results (R1-1 and R1-5). DT execution modules 1_2, 2_2, 3_2, 4_2, and 5_2 are allocated to compare the partitions of task 1_2 intermediate results (R1-2_1 through R1-2_z) with partitions of task 1-5 intermediate results partitions (R1-5_1 through R1-5_z) to produce task 1_7 intermediate results (R1-7, which is the list of correctly translated words).

Task 2 (e.g., find specific words and/or phrases) has no task ordering (i.e., is independent of the results of other sub-tasks), is to be performed on data partitions 2_1 through 2_z by DT execution modules 3_1, 4_1, 5_1, 6_1, and 7_1. For instance, DT execution modules 3_1, 4_1, 5_1, 6_1, and 7_1 search for specific words and/or phrases in data partitions 2_1 through 2_z to produce task 2 intermediate results (R2, which is a list of specific words and/or phrases).

Task 3_2 (e.g., find specific translated words and/or phrases) is ordered after task 1_3 (e.g., translate) is to be performed on partitions R1-3_1 through R1-3_z by DT execution modules 1_2, 2_2, 3_2, 4_2, and 5_2. For instance, DT execution modules 1_2, 2_2, 3_2, 4_2, and 5_2 search for specific translated words and/or phrases in the partitions of the translated data (R1-3_1 through R1-3_z) to produce task 3_2 intermediate results (R3-2, which is a list of specific translated words and/or phrases).

For each task, the intermediate result information indicates which DST unit is responsible for overseeing execution of the task and, if needed, processing the partial results generated by the set of allocated DT execution units. In addition, the intermediate result information indicates a scratch pad memory for the task and where the corresponding intermediate results are to be stored. For example, for intermediate result R1-1 (the intermediate result of task 1_1), DST unit 1 is responsible for overseeing execution of the task 1_1 and coordinates storage of the intermediate result as encoded intermediate result slices stored in memory of DST execution units 1-5. In general, the scratch pad is for storing non-DS encoded intermediate results and the intermediate result storage is for storing DS encoded intermediate results.

FIGS. 33-38 are schematic block diagrams of the distributed storage and task network (DSTN) module performing the example of FIG. 30. In FIG. 33, the DSTN module accesses the data 92 and partitions it into a plurality of partitions 1-z in accordance with distributed storage and task network (DST) allocation information. For each data partition, the DSTN identifies a set of its DT (distributed task) execution modules 90 to perform the task (e.g., identify non-words (i.e., not in a reference dictionary) within the data partition) in accordance with the DST allocation information. From data partition to data partition, the set of DT execution modules 90 may be the same, different, or a combination thereof (e.g., some data partitions use the same set while other data partitions use different sets).

For the first data partition, the first set of DT execution modules (e.g., 1_1, 2_1, 3_1, 4_1, and 5_1 per the DST allocation information of FIG. 32) executes task 1_1 to produce a first partial result 102 of non-words found in the first data partition. The second set of DT execution modules (e.g., 1_1, 2_1, 3_1, 4_1, and 5_1 per the DST allocation information of FIG. 32) executes task 1_1 to produce a second partial result 102 of non-words found in the second data partition. The sets of DT execution modules (as per the DST allocation information) perform task 1_1 on the data partitions until the "z" set of DT execution modules performs task 1_1 on the "zth" data partition to produce a "zth" partial result 102 of non-words found in the "zth" data partition.

As indicated in the DST allocation information of FIG. 32, DST execution unit 1 is assigned to process the first through "zth" partial results to produce the first intermediate result (R1-1), which is a list of non-words found in the data. For instance, each set of DT execution modules 90 stores its respective partial result in the scratchpad memory of DST execution unit 1 (which is identified in the DST allocation or may be determined by DST execution unit 1). A processing module of DST execution 1 is engaged to aggregate the first through "zth" partial results to produce the first intermediate result (e.g., R1_1). The processing module stores the first intermediate result as non-DS error encoded data in the scratchpad memory or in another section of memory of DST execution unit 1.

DST execution unit 1 engages its DST client module to slice grouping based DS error encode the first intermediate result (e.g., the list of non-words). To begin the encoding, the DST client module determines whether the list of non-words is of a sufficient size to partition (e.g., greater than a Terabyte). If yes, it partitions the first intermediate result (R1-1) into a plurality of partitions (e.g., R1-1_1 through R1-1_m). If the first intermediate result is not of sufficient size to partition, it is not partitioned.

For each partition of the first intermediate result, or for the first intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5).

In FIG. 34, the DSTN module is performing task 1_2 (e.g., find unique words) on the data 92. To begin, the DSTN module accesses the data 92 and partitions it into a plurality of partitions 1-z in accordance with the DST allocation information or it may use the data partitions of task 1_1 if the partitioning is the same. For each data partition, the DSTN identifies a set of its DT execution modules to perform task 1_2 in accordance with the DST allocation information. From data partition to data partition, the set of DT execution modules may be the same, different, or a combination thereof. For the data partitions, the allocated set of DT execution modules executes task 1_2 to produce a partial result (e.g., 1$^{st}$ through "zth") of unique words found in the data partitions.

As indicated in the DST allocation information of FIG. 32, DST execution unit 1 is assigned to process the first through "zth" partial results 102 of task 1_2 to produce the second intermediate result (R1-2), which is a list of unique words found in the data 92. The processing module of DST execution 1 is engaged to aggregate the first through "zth" partial results of unique words to produce the second intermediate result. The processing module stores the second intermediate result as non-DS error encoded data in the scratchpad memory or in another section of memory of DST execution unit 1.

DST execution unit 1 engages its DST client module to slice grouping based DS error encode the second intermediate result (e.g., the list of non-words). To begin the encoding, the DST client module determines whether the list of unique words is of a sufficient size to partition (e.g., greater than a Terabyte). If yes, it partitions the second intermediate result (R1-2) into a plurality of partitions (e.g., R1-2_1 through R1-2_m). If the second intermediate result is not of sufficient size to partition, it is not partitioned.

For each partition of the second intermediate result, or for the second intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5).

In FIG. 35, the DSTN module is performing task 1_3 (e.g., translate) on the data 92. To begin, the DSTN module accesses the data 92 and partitions it into a plurality of partitions 1-z in accordance with the DST allocation information or it may use the data partitions of task 1_1 if the partitioning is the same. For each data partition, the DSTN identifies a set of its DT execution modules to perform task 1_3 in accordance with the DST allocation information (e.g., DT execution modules 1_1, 2_1, 3_1, 4_1, and 5_1 translate data partitions 2_1 through 2_4 and DT execution modules 1_2, 2_2, 3_2, 4_2, and 5_2 translate data partitions 2_5 through 2_z). For the data partitions, the allocated set of DT execution modules 90 executes task 1_3 to produce partial results 102 (e.g., 1$^{st}$ through "zth") of translated data.

As indicated in the DST allocation information of FIG. 32, DST execution unit 2 is assigned to process the first through "zth" partial results of task 1_3 to produce the third intermediate result (R1-3), which is translated data. The processing module of DST execution 2 is engaged to aggregate the first through "zth" partial results of translated data to produce the third intermediate result. The processing module stores the third intermediate result as non-DS error encoded data in the scratchpad memory or in another section of memory of DST execution unit 2.

DST execution unit 2 engages its DST client module to slice grouping based DS error encode the third intermediate result (e.g., translated data). To begin the encoding, the DST client module partitions the third intermediate result (R1-3) into a plurality of partitions (e.g., R1-3_1 through R1-3_y). For each partition of the third intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 2-6 per the DST allocation information).

As is further shown in FIG. 35, the DSTN module is performing task 1_4 (e.g., retranslate) on the translated data of the third intermediate result. To begin, the DSTN module accesses the translated data (from the scratchpad memory or from the intermediate result memory and decodes it) and partitions it into a plurality of partitions in accordance with the DST allocation information. For each partition of the third intermediate result, the DSTN identifies a set of its DT execution modules 90 to perform task 1_4 in accordance with the DST allocation information (e.g., DT execution modules 1_1, 2_1, 3_1, 4_1, and 5_1 are allocated to translate back partitions R1-3_1 through R1-3_4 and DT execution modules 1_2, 2_2, 6_1, 7_1, and 7_2 are allocated to translate back partitions R1-3_5 through R1-3_z). For the partitions, the allocated set of DT execution modules executes task 1_4 to produce partial results 102 (e.g., $1^{st}$ through "zth") of re-translated data.

As indicated in the DST allocation information of FIG. 32, DST execution unit 3 is assigned to process the first through "zth" partial results of task 1_4 to produce the fourth intermediate result (R1-4), which is retranslated data. The processing module of DST execution 3 is engaged to aggregate the first through "zth" partial results of retranslated data to produce the fourth intermediate result. The processing module stores the fourth intermediate result as non-DS error encoded data in the scratchpad memory or in another section of memory of DST execution unit 3.

DST execution unit 3 engages its DST client module to slice grouping based DS error encode the fourth intermediate result (e.g., retranslated data). To begin the encoding, the DST client module partitions the fourth intermediate result (R1-4) into a plurality of partitions (e.g., R1-4_1 through R1-4_z). For each partition of the fourth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 3-7 per the DST allocation information).

Figure 36:
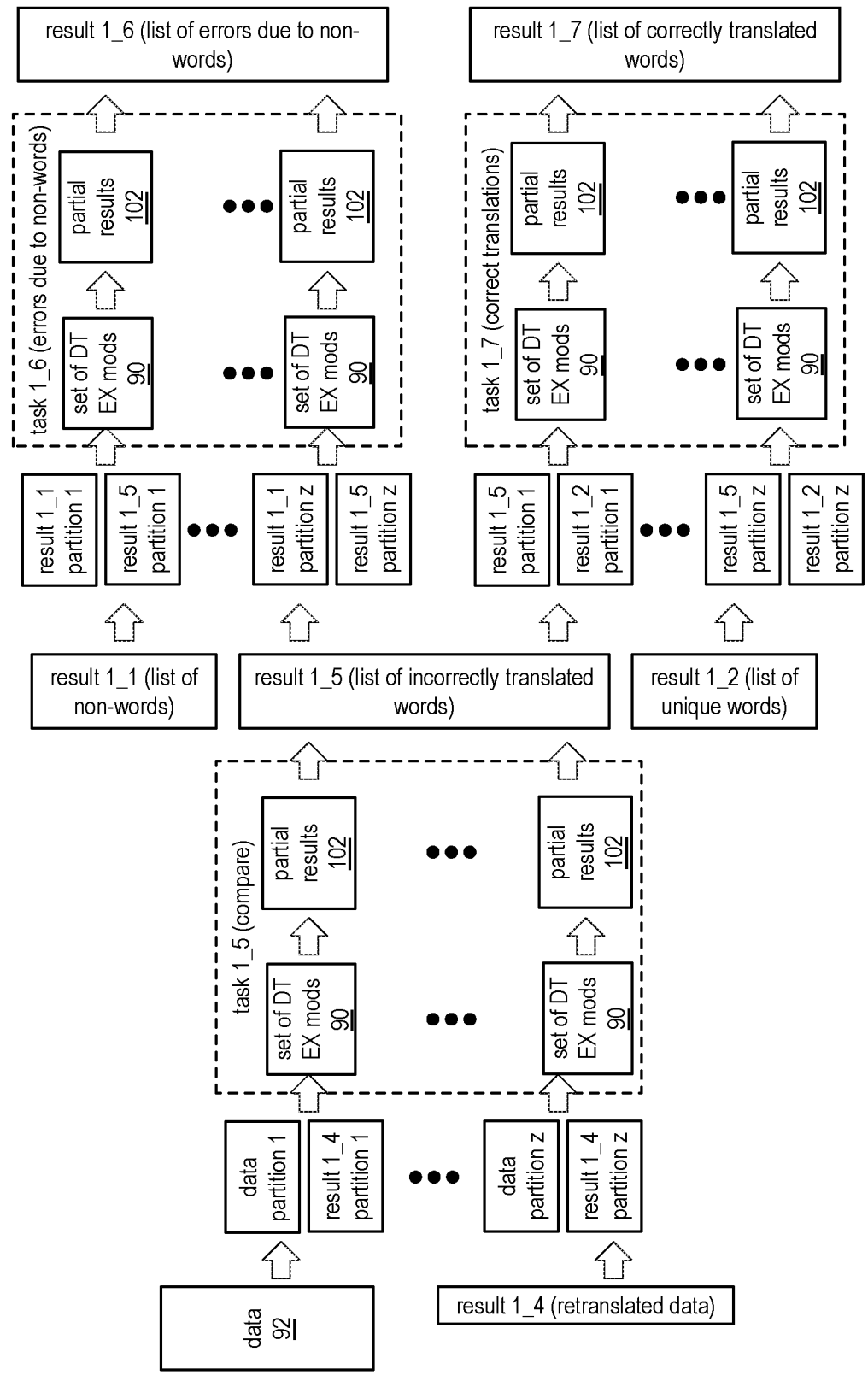

In FIG. 36, a distributed storage and task network (DSTN) module is performing task 1_5 (e.g., compare) on data 92 and retranslated data of FIG. 35. To begin, the DSTN module accesses the data 92 and partitions it into a plurality of partitions in accordance with the DST allocation information or it may use the data partitions of task 1_1 if the partitioning is the same. The DSTN module also accesses the retranslated data from the scratchpad memory, or from the intermediate result memory and decodes it, and partitions it into a plurality of partitions in accordance with the DST allocation information. The number of partitions of the retranslated data corresponds to the number of partitions of the data.

For each pair of partitions (e.g., data partition 1 and retranslated data partition 1), the DSTN identifies a set of its DT execution modules 90 to perform task 1_5 in accordance with the DST allocation information (e.g., DT execution modules 1_1, 2_1, 3_1, 4_1, and 5_1). For each pair of partitions, the allocated set of DT execution modules executes task 1_5 to produce partial results 102 (e.g., $1^{st}$ through "zth") of a list of incorrectly translated words and/or phrases.

As indicated in the DST allocation information of FIG. 32, DST execution unit 1 is assigned to process the first through "zth" partial results of task 1_5 to produce the fifth intermediate result (R1-5), which is the list of incorrectly translated words and/or phrases. In particular, the processing module of DST execution 1 is engaged to aggregate the first through "zth" partial results of the list of incorrectly translated words and/or phrases to produce the fifth intermediate result. The processing module stores the fifth intermediate result as non-DS error encoded data in the scratchpad memory or in another section of memory of DST execution unit 1.

DST execution unit 1 engages its DST client module to slice grouping based DS error encode the fifth intermediate result. To begin the encoding, the DST client module partitions the fifth intermediate result (R1-5) into a plurality of partitions (e.g., R1-5_1 through R1-5_z). For each partition of the fifth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5 per the DST allocation information).

As is further shown in FIG. 36, the DSTN module is performing task 1_6 (e.g., translation errors due to non-words) on the list of incorrectly translated words and/or phrases (e.g., the fifth intermediate result R1-5) and the list of non-words (e.g., the first intermediate result R1-1). To begin, the DSTN module accesses the lists and partitions them into a corresponding number of partitions.

For each pair of partitions (e.g., partition R1-1_1 and partition R1-5_1), the DSTN identifies a set of its DT execution modules 90 to perform task 1_6 in accordance with the DST allocation information (e.g., DT execution modules 1_1, 2_1, 3_1, 4_1, and 5_1). For each pair of partitions, the allocated set of DT execution modules executes task 1_6 to produce partial results 102 (e.g., $1^{st}$ through "zth") of a list of incorrectly translated words and/or phrases due to non-words.

As indicated in the DST allocation information of FIG. 32, DST execution unit 2 is assigned to process the first through "zth" partial results of task 1_6 to produce the sixth intermediate result (R1-6), which is the list of incorrectly translated words and/or phrases due to non-words. In particular, the processing module of DST execution 2 is engaged to aggregate the first through "zth" partial results of the list of incorrectly translated words and/or phrases due to non-words to produce the sixth intermediate result. The processing module stores the sixth intermediate result as non-DS error encoded data in the scratchpad memory or in another section of memory of DST execution unit 2.

DST execution unit 2 engages its DST client module to slice grouping based DS error encode the sixth intermediate result. To begin the encoding, the DST client module partitions the sixth intermediate result (R1-6) into a plurality of partitions (e.g., R1-6_1 through R1-6_z). For each partition of the sixth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 2-6 per the DST allocation information).

As is still further shown in FIG. 36, the DSTN module is performing task 1_7 (e.g., correctly translated words and/or phrases) on the list of incorrectly translated words and/or phrases (e.g., the fifth intermediate result R1-5) and the list of unique words (e.g., the second intermediate result R1-2). To begin, the DSTN module accesses the lists and partitions them into a corresponding number of partitions.

For each pair of partitions (e.g., partition R1-2_1 and partition R1-5_1), the DSTN identifies a set of its DT execution modules 90 to perform task 1_7 in accordance with the DST allocation information (e.g., DT execution modules 1_2, 2_2, 3_2, 4_2, and 5_2). For each pair of partitions, the allocated set of DT execution modules executes task 1_7 to produce partial results 102 (e.g., $1^{st}$ through "zth") of a list of correctly translated words and/or phrases.

As indicated in the DST allocation information of FIG. 32, DST execution unit 3 is assigned to process the first through "zth" partial results of task 1_7 to produce the seventh intermediate result (R1-7), which is the list of correctly translated words and/or phrases. In particular, the processing module of DST execution 3 is engaged to aggregate the first through "zth" partial results of the list of correctly translated words and/or phrases to produce the seventh intermediate result. The processing module stores the seventh intermediate result as non-DS error encoded data in the scratchpad memory or in another section of memory of DST execution unit 3.

DST execution unit 3 engages its DST client module to slice grouping based DS error encode the seventh intermediate result. To begin the encoding, the DST client module partitions the seventh intermediate result (R1-7) into a plurality of partitions (e.g., R1-7_1 through R1-7_z). For each partition of the seventh intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 3-7 per the DST allocation information).

In FIG. 37, the distributed storage and task network (DSTN) module is performing task 2 (e.g., find specific words and/or phrases) on the data 92. To begin, the DSTN module accesses the data and partitions it into a plurality of partitions 1-z in accordance with the DST allocation information or it may use the data partitions of task 1_1 if the partitioning is the same. For each data partition, the DSTN identifies a set of its DT execution modules 90 to perform task 2 in accordance with the DST allocation information. From data partition to data partition, the set of DT execution modules may be the same, different, or a combination thereof. For the data partitions, the allocated set of DT execution modules executes task 2 to produce partial results 102 (e.g., $1^{st}$ through "zth") of specific words and/or phrases found in the data partitions.

As indicated in the DST allocation information of FIG. 32, DST execution unit 7 is assigned to process the first through "zth" partial results of task 2 to produce task 2 intermediate result (R2), which is a list of specific words and/or phrases found in the data. The processing module of DST execution 7 is engaged to aggregate the first through "zth" partial results of specific words and/or phrases to produce the task 2 intermediate result. The processing module stores the task 2 intermediate result as non-DS error encoded data in the scratchpad memory or in another section of memory of DST execution unit 7.

DST execution unit 7 engages its DST client module to slice grouping based DS error encode the task 2 intermediate result. To begin the encoding, the DST client module determines whether the list of specific words and/or phrases is of a sufficient size to partition (e.g., greater than a Terabyte). If yes, it partitions the task 2 intermediate result (R2) into a plurality of partitions (e.g., R2_1 through R2_m). If the task 2 intermediate result is not of sufficient size to partition, it is not partitioned.

For each partition of the task 2 intermediate result, or for the task 2 intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-4, and 7).

In FIG. 38, the distributed storage and task network (DSTN) module is performing task 3 (e.g., find specific translated words and/or phrases) on the translated data (R1-3). To begin, the DSTN module accesses the translated data (from the scratchpad memory or from the intermediate result memory and decodes it) and partitions it into a plurality of partitions in accordance with the DST allocation information. For each partition, the DSTN identifies a set of its DT execution modules to perform task 3 in accordance with the DST allocation information. From partition to partition, the set of DT execution modules may be the same, different, or a combination thereof. For the partitions, the allocated set of DT execution modules 90 executes task 3 to produce partial results 102 (e.g., $1^{st}$ through "zth") of specific translated words and/or phrases found in the data partitions.

As indicated in the DST allocation information of FIG. 32, DST execution unit 5 is assigned to process the first through "zth" partial results of task 3 to produce task 3 intermediate result (R3), which is a list of specific translated words and/or phrases found in the translated data. In particular, the processing module of DST execution 5 is engaged to aggregate the first through "zth" partial results of specific translated words and/or phrases to produce the task 3 intermediate result. The processing module stores the task 3 intermediate result as non-DS error encoded data in the scratchpad memory or in another section of memory of DST execution unit 7.

DST execution unit 5 engages its DST client module to slice grouping based DS error encode the task 3 intermediate result. To begin the encoding, the DST client module determines whether the list of specific translated words and/or phrases is of a sufficient size to partition (e.g., greater than a Terabyte). If yes, it partitions the task 3 intermediate result (R3) into a plurality of partitions (e.g., R3_1 through R3_m). If the task 3 intermediate result is not of sufficient size to partition, it is not partitioned.

For each partition of the task 3 intermediate result, or for the task 3 intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-4, 5, and 7).

FIG. 39 is a diagram of an example of combining result information into final results 104 for the example of FIG. 30. In this example, the result information includes the list of specific words and/or phrases found in the data (task 2 intermediate result), the list of specific translated words and/or phrases found in the data (task 3 intermediate result), the list of non-words found in the data (task 1 first intermediate result R1-1), the list of unique words found in the data (task 1 second intermediate result R1-2), the list of translation errors due to non-words (task 1 sixth intermediate result R1-6), and the list of correctly translated words and/or phrases (task 1 seventh intermediate result R1-7). The task distribution module provides the result information to the requesting DST client module as the results 104.

Figure 40A:
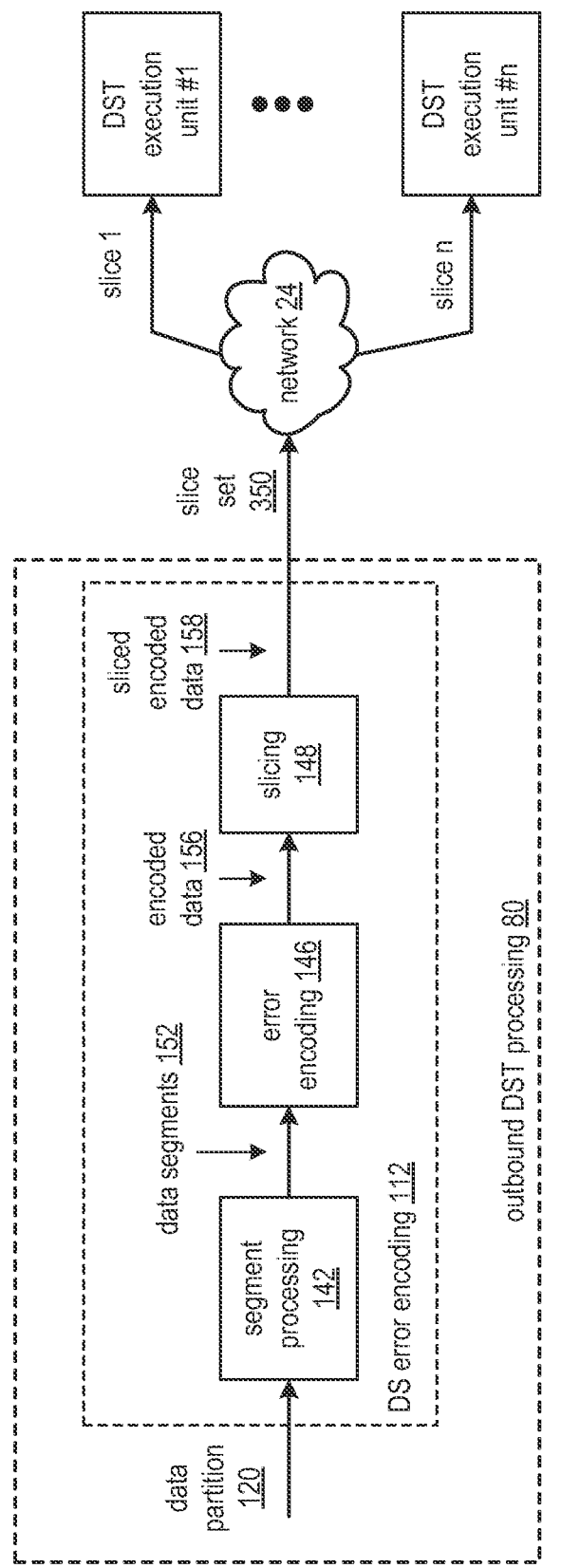
FIG. 40A is a schematic block diagram of a dispersed storage network (DSN) in accordance with the present invention.

FIG. 40A is a schematic block diagram of a dispersed storage network (DSN) that includes the outbound distributed storage and task (DST) processing 80 of FIG. 3, the network 24 of FIG. 1, and a set of DST execution units 1-n. Each DST execution unit may be implemented utilizing the DST execution unit 36 of FIG. 1. The outbound DST processing 80 includes the segment processing 142, the error encoding 146, and the slicing 148 from FIG. 6. The DSN functions to store a data partition 120 as one or more encoded data slice sets in the set of DST execution units.

In an example of operation, the segment processing 142 receives the data partition 120 for storage in a DSN vault associated with the DSN. The DSN vault includes a virtual storage container for storage of a plurality of data partitions, where the plurality of data partitions are affiliated with each other by one or more common attributes. The one or more common attributes includes one or more of accessed by a common group of requesting entities (e.g., a common set of user devices), a common group of data objects that are utilized to provide the plurality of data partitions, and a common DSN address range (e.g., where a DSN address specifies a logical storage location within the DSN for a data object).

Having received the data partition 120, a segment processing 142 obtains a decode threshold value associated with the DSN vault. As a specific example, the segment processing 142 accesses a system registry information to identify a vault identifier (ID) associated with the data partition and utilizes the vault ID to access a portion of the system registry information associated with the vault ID to retrieve the decode threshold value. As another specific example, the segment processing 142 determines the decode threshold value based on one or more of a performance goal and performance information.

Having obtained the decode threshold value, the segment processing 142 determines a desired size of an encoded data slice of the one or more encoded data slice sets. The determining may be based on one or more of a predetermination, a DST execution unit loading level, a DST execution unit memory utilization efficiency level, a DST execution unit resource contention level, and a network loading level. As a specific example, the segment processing 142 determines the desired size to be 4 kB when small encoded data slices are desired to improve memory utilization efficiency. As another specific example, the segment processing 142 determines the desired size to be one megabyte when large encoded data slices are desired to improve retrieval efficiency.

Having determined the desired size of the encoded data slice, the segment processing 142 determines a segment size value based on the desired size of the encoded data slice and the decode threshold value. As a specific example, the segment processing 142 determines the segment size value in accordance with a formula: segment size value=(decode threshold value)×(desired size of the encoded data slice). Having determined the segment size value, the segment processing 142 divides the data partition 120 into one or more data segments 152, where a size of each of the one or more data segments 152 is substantially the same as the determined segment size value. The error encoding 146 dispersed storage error encodes each of the data segments 152 to produce encoded data 156. The slicing 148 slices the encoded data 156 to produce sliced encoded data 158. The outbound DST processing 80 sends the one or more sets of encoded data slices to the DST execution units 1-n for storage therein.

Figure 40B:
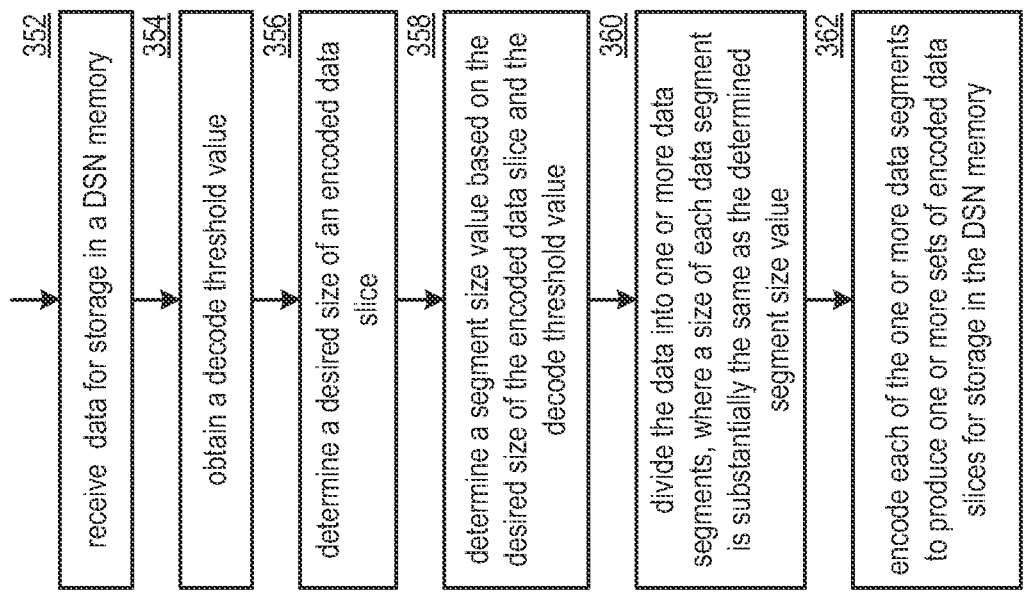
FIG. 40B is a flowchart illustrating an example of selecting data segment size in accordance with the present invention.

FIG. 40B is a flowchart illustrating an example of selecting data segment size. The method begins at a step where a processing module (e.g., of a distributed storage and task (DST) client module) receives data for storage in a dispersed storage network (DSN) memory 352. The data includes one or more of a data object, a data segment, a data partition, and a data file. The method continues at the step where the processing module obtains a decode threshold value 354. The obtaining includes at least one of receiving, initiating a query, receiving a query response, accessing DSN registry information, and determining based on a desired performance level.

The method continues at the step where the processing module determines a desired size of an encoded data slice 356. The determining may be based on one or more of a predetermination, an actual DSN performance level, and a desired DSN performance level. For example, the processing module determines a larger than average desired size of the encoded data slice to reduce retrieval seeks providing improved retrieval efficiency. As another example, the processing module determines a smaller than average desired size of the encoded data slice to improve storage efficiency.

The method continues at the step where the processing module determines a segment size value based on the desired size of the encoded data slice and the decode threshold value 358 in accordance with a segmentation scheme. The segmentation scheme includes a fixed or variable approach. For example, when the fixed segmentation approach is utilized, the processing module multiplies the desired size of encoded data slice by the decode threshold value to produce the segment size value.

The method continues at the step where the processing module divides the data into one or more data segments, where a size of each data segment is substantially the same as the determined segment size value 360. For example, the processing module divides the data into the one or more data segments in accordance with the segmentation scheme using the determined segment size value.

The method continues at the step where the processing module encodes each of the one or more data segments to produce one or more sets of encoded data slices for storage in the DSN memory 362. As a specific example, the processing module disperse storage error encodes each data segment to produce a set of encoded data slices, and for each set of encoded data slices, generates a set of write slice requests that includes the set of encoded data slices and a set of corresponding slice names, outputs the set of write slice requests to a set of storage units of the DSN memory.

Alternatively, or in addition to, the processing module receives a response to the writing of the encoded data slice to a storage unit, where the response indicates that a size of the encoded data slices are undesired. Having received such a response, the processing module re-divides the data into new data segments for encoding and distribution to the DSN memory as described above.

Figure 41A:
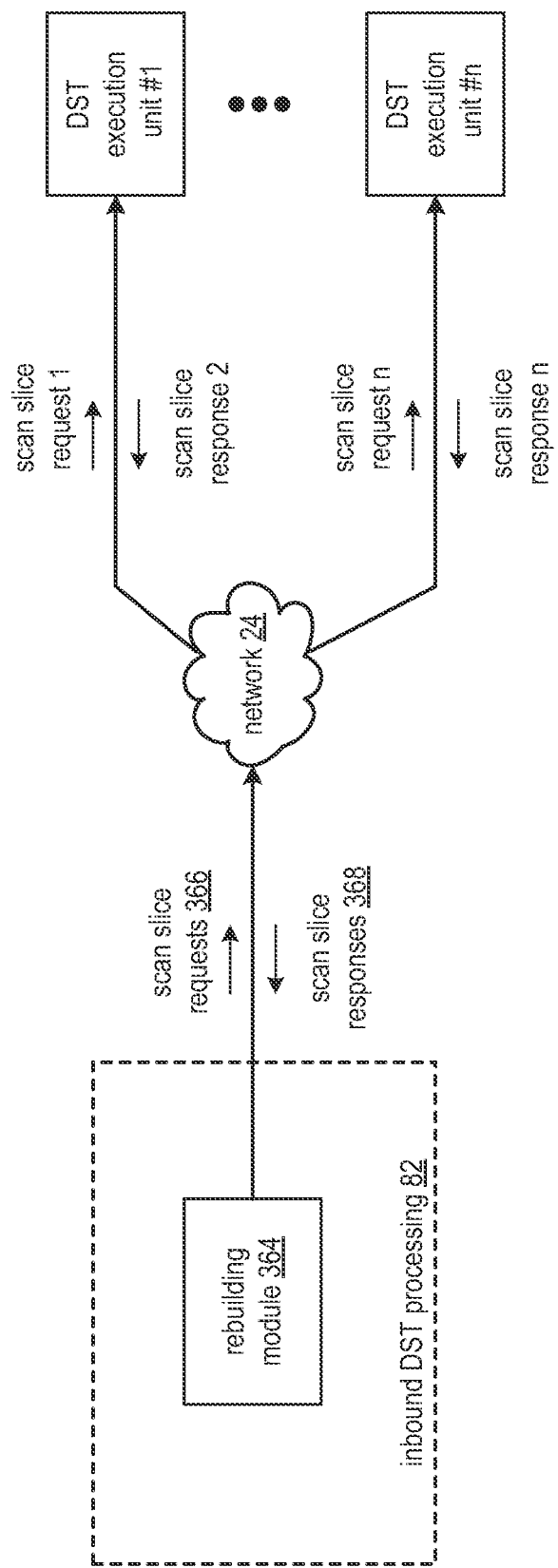
FIG. 41A is a schematic block diagram of a dispersed storage network (DSN) in accordance with the present invention.

FIG. 41A is a schematic block diagram of a dispersed storage network (DSN) that includes the inbound distributed storage and task (DST) processing 82 of FIG. 3, the network 24 of FIG. 1, and a set of DST execution units 1-*n*. Each DST execution unit may be implemented utilizing the DST execution unit 36 of FIG. 1. The inbound DST processing 82 includes a rebuilding module 364. The DSN functions to store data as one or more sets of encoded data slice in the set of DST execution units and to subsequently scan for slice errors. A slice error includes at least one of a missing slice, a corrupted slice, and a maliciously altered slice.

In an example of operation to scan for slice errors, the rebuilding module 364 identifies a candidate slice name range for error scanning. The identifying may be based on one or more of receiving an error message, identifying a next slice name range from a slice name range list for scanning, initiating a query, and receiving a query response. Having identified the candidates slice name range, the rebuilding module 364 determines elapsed time since a last scan of the candidates slice name range. The determining includes identifying a longest time duration since a last scan for an encoded data slice of a plurality of encoded data slices associated with the candidates slice name range. The identifying includes at least one of performing a table lookup, initiating a query, receiving a query response, and interpreting a system status message.

Having determined the elapsed time since the last scan, the rebuilding module 364 determines whether a change condition has been met during the determined the elapsed time. The change condition includes at least one of a DST execution unit failure, unavailability of a DST execution unit, and writing of an encoded data slice within the candidates slice name range. The determining may be based on one or more of performing an error log lookup, interpreting an error message, monitoring encoded data slice access, initiating a query, and receiving a query response.

When the change condition has been met, the rebuilding module 364 determines a start time for the error scanning based on one or more of a storage reliability goal, an estimated storage reliability level, a historical error rate, and the elapsed time since the last scan of the candidates slice name range. For example, the rebuilding module 364 determines the start time to be later than average when the historical error rate is lower than average and the estimated storage reliability is higher than average. As another example, the rebuilding module 364 determines to start time to be sooner than average when the historical error rate is higher than average and the estimated storage reliability is lower than average.

Having determined the start time for the error scanning, the rebuilding module 364 identifies one or more sub-slice name ranges of the candidate slice name range for the error scanning based on the determined change condition. For example, the rebuilding module 364 identifies the one or more sub-slice name ranges as slice names associated with encoded data slices that have been written recently. As another example, the processing module verifies the one or more sub-slice name ranges as slice names associated with an unavailable DST execution unit.

Having identified the one or more sub-slice name ranges, the rebuilding module 364 facilitates initiation of the error scanning of the identified one or more sub-slice name ranges in accordance with the determined start time. As a specific example, the rebuilding module 364 issues scan slice requests 366 (e.g., including scan slice requests 1-*n*) and receive scan slice responses 368 (e.g., at least some of scan slice responses 1-*n*). Each scan slice request 366 may include at least one of a list slice range requests 366 and a list slice range digest request, where each includes a start and end slice name based on the identified one or more sub-slice names. A scan slice response 368 includes at least one of a list slice range response and a list slice range digest response, where the list slice range response includes a list of slice names and the list slice range digest includes a digest of the list of slice names. Next, the rebuilding module 364 compares the scan slice responses 368 to identify slice errors (e.g., to identify missing encoded data slices).

Figure 41B:
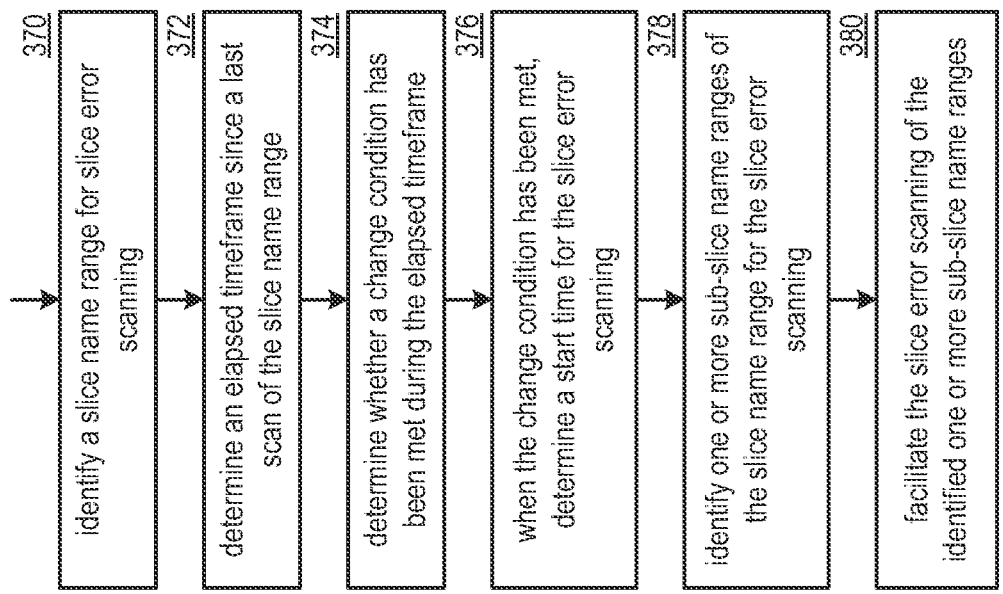
FIG. 41B is a flowchart illustrating an example of detecting slice errors in accordance with the present invention.

FIG. 41B is a flowchart illustrating an example of detecting slice errors. The method begins at a step where a processing module (e.g., of a distributed storage and task (DST) client module) identifies a slice name range for slice error scanning 370. The method continues at the step where the processing module determines an elapsed time frame since a last scan of the slice name range 372. The method continues at the step where the processing module determines whether the change condition has been met during the elapsed time frame 374.

When the change condition has been met, the method continues at the step where the processing module determines a start time for the slice error scanning 376. As a specific example, the processing module identifies the start time such that estimated retrieval reliability is substantially the same as a desired retrieval reliability level. The method continues at the step where the processing module identifies one or more sub-slice name ranges of the slice name range for the slice error scanning 378. As a specific example, the processing module identifies the one or more sub-slice name ranges to be associated with at least a portion of the change condition. The method continues at the step where the processing module facilitates the slice error scanning of the identified one or more sub-slice name ranges 380. The facilitating includes one or more of scanning, issuing a report, initiating rebuilding, updating scanning time frames, and rescanning immediately to verify a slice error upon detection of a slice error.

Figure 42A:
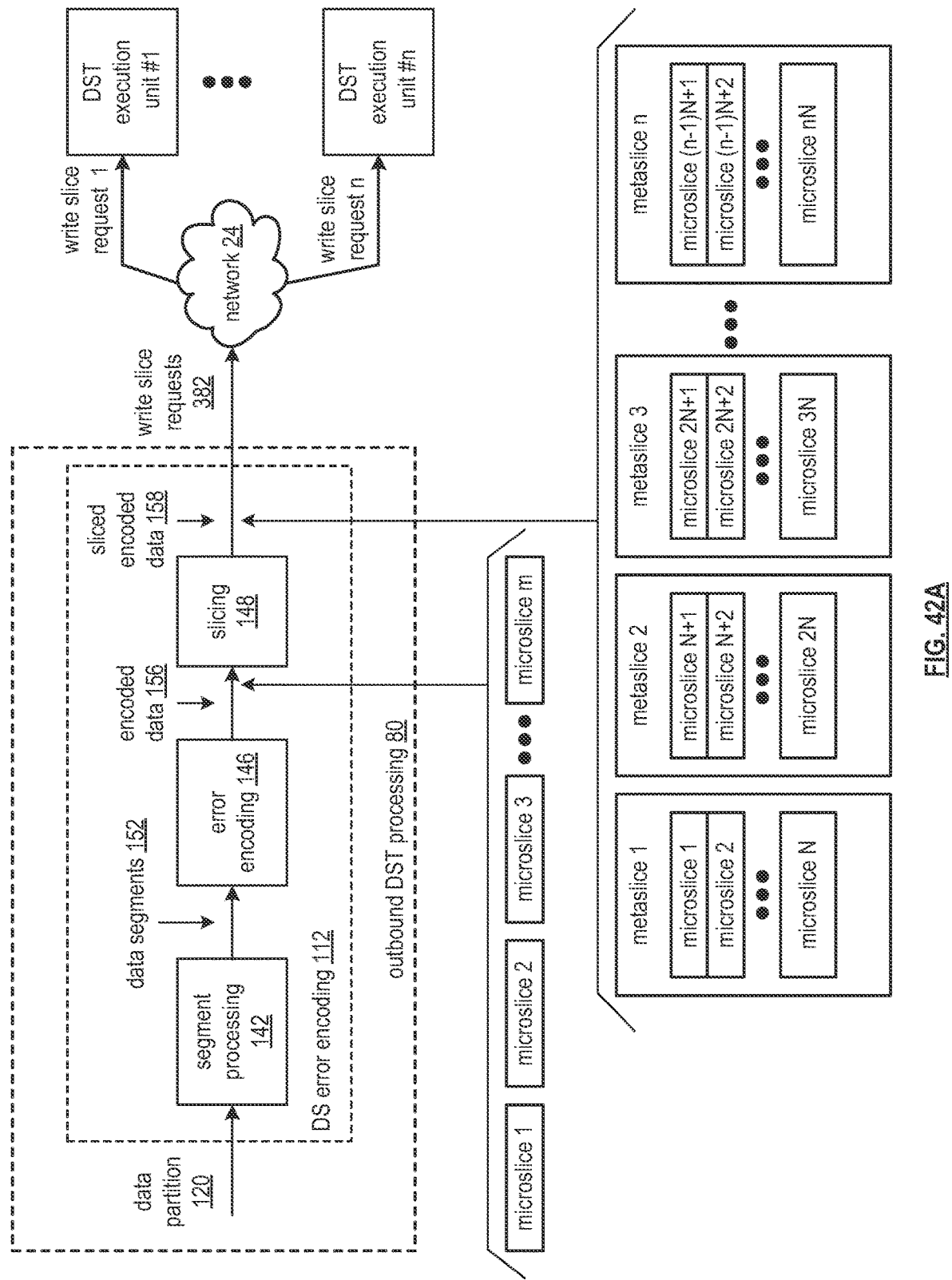
FIG. 42A is a schematic block diagram of a dispersed storage network (DSN) in accordance with the present invention.

FIG. 42A is a schematic block diagram of a dispersed storage network (DSN) that includes the outbound distributed storage and task (DST) processing 80 of FIG. 40A, the network 24 of FIG. 1, and the set of DST execution units 1-*n* of FIG. 40A. The DSN functions to store a data partition 120 as a set of encoded micro slices in the set of DST execution units 1-*n*.

In an example of operation, the segment processing 142 receives the data partition 120 for storage in a DSN vault associated with the DSN. Having received the data partition 120, the segment processing 142 outputs the data partition 120 as a data segment 152. Alternatively, the segment processing 142 divides the data partition 120 into two or more data segments 152 in accordance with a data segmentation scheme.

The error encoding 146 obtains encoding parameters that include one or more of a micro slice width (m), a micro slice decode threshold, and an encoding matrix. As a specific example, the error encoding 146 accesses a system registry information to identify a vault identifier (ID) associated with the data partition and utilizes the vault ID to access a portion of the system registry information associated with the vault ID to retrieve the encoding parameters. As another specific example, the error encoding 146 determines the encoding parameters based on one or more of a performance goal and performance information. For instance, the error encoding 146 accesses the system registry to establish the micro slice width m=16,000 and the micro slice decode threshold as 10,000.

Having obtained the encoding parameters, the error encoding 146 encodes the data segment 152 using a dispersed storage error coding function in accordance with the encoding parameters to produce encoded data 156 that includes a set of encoded micro slices. As a specific example, the error encoding 146 encodes the data segment 152 to produce 16,000 encoded micro slices when the micro slice width is 16,000 (e.g., m=16,000). The error encoding 146 generates a micro slice width number of slice names for the corresponding set of encoded micro slices.

The slicing 148 identifies the set of DST execution units 1-$n$ for storage of the encoded data 156 that includes the set of encoded micro slices (e.g., based on a table lookup). The slicing 148 determines dispersal parameters for slicing and storage of the set of encoded micro slices in the set of DST execution units 1-$n$. The dispersal parameters include one or more of a meta-slice width (n), a meta-slice decode threshold number, and a number of encoded micro slices per meta-slice (N). As a specific example, the slicing 148 determines the meta-slice width as the number of storage units n, the number of encoded micro slices per meta-slice (N) as N=micro slice width (m)/meta-slice width, and the meta-slice decode threshold number as the micro slice decode threshold number/N. For instance, the slicing 148 determines the meta-slice width as: n=16; the number of encoded micro slices per meta-slice: N=16,000/16=1,000; and the meta-slice decode threshold number as 10,000/1,000=10.

Having determined the dispersal parameters, the slicing 148 organizes the set of micro slices of the encoded data 156 to generate a set of meta-slices 1-$n$ in accordance with the dispersal parameters (e.g., the meta-slice width number of data slices in the set of meta-slices and the number of micro slices per meta-slice N) to produce sliced encoded data 158. As a specific example, the slicing 148 generates each meta-slice to include 1,000 encoded micro slices of the set of 16,000 encoded micro slices when N=1,000. Alternatively, or in addition to, the slicing 148 generates a set of slice names for the set of meta-slices.

Having generated the sliced encoded data 158, the outbound DST processing 80 issues write slice requests 382 (e.g., including write slice requests 1-$n$) to the set of DST execution units 1-$n$, where each write slice request includes one or more of a corresponding meta-slice of the set of meta-slices, a corresponding slice name of the meta-slice, and corresponding slice names associated with the encoded micro slices of the meta-slice.

Recovery of the data partition 120 from the set of DST execution units 1-$n$ includes at least one of recovering a meta-slice decode threshold number of meta-slices and recovering a micro slice decode threshold number of encoded micro slices and decoding either of the decode threshold number of slices to reproduce the data partition 120.

Figure 42B:
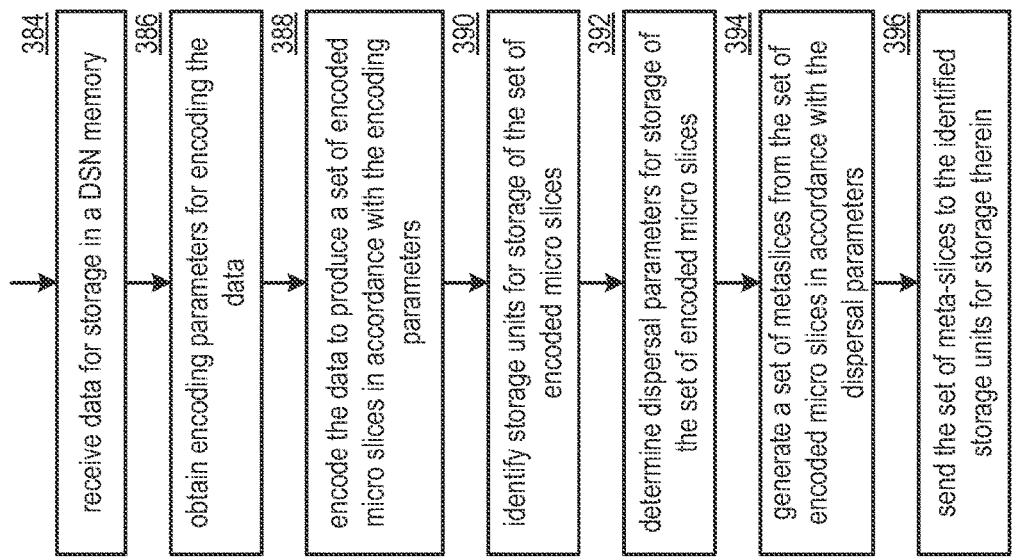
FIG. 42B is a flowchart illustrating an example of storing data in accordance with the present invention.

FIG. 42B is a flowchart illustrating an example of storing data. The method begins at a step where a processing module (e.g., of a distributed storage and task (DST) client module) receives data for storage in a dispersed storage network (DSN) memory 384. The receiving includes receiving at least one of a data object, a data partition, and a data file. The method continues at the step where the processing module obtains encoding parameters for encoding the data 386. The obtaining includes at least one of receiving, initiating a query, receiving a query response, accessing system registry information, and utilizing a predetermination.

The method continues at the step where the processing module encodes the data to produce a set of encoded micro slices in accordance with the encoding parameters 388. For example, the processing module matrix multiplies an encoding matrix of the encoding parameters by a data matrix that includes the data to produce an output matrix that includes the set of encoded micro slices.

The method continues at the step where the processing module identifies n storage units for storage of the set of encoded micro slices 390. As a specific example, the processing module identifies a storage unit for storage of a group of encoded micro slices. The identifying includes at least one of receiving a list, initiating a query, accessing the system registry information, and identifying available storage units.

The method continues at step where the processing module determines dispersal parameters for storage of the set of encoded micro slices 392. The determining may be based on one or more of calculating the dispersal parameters based on the encoding parameters, receiving the dispersal parameters, and retrieving the dispersal parameters. When calculating the dispersal parameters, the processing module calculates a meta-slice width number=n; a number of encoded micro slices per meta-slice=N=(a micro slice width number m)/a number of storage units n of the identified storage units; and a meta-slice decode threshold number=a micro slice decode threshold number/N.

The method continues at the step where the processing module generates a set of meta-slices from the set of encoded micro slices in accordance with the dispersal parameters 394. For example, the processing module aggregates every N number of encoded micro slices to produce another meta-slice of the set of n meta-slices. The method continues at the step where the processing module sends the set of meta-slices to the identified storage units for storage therein 396. As a specific example, the processing module generates a set of write slice requests, where each write slice request includes N number of encoded micro slices. As another specific example, the processing module generates the set of write slice requests, where each write slice request includes a meta-slice. The processing module sends the generated set of write slice requests to the identified storage units.

Alternatively, or in addition to, the processing module may change configuration of storage by changing dispersal parameters rather than changing encoding parameters. As a specific example, the processing module identifies a new configuration of storage units for storage of the set of encoded micro slices (e.g., adds another storage unit, removes a storage unit based on capacity requirements). The processing module determines new dispersal parameters and obtains (e.g., retrieves) the dispersal parameters of the currently stored set of encoded micro slices. The processing module determines a meta-slice mapping of stored encoded micro slices to a new set of meta-slices (e.g., dividing evenly). The processing module facilitates redistribution of the stored encoded micro slices in accordance with the meta-slice mapping. Such facilitation includes one or more of issuing a migration request, issuing a slice retrieval request, issuing a write slice request.

FIGS. 43A-B are schematic block diagrams of a dispersed storage network (DSN) that includes the set of distributed storage and task (DST) execution units 1-n of FIG. 42A, the network 24 of FIG. 1, and the inbound DST processing 82 of FIG. 3. The inbound DST processing 82 includes the dispersed storage (DS) error decoding 182 and the de-grouping 180 of FIG. 13. Hereafter, the DST execution units may be interchangeably referred to as storage units. The DSN functions to recover a data partition 120 from a set of encoded micro slices stored in the set of DST execution units 1-n. Hereafter, the data partition 120 may be interchangeably referred to as a data segment of data to be retrieved from the storage units of the DSN.

FIG. 43A illustrates initial steps of the recovering of the data segment where the inbound DST processing 82 identifies the data segment of the data to be retrieved from the storage units of the DSN, where the data segment is encoded (e.g., dispersed storage error encoded) into a set of encoded data slices, where the set of encoded data slices is divided into block sets of encoded data slices, and where one of the storage units stores one block set of encoded data slices of the block sets of encoded data slices. Hereafter, each encoded data slice may be interchangeably referred to as a micro slice and a block set of encoded data slices may be referred to interchangeably as a meta-slice. The identifying of the data segment includes the inbound DST processing 82 receiving a read request 400 for the data segment.

Having identified the data segment, the inbound DST processing 82 generates a set of read requests (e.g., read slice request 402) in accordance with retrieval information, where the retrieval information assures that at least a decode threshold number of encoded data slices of the set of encoded data slices are retrievable. For example, a first read request (e.g., read slice request 1) of the set of read requests includes identity of a first block set (e.g., an identity of a meta-slice 1 as a meta-slice name 1) of encoded data slices of the block sets of encoded data slices and a first number (e.g., absolute number, percentage, portion 1) of encoded data slices of the first block set of encoded data slices that are to be read from a first storage unit of the storage units. As another example, a second read request (e.g., read slice request 2) of the set of read requests includes identity of a second block set (e.g., an identity of a meta-slice 2) of encoded data slices of the block sets of encoded data slices and a second number of encoded data slices of the second block set of encoded data slices that are to be read from a second storage unit of the storage units. When the storage units are available, at least one of the first number and the second number is less than a total number of encoded data slices in a block set of encoded data slices of the block sets of encoded data slices. For instance, the first number may be 1000 and the second number 500 when each block set includes 1000 micro slices.

The retrieval information includes one or more of read response timing information from each of the storage units (e.g., latency performance levels when accessing micro slices), network bandwidth for each of the storage units (e.g., sustained throughput levels), reliability data for each of the storage units (e.g., online time performance, accuracy of retrieved data, etc.), security data for each of the storage units (e.g., trust levels), currently available storage units (e.g., online and able to provide retrieved micro slices), and comparative performance information of the storage units. The comparative performance information includes one or more of a comparison of a performance level of a particular storage unit to each remaining storage unit, a comparison of the performance level of the particular storage unit to a best-performing storage unit, and a comparison of the performance level of the particular storage unit to an average performance level of the storage units.

As a specific example of the generating of the set of read requests 402, the inbound DST processing 82 determines the first number to be a first specific number of encoded data slices to be retrieved and determines the second number to be a second specific number of encoded data slices to be retrieved. For instance, the inbound DST processing 82 determines the first number to be 1000 micro-slices when a performance level of the DST execution unit 1 is a best performance level of the set of DST execution units. As another instance, the inbound DST processing 82 determines the first number to be 100% of the micro-slices associated with DST execution unit 1 when a performance level of the DST execution unit 1 is a best performance level of the set of DST execution units. As another instance the inbound DST processing 82 determines the first number to be 60% of the micro-slices associated with DST execution unit 1 when the performance level of the DST execution unit 1 is 6% of the best performance level of the set of DST execution units.

As another specific example of the generating of the set of read requests 402, the inbound DST processing 82 determines the first number to be a first specific slice name range of encoded data slices to be retrieved (e.g., micro slice names start and end) and determines the second number to be a second specific slice name range of encoded data slices to be retrieved. As yet another specific example of the generating of the set of read requests 402, the inbound DST processing 82 determines the first number to be a first list of slice names of encoded data slices to be retrieved and determines the second number to be a second list of slice names of encoded data slices to be retrieved.

When one of the storage units is unavailable, the inbound DST processing 82 adjusts at least one of the first number and the second number to ensure that the at least the decoded threshold number of encoded data slices is retrieved. For example, the inbound DST processing 82 adjusts the first number and a second number to be 100% when DST execution unit 3 is unavailable. Having generated the set of read requests 402, the inbound DST processing 82 sends, via the network 24, the set of read requests 402 to the storage units (e.g., to the set of DST execution units).

FIG. 43B illustrates further steps of the recovering of the data segment where each DST execution unit receiving a read slice request issues, via the network 24, a corresponding read slice response 404 (e.g., including a starting micro-slice through an ending micro-slice) to the de-grouping 180 of the inbound DST processing 82. When the at least the decode threshold number of encoded data slices is received by the inbound DST processing 82, the de-grouping 180 identifies the encoded data slices per partition 122 (e.g., micro-slices that includes the decode threshold number of encoded data slices). The DS error decoding 182 decodes the at least a decode threshold number of encoded data slices to recover the data segment. For example, the DS error decoding 182 identifies which encoded data slices of the set of encoded data slices have been received, arranges a decoding matrix in accordance with the identified encoded data slices, and dispersed storage error decodes the identified encoded data slices utilizing the decoding matrix to produce a data partition 120 as a recovered the data segment.

FIG. 43C is a flowchart illustrating an example of recovering data. In particular, a method is presented for use in conjunction with one or more functions and features described in conjunction with FIGS. 1-39, 43A-B, and also FIG. 43C. The method begins at step 406 where a processing module of a computing device of one or more computing devices of a dispersed storage network (DSN) identifies a data segment of data to be retrieved from storage units of the DSN, where the data segment is encoded into a set of encoded data slices. The set of encoded data slices is divided into block sets of encoded data slices. One of the storage units stores one block set of encoded data slices of the block sets of encoded data slices. The identifying of the data segment includes receiving a data request for the data segment. Alternatively, the identifying includes at least one of receiving an identifier of a data partition and receiving a data identifier.

The method continues at step 408 where the processing module determines retrieval information to facilitate the retrieval the data segment. The retrieval information assures that at least a decode threshold number of encoded data slices of the set of encoded data slices are retrievable. The retrieval information includes one or more of identity of a first block set of encoded data slices of the block sets of encoded data slices, a first number of encoded data slices of the first block set of encoded data slices that are to be read from a first storage unit of the storage units, identity of a second block set of encoded data slices of the block sets of encoded data slices, and a second number of encoded data slices of the second block set of encoded data slices that are to be read from a second storage unit of the storage units. When the storage units are available, at least one of the first number and the second number is less than a total number of encoded data slices in a block set of encoded data slices of the block sets of encoded data slices.

As a specific example, the processing module determines the first number to be a first specific number of encoded data slices to be retrieved and determines the second number to be a second specific number of encoded data slices to be retrieved. As another specific example, the processing module determines the first number to be a first specific slice name range of encoded data slices to be retrieved and determines the second number to be a second specific slice name range of encoded data slices to be retrieved. As yet another specific example, the processing module determines the first number to be a first list of slice names of encoded data slices to be retrieved and determines the second number to be a second list of slice names of encoded data slices to be retrieved. When one of the storage units is unavailable, the processing module may adjust at least one of the first number and the second number to ensure that the at least the decoded threshold number of encoded data slices is retrieved (e.g., higher percentage when fewer units are available).

The method continues at step 410 where the processing module generates a set of read requests in accordance with the retrieval information, where the retrieval information assures that at the least a decode threshold number of encoded data slices of the set of encoded data slices are retrievable. A first read request of the set of read requests includes the identity of the first block set of encoded data slices of the block sets of encoded data slices and the first number of encoded data slices of the first block set of encoded data slices that are to be read from the first storage unit of the storage units. A second read request of the set of read requests includes the identity of the second block set of encoded data slices of the block sets of encoded data slices and the second number of encoded data slices of the second block set of encoded data slices that are to be read from the second storage unit of the storage units.

The method continues at step 412 where the processing module sends the set of read requests to the storage units. The method continues at step 414 where the processing module receives read slice responses from the storage units, where the read slice responses includes encoded data slices. When the at least a decode threshold number of encoded data slices is received, the method continues at step 416 where the processing module decodes the at least a decode threshold number of encoded data slices to recover the data segment.

The method described above in conjunction with the processing module can alternatively be performed by other modules of the dispersed storage network or by other devices. In addition, at least one memory section that stores operational instructions can, when executed by one or more processing modules of one or more computing devices of the dispersed storage network (DSN), cause the one or more computing devices to perform any or all of the method steps described above.

FIG. 44A is a schematic block diagram of a dispersed storage network (DSN) that includes the set of DST execution units 1-n of FIG. 43A, the network 24 of FIG. 1, and the outbound DST processing 80 of FIG. 42A. The DSN functions to store data as a set of encoded micro slices in the set of DST execution units 1-n.

In an example of operation, the outbound DST processing 80 receives the data for storage in a DSN vault associated with the DSN. Having received the data, the outbound DST processing 80 obtains encoding parameters that includes one or more of a micro slice width (m), a micro slice decode threshold, and an encoding matrix. As a specific example, the outbound DST processing 80 accesses system registry information to identify a vault identifier (ID) associated with the data partition and utilizes the vault ID to access a portion of the system registry information associated with the vault ID to retrieve the encoding parameters. As another specific example, the outbound DST processing 80 determines the encoding parameters based on one or more of a performance goal and performance information. For instance, the outbound DST processing 80 accesses the system registry to establish the micro slice width m=16,000 and the micro slice decode threshold as 10,000.

Having obtained the encoding parameters, the outbound DST processing 80 encodes the data using a dispersed storage error coding function in accordance with the encoding parameters to produce a set of encoded micro slices. As a specific example, the outbound DST processing 80 encodes the data to produce 16,000 encoded micro slices when the micro slice width is 16,000 (e.g., m=16,000). The outbound DST processing 80 generates a micro slice width number of slice names for the corresponding set of encoded micro slices.

The outbound DST processing 80 identifies the set of DST execution units 1-n for storage of the set of encoded micro slices (e.g., based on a table lookup). The outbound DST processing 80 determines dispersal parameters for slicing and storage of the set of encoded micro slices in the set of DST execution units 1-n. The dispersal parameters includes one or more of a meta-slice width (n), a meta-slice decode threshold number, and a number of encoded micro slices per meta-slice (N). As a specific example, the outbound DST processing 80 determines the meta-slice width as the number of storage units n, the number of encoded micro slices per meta-slice (N) as N=micro slice width (m)/meta-slice width, and the meta-slice decode threshold number as the micro slice decode threshold number/N. For instance, the outbound DST processing 80 determines the meta-slice width as:

n=16; the number of encoded micro slices per meta-slice: N=16,000/16=1,000; and the meta-slice decode threshold number as 10,000/1,000=10.

Having determined the dispersal parameters, the outbound DST processing 80 organizes the set of micro slices of the encoded data 156 to generate a set of meta-slices 1-*n* in accordance with the dispersal parameters (e.g., the meta-slice width number of data slices in the set of meta-slices and the number of micro slices per meta-slice N). As a specific example, the outbound DST processing 80 generates each meta-slice to include 1,000 encoded micro slices of the set of 16,000 encoded micro slices when N=1,000. Alternatively, or in addition to, the outbound DST processing 80 generates a set of slice names for the set of meta-slices.

Having generated the set of data slices, the outbound DST processing 80 determines availability of the identified set of DST execution units. The availability indicates whether a corresponding DST execution unit is available or not available (e.g., off-line for maintenance, powered down, destroyed, without network connectivity, etc.). The determining includes at least one of issuing a write slice request and determining whether a corresponding write slice responses received within a response timeframe; initiating an availability poll and determining whether a corresponding availability poll response has been received within a poll response timeframe; and interpreting a list of available DST execution units.

Having determined the availability of the identified set of DST execution units, the outbound DST processing 80 determines a micro slice mapping that maps each encoded micro slice to unavailable DST execution unit based on the availability of the identified set of DST execution units and a mapping scheme. The mapping scheme includes at least one of assigning encoded micro slices associated with unavailable DST execution unit to one or more other DST execution units based on performance level information, evenly mapping micro slices of a meta-slice associated with unavailable DST execution unit two other available DST execution units, encoding micro slices of a common pillar to unavailable DST execution unit associated with the common pillar. The outbound DST processing 80 may select the mapping scheme based on one or more of a request, a vault identifier, a predetermination, a performance goal, and performance of the set of DST execution units.

Having determined the micro slice mapping, the outbound DST processing 80 sends the encoded micro slices to available DST execution units in accordance with the micro slice mapping. As a specific example, the outbound DST processing 80 issues write slice requests 420 to the available DST execution units, where the write slice requests 420 include encoded micro slices and slice names of the encoded micro slices. For instance, when the outbound DST processing 80 determines that DST execution unit 2 is unavailable (e.g., based on received write slice responses 422), the outbound DST processing 80 evenly distributes encoded micro slices associated with DST execution unit 2 to the other DST execution units by including the encoded micro slices associated with the DST execution unit 2 in the write slice requests 420 sent to the other DST execution units. Alternatively, or in addition to, the outbound DST processing 80 associates the slice names of the encoded micro slices associated with the DST execution unit 2 with the other DST execution units within at least one of a DSN directory and a dispersed hierarchical index.

FIG. 44B is a flowchart illustrating another example of storing data, which include similar steps to FIG. 42B. The method begins with steps 384-394 of FIG. 42B where a processing module (e.g., of a distributed storage and task (DST) client module) receives data for storage in a dispersed storage network (DSN) memory, obtains encoding parameters for encoding the data, encodes the data to produce a set of encoded micro slices in accordance with the encoding parameters, identify storage units for storage of the set of encoded micro slices, determines dispersal parameters for the storage of the set of encoded micro slices, and generates a set of meta-slices from the set of encoded micro slices in accordance with the dispersal parameters. The method continues at step 424 where the processing module determines availability of the identified storage units. The determining includes at least one of interpreting an error message, initiating a query, interpreting a query response, initiating a test, and interpreting a test result.

The method continues at step 426 where the processing module determines a micro slice mapping that maps each encoded micro slice to unavailable storage unit based on the availability of the identified storage units and in accordance with a mapping scheme. The determining may be based on one or more of selecting a mapping scheme based on one or more of an input, a predetermination, a system registry entry, a network performance level indicator, and a storage unit performance level indicator.

The method continues at step 428 where the processing module sends meta-slices to associated available storage units in accordance with the micro slice mapping. As a specific example, the processing module generates and sends write slice requests to each of the storage units, where each write slice request includes a group of encoded micro slices in accordance with the micro slice mapping.

For each unavailable storage unit, the method continues at step 430 where the processing module sends encoded micro slices of a meta-slice associated with the unavailable storage unit to one or more of the available storage units in accordance with the micro slice mapping. The sending includes issuing write slice requests to the one or more of the available storage units. As an example, the processing module sends one write slice request to unavailable storage unit where the write slice request includes micro slices associated with the available storage unit and at least some micro slices associated with the unavailable storage unit. Alternatively, the processing module maps the meta-slice of the unavailable storage unit two one of the other available storage units. Further alternatively, when the unavailable storage unit becomes available, the processing module facilitates migration of associated encoded micro slices to the now available storage unit.

FIG. 45A is a schematic block diagram of a dispersed storage network (DSN) that includes the distributed storage and task network (DSTN) managing unit 18 of FIG. 1, the network 24 of FIG. 1, and a set of DST execution units portrayed over three time frames 1-3. The set of DST execution units includes DST execution units 36 of FIG. 1. Each DST execution unit is associated with a unique storage capacity level and a unique performance capacity level (e.g., retrieval latency, storage latency, storage bandwidth, retrieval bandwidth, storage availability, retrieval reliability, etc.). For instance, DST execution unit 2 may include more storage capacity as compared to the other DST execution units of the set of DST execution units.

The DSN functions to configure the set of DST execution units over time. The configuring includes one or more of establishing a configuration of the set of DST execution units (e.g., adding or removing DST execution units to the set of DST execution units to adjust total storage capacity) and assigning a DSN address range set to the set of DST execution units, where the DSN address range set includes a DSN address range assignment for each of the DST execution units. The DST execution units are utilized to store one or more sets of encoded data slices, where each set of encoded data slices is associated with a set of unique slice names. For each DST execution unit, the DS and address range assignment includes corresponding a slice name of each unique set of slice names.

In an example of a configuration of the set of DST execution units and assignment of the DSN address range set, during timeframe 1, a configuration 1 includes DST execution units 1-5. A DSN address range set 1 of the timeframe 1 includes a DSN address range of 1100-1199 associated with DST execution unit 1, a DSN address range of 2100-2299 associated with DST execution unit 2 (e.g., note more addresses assigned to DST execution unit 2 due to the greater storage capacity of DST execution unit 2), a DSN address range of 3100-3199 associated with DST execution unit 3, a DSN address range of 4100-4199 associated with DST execution unit 4, and a DSN address range of 5100-5199 assigned to DST execution unit 5.

In an example of operation, the DSTN managing unit 18 (e.g., alternatively, any other module of the DSN) determines whether to modify a configuration of the set of DST execution units based on one or more of a storage utilization level, a migration plan, a request, interpretation of an error message. As a specific example, the DSTN managing unit 18 determines to modify the configuration of the set of DST execution units by adding storage capacity to the set of DST execution units by adding DST execution unit 6 to produce a modified configuration when the storage utilization level of the DST execution unit set is greater than a high storage utilization threshold level.

When modifying the configuration of the set of DST execution units, the DSTN managing unit 18 obtains the DSTN address range set 1 for the set of DST execution units. The obtaining includes at least one of accessing a system registry to obtain registry information 432, initiating a query, and receiving a query response. Having obtained the DSTN address range set 1, the DSTN managing unit 18 obtains storage information for the set of DST execution units, where the storage information includes, for each DST execution unit, a storage capacity level of the DST execution unit and a storage utilization level for the DST execution unit. The obtaining includes at least one of initiating a query, interpreting a query response, and accessing a storage information record.

Having obtained the storage information, the DSTN managing unit 18 modifies the DSN address range set 1 to produce a modified DS and address range set (e.g., DSN address range set 2) based on the modified configuration, the storage information, and in accordance with a mapping scheme. Then mapping scheme includes at least one of evenly redistributing a portion of the DSN address ranges of the DST execution units of a current configuration to a new DST execution unit of the modified configuration when adding the new DST execution unit; evenly redistributing a DSN address range of a DST execution unit being removed to the remaining DST execution units when removing the DST execution unit being removed; and redistributing DSN address ranges of the DSN address range set to produce DSN address ranges of the modified configuration based on a weighting, where the weighting is in accordance with storage capacities of the DST execution units (e.g., assigned more DSN addresses to DST execution units associated with greater than average storage capacity).

As a specific example of adding another DST execution unit for timeframe 2, the DSTN managing unit 18 reassigns a substantially same number of DSN addresses from DST execution units 1-5 to DST execution unit 6 when adding DST execution unit 6 to the set of DST execution units. As a specific example of removing a DST execution unit for timeframe 3, the DSTN managing unit 18 reassigns the 5100-5199 DSN address range associated with DST execution unit 5 in an even fashion to the remaining DST execution units 1-4, and 6.

Having produced the modified DSN address range set, the DSTN managing unit 18 issues the registry information 432 to the set of DST execution units, where the registry information 432 includes the modified DSN address range set. Having issued the registry information 432, the DSTN managing unit 18 facilitates migration (e.g., issues migration requests, recover slices, stores slices) of stored encoded data slices from the DST execution units of the configuration to the DST execution units of the modified configuration in accordance with the modified DSN address range set. As a specific example, for timeframe 2, encoded data slices associated with DSN addresses 1183-1199 are migrated from DST execution unit 1 to DST execution unit 6. As another specific example, for timeframe 3, encoded data slices associated with DSN addresses 5120-5139 are migrated from DST execution unit 5 to DST execution unit 2. Alternatively, encoded data slices may be redistributed in an uneven fashion in accordance with storage capacities of receiving DST execution units. For example, DST execution unit 2 may receive more encoded data slices than other DST execution units.

FIG. 45B is a flowchart illustrating an example of reconfiguring a set of storage units. The method begins at step 434 where a processing module (e.g., of a distributed storage and task (DST) client module) determines whether to modify configuration of a set of storage units. The determining may be based on one or more of a storage utilization level, a migration plan, a request, interpreting an error message, and detecting that a timeframe has elapsed since a last modification. The method continues at step 436 where the processing module obtains a dispersed storage network (DSN) address range set for the configuration. The method continues at step 438 where the processing module obtains storage information for the configuration of the set of storage units. The obtaining includes at least one of accessing a list, initiating a query, receiving a query response, performing a lookup, and monitoring access of the set of storage units.

When modifying the configuration, the method continues at step 440 where the processing module modifies the configuration to produce a modified configuration. For example, the processing module determines to add a storage unit when estimating that future storage utilization demand is greater than current storage capacity. As another example, the processing module determines to remove a storage unit one estimating that the future storage utilization demand is less than the current storage capacity.

The method continues at step 442 where the processing module modifies the DSN address range set to produce a modified DSN address range set based on the modified configuration and the storage information. For example, the processing module redistributes a portion of the DSN address ranges associated with the set of storage units to a storage unit being added to the set of storage units. As another example, the processing module redistributes DSN address ranges to other storage units, where the DSN address ranges are associated with a storage unit being removed.

The method continues at step 444 where the processing module sends the modified DSN address range set to storage units of the modified configuration. As a specific example, the processing module issues an update DSN address range request. As another specific example, the processing module modifies system registry information to produce modified system registry information and facilitates pushing the modified system registry information to the set of storage units.

The method continues at step 446 where the processing module facilitates migration of stored encoded data slices from the set of storage units to the storage units of the modified configuration in accordance with the modified DSN address range set. For example, the processing module issues migration requests to the storage units where the migration requests include identified stored encoded data slices for migration. As another example, the processing module recovers the stored slices for migration and stores the recovered slices for migration in storage units in accordance with the modified DSN address range set.

FIG. 46A is a schematic block diagram of a dispersed storage network (DSN) that includes a set of distributed storage and task (DST) execution units 1-*n*, the network 24 of FIG. 1, and the DST client module 34 of FIG. 1. Each DST execution unit may be implemented utilizing the DST execution unit 36 of FIG. 1. The DSN functions to detect anomalies with regards to accessing (e.g., write requests, read requests) the set of DST execution units 1-*n*.

In an example of operation, data is encoded to produce one or more sets of encoded data slices that are stored in the set of DST execution units. For example, the DST client module 34 dispersed storage error encodes a data object A to produce M sets of n encoded data slices for storage in the set of DST execution units 1-*n*, where a first set of encoded data slices are associated with slice names A-1-1, A-2-1, A-3-1, through A-n-1, and a second set of encoded data slices are associated with slice names A-1-2, A-2-2, A-3-2, through A-n-2, etc. In another example, the DST client module 34 dispersed storage error encodes a data object B to produce N sets of n encoded data slices for storage in the set of DST execution units.

Each DST execution unit is associated with storage of encoded data slices with slice names that correspond to a plurality of DSN address ranges assigned to the DST execution unit. A portion of each DSN address range may be utilized for storage of encoded data slices associated with slice names that fall within the DSN address range. Other portions of the DSN address range may be unutilized at any given time frame. For example, DST execution unit 1 is associated with storage of encoded data slices of slice names of a first DSN address range including slice names A-1-1, A-1-2, A-1-3, through A-1-M and a second DSN address range including slice names B-1-1, B-1-2, B-1-3 through B-1-N. As such, many unutilized slice names may exist between the first and second DSN address ranges.

In an example of the detecting the anomalies, the DST client module 34 identifies a set of unutilized slice names (e.g., not utilized for storing of encoded data slices associated with data objects A, B, and any other data objects presently stored in the set of DST execution units 1-*n*. The identifying may be based on one or more of interpreting a DSN directory, accessing a dispersed hierarchical index, accessing a list of utilized slice names, initiating a query, and interpreting a query response.

Having identified the set of unutilized slice names, the DST client module 34 issues a set of access slice requests 448 that includes the set of unutilized slice names, where the set of access slice requests includes a set of write slice requests, and each write slice request includes a corresponding slice name of the set of unutilized slice names and a trap slice. For example, the DST client module 34 issues a set of write slice requests 1-*n* to the set of DST execution units 1-*n* that includes trap slices 1-1 through n-1, to facilitate storage of the set of trap slices in the set of DST execution units 1-*n*. Alternatively, or in addition to, the DST client module 34 facilitates storage of a plurality of sets of trap slices in the set of DST execution units utilizing sets of unutilized slice names. Each DST execution unit receives a write slice request and stores a corresponding trap slice and a slice name associated with the trap slice.

Subsequent to receiving a trap slice of the one or more sets of trap slices, each DST execution unit receives another access slice request 448, where the other access slice request 448 includes a requested slice name and an operation code (e.g., an opcode associated with one or more of write, read, delete, list). The DST execution unit determines whether the requested slice name corresponds to a trap slice stored by the DST execution unit. For example, the DST execution unit compares the requested slice name to a list of stored slices and indicates that the requested slice name is associated with a stored trap slice when the requested slice name matches a slice name of the stored trap slice.

When the requested slice name corresponds to the trap slice, the DST execution unit determines a course of action in accordance with an anomaly processing scheme. The anomaly processing scheme includes one or more of shutting down the DST execution unit, disconnecting from the network 24, terminating a connection session with a requesting entity of the subsequent request, reporting the request, ignoring the request, and processing the request normally. The determining of the course of action may be based on one or more of a predetermination, receiving a request, interpreting a system registry, interpreting an error message, a requesting entity identifier, and receiving threat information. Having identified the course of action, the DST execution unit facilitates execution of the course of action. For example, the DST execution unit identifies the requesting entity as a rogue client and terminates a connection session with the identified rogue client.

When the requester slice name does not correspond to the trap slice, the DST execution unit issues an access slice response 450 based on the corresponding access slice request 448. For example, the DST execution unit issues the access slice response 450 to include an encoded data slice when the encoded data slice is not a trap slice.

FIG. 46B is a flowchart illustrating an example of detecting an anomaly in a dispersed storage network (DSN). The method begins at step 452 where a processing module (e.g., of a distributed storage and task (DST) client module) identifies an unutilized DSN address range across a set of storage units. The identifying may be based on one or more of accessing system registry information, initiating a query to the set of storage units, and interpreting query responses.

The method continues at step 454 where the processing module generates a set of slice names corresponding to a portion of the unutilized DSN address range. The generating includes selecting a source name within the DSN address range and generating the set of slice names based on the source name. The selecting of the source name includes at least one of identifying a source name that is least likely to be assigned for storage of data objects by modules of the DSN; selecting a random source name that corresponds to the DSN address range; retrieving the source name from a list of source names to be utilized for generation of slice names of trap slices; and receiving the source name.

The method continues at step 456 where the processing module issues a set of write slice requests to the set of storage units, where the set of write slice requests includes the set of slice names. The issuing includes generating a set of trap slices, generating the set of write slice requests to include the set of trap slices and the set of slice names, and sending the set of write slice requests to the set of storage units. The generating of the set of trap slices includes selecting trap data and encoding the trap data utilizing a dispersed storage error coding function to produce the set of trap slices. The trap data includes at least one of random data, null data, a predetermined trap slice value, a corresponding slice name of the trap slice, an identifier of the processing module, or any other identifier associated with a generation of the set of trap slices. The selecting of the trap data may be based on one or more of a predetermination, a system registry information, an estimated DSN threat level, the system performance level, retrieving the trap data, and receiving the trap data.

The method continues at step 458 where a storage unit of the set of storage units receives a subsequent access slice request. For example, the storage unit receives a read slice request from a requesting entity. The method continues at step 460 where the storage unit determines whether a slice name of the subsequent access slice request corresponds to a trap slice stored within the storage unit. For example, the storage unit compares the slice name to slice names of a list. As another example, the storage unit compares the trap slice of a write slice request to store trap slices when the storage unit receives the write slice request from a requesting entity.

When the slice name corresponds to the trap slice, the method continues at step 462 where the storage unit determines a course of action in accordance with an anomaly processing scheme. The determination of the anomaly processing scheme includes selecting the anomaly processing scheme based on one or more of an identifier of the requesting entity, a slice name, a vault ID associated with the slice name, a DSN status indicator, and an interpretation of an error message. The method continues at step 464 where the storage unit facilitates execution of the course of action. For example, the storage unit issues and alert to a managing unit, issues the alert to other storage units of the set of storage units, and initiates disconnection of a connection associated with the requesting entity. As another example, the storage unit extracts addressing information from the connection associated with the requesting entity while processing the read slice request and generating a read slice response that includes a devised encoded data slice. The devised encoded data slice includes one or more of the stored trap slice, a predetermined encoded data slice value, a null encoded data slice, and a software algorithm that may be subsequently executed by the requesting entity (e.g., a Trojan horse software algorithm).

FIG. 47A is a schematic block diagram of a dispersed storage network (DSN) that includes a set of distributed storage and task (DST) execution units 1-5, the network 24 of FIG. 1, and the DST client module 34 of FIG. 1. Each DST execution unit may be implemented utilizing the DST execution unit 36 of FIG. 1. Alternatively, the set of DST execution units may include any number of DST execution units. The number of DST execution units may be established by the DST client module 34 to be substantially the same as a width number of dispersed storage encoding parameters. For example, the DST client module 34 establishes the number of DST execution units at 5 when an information dispersal algorithm width number is 5. Each DST execution unit includes a plurality of memories. Each memory may be implemented utilizing at least one of a solid-state memory device, an optical drive memory device, a magnetic disk drive memory device, or any other device capable of storing digital data. For example, each DST execution unit may include at least two memories. For instance, DST execution unit 1 includes memory 1-1 and 1-2, DST execution unit 2 includes memory 2-1 and 2-2, etc.

The DSN functions to store data objects as sets of encoded data slices in the set of DST execution units 1-5 and to detect slice errors associated with the storage of the sets of encoded data slices. In an example of the storing of the data objects, the DST client module 34 dispersed storage error encodes a data object A to produce M sets of encoded data slices for storage in the set of DST execution units 1-5 in accordance with the dispersed storage encoding parameters. The M sets of encoded data slices include a first set associated with slice names A-1-1, A-2-1, A-3-1, A-4-1, and A-5-1; a second set associated with slice names A-1-2, A-2-3, A-3-3, A-4-3, and A-5-2, through an Mth set associated with slice names A-1-M, A-2-M, A-3-M, A-4-M, and A-5-M. As another example of storing the data objects, the DST client module encodes a data object B to produce N sets of encoded data slices for storage in the set of DST execution units 1-5 in accordance with the dispersed storage encoding parameters (e.g., slices B-1-1 through B-5-N). Each DST execution unit stores received encoded data slices in at least one memory of the plurality of memories. For example, DST execution unit 3 stores encoded data slices A-3-2, A-3-2-2, through A-3-M in memory 3-1 and stores encoded data slices B-3-1, B-3-2, through B-3-N in memory 3-2.

From time to time a slice error may occur. A slice error includes at least one of a missing encoded data slice, a corrupted encoded data slice, and a maliciously modified encoded data slice. Many root causes are possible for slice errors including one or more of a failed DST execution unit, an off-line DST execution unit, a failure of at least a portion of the network 24, a software execution error, execution of malicious software, a memory device failure of a DST execution unit, etc. Multiple slice errors may occur as a result of a single root cause. For example, failure of memory 2-1 of DST execution unit 2 causes slice errors (e.g., missing slices) for slices A-2-1, A-2-2, through A-2-M. As another example, failure of DST execution unit 2 (e.g., off-line, unavailable, destroyed, network failure, unexpected software anomaly) causes slice errors for slices A-2-1, A-2-2, through A-2-M and slices B-2-1, B-2-2, through B-2-N.

In an example of operation of the detecting slice errors associated with the storage of the sets of encoded data slices, the DST client module 34 (e.g., or any other module of the DSN) determines a frequency of error scanning. The determining includes identifying a slice name range associated with the store data objects, identifying a historical error rate for each data object, and modifying the fricative error scanning for each data object based on the corresponding historical error rate. For example, the DST client module 34 determines to increase frequency of error scanning for data object A when the historical error rate for data object A is higher than an average error rate level. As another example, the DST client module 34 determines to decrease frequency of error scanning for data object B when the historical error rate for data object B is lower than the average error rate level.

Having determined the frequency of error scanning, the DST client module 34 identifies slice errors in accordance with the frequency of error scanning. As a specific example, the DST client module 34 issues a status requests 466 to the set of DST execution units 1-5 at the frequency of error scanning (e.g., once per hour, once per day, once per week, once per month etc.), where the status requests includes status requests 1-5. Each status request 466 may include at least one of a list slice request, a list slice digest request, and a read slice request. Each status request 466 further includes one or more slice names associated with encoded data slices of a corresponding data object.

Having issued the status requests 466, the DST client module 34 receives status responses 468 that may include status responses 1-5 from DST execution units 1-5. Each status response 468 includes at least one of a list slice response, a list slice digest response, a read slice response, and an error message. Each status response may further include one or more of a slice name, an error indication, a status indication, a corresponding encoded data slice, a list of slice names, and a digest of the list of slice names.

Having received the status responses 468, the DST client module 34 interprets the status responses 468 to identify one or more slice errors. The interpreting includes at least one of comparing status responses 468 and interpreting an individual status response 468. For example, a set of status responses 468 indicates that, for a second set of encoded data slices of data object A, encoded data slices A-1-2, A-3-2, and A-5-2 are present without error, encoded data slice A-4-2 is missing from DST execution unit 4, and memory 2-1 of DST execution unit 2 has failed causing a missing slice error with regards to encoded data slice A-2-2 of the second set of encoded data slices and all other encoded data slices associated with data object A that were stored in the failed memory 2-1 of the DST execution unit 2 (e.g., encoded data slices A-2-1, A-2-3, through A-2-M. Having identified slice errors related to failure of a memory, alternatively, or in addition to, the DST client module 34 may immediately indicate that all encoded data slices associated with the failed memory are associated with slice errors without sending further status requests with regards to the encoded data slices associated with the film memory.

Having identified the one or more slice errors, the DST client module 34 updates the historical error rate based on the identifying of the slice errors such that subsequent error scanning may utilize modified frequency of error scanning. For example, the DST client module 34 updates the historical error rate associated with data object A such that the modified frequency of error scanning for data object A scans for slice errors sooner and/or more often. As another example, the DST client module 34 updates the historical error rate associated with data object B such that the modified frequency of error scanning for data object B scans for slice errors later and/or less often.

Having updated the historical error rates, the DST client module determines a rebuilding priority level for each slice error based on a number of slice errors associated with a set of encoded data slices that includes an encoded data slice of the slice error. At least a decode threshold number of slices per set of encoded data slices must be available to facilitate reconstruction of the slice error. The determining may be further based on comparing a number of slices of the set of encoded data slices that are not associated with the slice error a rebuild threshold value associated with the data object. As a specific example, the DST client module 34 indicates to rebuild the encoded data slice of the slice error with a higher than average priority level when the number of slices of the set of encoded data slices that are not associated with the slice error (e.g., width number minus the number of slice errors of the set) is less than the rebuild threshold value.

For instance, the DST client module 34 determines to utilize a higher than average priority level for rebuilding of slice errors of encoded data slices A-2-2 and A-4-2 when three non-error slices are present for the second set of encoded data slices and the rebuild threshold value is 4. As another specific example, the DST client module 34 indicates to rebuild the encoded data slice of the slice error with a lower than average priority level the number of slices of the set of encoded data slices that are not associated with the slice error is greater than or equal to the rebuild threshold value but less than the width number.

Having determined the rebuilding priority level(s), the DST client module 34 facilitates execution of rebuilding encoded data slices associated with the slice errors in accordance with the rebuilding priority level(s). For example, the DST client module 34 initiates rebuilding of encoded data slice A-2-2 and encoded data slice A-4-2 of the second set of encoded data slices prior to utilizing resources to rebuild encoded data slices A-2-1, A-2-3, A-2-4, through A-2-M. The initiating of the rebuild includes at least one of issuing a rebuilding request and rebuilding the encoded data slice of the slice error.

FIG. 47B is a flowchart illustrating an example of detecting slice errors. The method begins at step 470 where a processing module (e.g., of a distributed storage and task (DST) client module) determines a frequency of slice error scanning for data objects stored in a dispersed storage network (DSN). For example, the processing module identifies a slice name range of a data object stored in the DSN and modifies an associated frequency of error scanning rate based on a historical slice error rate for an encoded data slice associated with the slice name range.

The method continues at step 472 where the processing module identifies slice errors in accordance with the frequency of error scanning. The identifying includes scanning for slice errors using the frequency of slice error scanning. For example, the processing module issues list slice requests to a set of storage units associated with storage of a data object, receives list slice responses, and indicates a slice error for a missing slice when a comparison of the list slice responses indicates that an encoded data slice of a set of encoded data slices is missing.

The method continues at step 474 where the processing module identifies slice errors based on memory status information. The memory status information includes an indication of a memory error. For example, the memory status information identifies a failure of a memory device 2-1. As a specific example of the identifying the slice errors, the processing module receives the memory status information, interprets the memory status information to identify the failure of the memory device, and identifies encoded data slices associated with the failed memory device.

The method continues at step 476 where the processing module updates historical error rate information based on the identifying of the slice errors. For example, the processing module updates timing information of historical slice error rates based on the identified slice errors for a set of encoded data slices produced by encoding a data object.

The method continues at step 478 where the processing module determines a rebuilding priority level for a slice error based on a number of slice errors associated with a data segment that includes the slice error. As a specific example, for each set of encoded data slices of the data object, the processing module identifies a total number of slice errors, identifies a total number of slices without errors based on the total number of slice errors and a width of a number of encoded data slices of the set of encoded data slices, compares the total number of slices without errors to a rebuilding threshold, and determines the rebuilding priority level based on the comparison.

The method continues at step 480 where the processing module facilitates execution of rebuilding slices associated with the slice errors in accordance with the rebuilding priority level. For example, the processing module initiates rebuilding for slice errors of a set of encoded data slices associated with a highest rebuilding priority level first followed by initiation of rebuilding slice errors associated with a lower rebuilding priority level.

FIG. 48A is a schematic block diagram of a dispersed storage network (DSN) that includes the set of dispersed storage and task (DST) execution units 1-5 of FIG. 47A, the network 24 of FIG. 1, and the DST client module 34 of FIG. 1. The DSN functions to store data objects as sets of encoded data slices in the set of DST execution units 1-5 and to detect slice errors associated with the storage of the sets of encoded data slices. In an example of operation of storing data objects as sets of encoded data slices in the set of DST execution units 1-5, the DST client module 34 encodes data object A to produce M sets of encoded data slices for storage in a first set of memories 1-1 through 5-1 of the set of DST execution units 1-5 and encodes data object B to produce N sets of encoded data slices for storage in a second set of memories 1-2 through 5-2 of the set of DST execution units 1-5.

In an example of operation of detecting slice errors associated with storage of the sets of encoded data slices, the DST client module 34 identifies slice errors based on error scanning by issuing status requests 466 (e.g., including status requests 1-5), via the network 24, receiving, via the network 24, status responses (e.g., which may include as many as status responses 1-5), and interpreting the status responses 468. For example, the DST client module 34 identifies a slice error associated with encoded data slice A-4-2 when a comparison of status responses 468 associated with a second set of encoded data slices indicates that The DST client module 34 receives, via the network 24, status responses 468 from available DST execution units. For example, the DST client module 34 receives status responses 1, 3-5 when DST execution units 1, 3-5 are available. As such, a status response 2 is not generated by DST execution unit 2 nor does DST client module 34 receive the status response 2 when the DST execution unit 2 is unavailable (e.g., nonfunctional, off-line, updating software, disconnected from the network 24).

Having identified the slice errors, the DST client module 34 identifies an unavailable DST execution unit based on interpreting the status responses. For example, the DST client module 34 indicates that DST execution unit 2 is unavailable when not receiving the status response 2 within a response timeframe. For each unavailable DST execution unit, the DST client module 34 identifies encoded data slices associated with the DST execution unit. The identifying includes one or more of identifying a DSN address range assigned to the unavailable DST execution unit, identifying one or more data objects associated with storage of sets of encoded data slices including encoded data slices stored in the unavailable DST execution unit, and identifying slice names associated with the one or more data objects associated with the unavailable DST execution unit.

Having identified the encoded data slices, the DST client module 34 selects an error recognition approach for each of the identified encoded data slices. The error recognition approach includes one of recognizing the slice error immediately and recognizing the slice error after a recognition time frame has elapsed. The selecting may be based on one or more of a predetermination, interpreting system registry information, interpreting a request, a data identifier of a data object, a vault identifier associated with the set of DST execution units, a DST execution unit availability historical record, and a slice error historical record. For example, the DST client module 34 selects the recognizing the slice error immediately error recognition approach when the DST execution unit availability historical record indicates that the unavailability of the DST execution unit is less than an average level of DST execution unit unavailability among a plurality of DST execution units. As another example, the DST client module 34 selects the recognizing the slice error after the timeframe has elapsed error recognition approach when the DST execution unit availability historical record indicates that the unavailability of the DST execution unit is greater than the average level of DST execution unit unavailability among the plurality of DST execution units (e.g., wait since the DST execution unit is likely to become available with substantially no missing encoded data slices).

Having determined the error recognition approach for each of the identified encoded data slices of the unavailable DST execution unit, the DST client module 34 determines a rebuilding priority level for a slice error based on the selected error recognition approach and a number of slice errors associated with a set of encoded data slices that includes the slice error. For example, the DST client module 34 determines the rebuilding priority level for the slice error to be a higher than average rebuilding priority level when the selected error recognition approach is to immediately recognize the slice error. Having determined the rebuilding priority level, the DST client module 34 facilitates execution of rebuilding encoded data slices associated with slice errors in accordance with the rebuilding priority level. For example, the DST client module 34 prioritizes initiation of rebuilding of slice errors of the second set of encoded data slices of data object A prior to initiation of rebuilding of other slice errors.

FIG. 48B is a flowchart illustrating another example of detecting slice errors, which include similar steps to FIG. 47B. The method begins at step 482 where a processing module (e.g., of a distributed storage and task (DST) client module) identifies slice errors in accordance with a frequency of error scanning. The identifying includes scanning for slice errors by issuing status requests to a set of storage units, receiving status responses from available storage units, and interpreting the received status responses. The method continues at step 484 where the processing module identifies one or more unavailable storage units of the set of storage units. For example, the processing module identifies a storage unit to be unavailable when a response timeframe has expired without receiving a status response in response to a status request. As another example, the processing module identifies the storage unit to be unavailable when receiving an error message indicating unavailability of the storage unit.

The method continues at step 486 where, for each unavailable storage unit, the processing module identifies encoded data slices associated with the storage unit. The identifying includes at least one of accessing system registry information, identifying data objects stored in the unavailable storage unit, identifying slice names of the encoded data slices that were encoded for the store data objects, and interpreting a status response of the unavailable storage unit (e.g., to include a list of the encoded data slices associated with the storage unit).

The method continues at step 488 where, for each identified encoded data slice, the processing module determines an error recognition approach. The method continues at step 490 where the processing module determines a rebuilding priority level for a slice error based on a number of slice errors associated with a set of encoded data slices that includes the slice error and in accordance with the error recognition approach. For example, the processing module identifies the slice errors of the set of encoded data slices, identifies a total number of available encoded data slices (e.g., no errors) of the set of encoded data slices, compares the total number of available encoded data slices to a rebuilding threshold level, and determines the rebuilding priority level based on the comparison. For example, the processing module indicates a higher rebuilding priority level when the number of available encoded data slices falls below the rebuilding threshold. As another example, the processing module indicates a lower rebuilding priority level when the number of available encoded data slices is greater than the rebuilding threshold and less than a width number. The method continues with step 480 of FIG. 47 B where the processing module facilitates execution of rebuilding slices associated with the slice errors in accordance with the rebuilding priority level.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc., described with reference to one or more of the embodiments discussed herein. Further, from figure to figure, the embodiments may incorporate the same or similarly named functions, steps, modules, etc., that may use the same or different reference numbers and, as such, the functions, steps, modules, etc., may be the same or similar functions, steps, modules, etc., or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A method for execution by one or more modules of one or more processors of a storage network comprises:
receiving data for storage in a storage network;
determining, a decode threshold value for storage of the data, wherein the data is to be distributedly stored in the storage network, wherein the determining a decode threshold value is based on at least one of receiving the decode threshold value, initiating a query, receiving a query response, accessing a storage network registry information and a previously determined desired performance level;
determining a preferred encoded data slice size for storage of the data, wherein the preferred encoded data slice size is based on a minimum performance level requirement;
based on the preferred encoded data slice size and the decode threshold value, determining a preferred segment size for the data;
based on the preferred segment size for the data, determining a segmentation scheme for the data, wherein the segmentation scheme is a variable segmentation scheme;
segmenting the data into a plurality of data segments in accordance with the segmentation scheme;
determining dispersed error encoding parameters for encoding each data segment of the plurality of data segments to provide a plurality of data segment dispersed error encoding parameters; and
encoding, based on data segment dispersed error encoding parameters for a data segment of the plurality of data segments, a data segment to produce a set of error encoded data slices.

2. The method of claim 1, wherein the data is at least one of a data object, a data partition and a data file.

3. The method of claim 1, wherein the preferred encoded data slice size is based on at least one of a predetermination, an indicator of contemporary storage network performance and a desired storage network performance.

4. The method of claim 1, wherein the segmentation scheme is a fixed segmentation scheme and a variable segmentation scheme, wherein the fixed segmentation scheme is determined by multiplying the preferred encoded data slice size by the decode threshold value.

5. The method of claim 1, wherein each data segment of the plurality of data segments is substantially a same number of bits.

6. The method of claim 1, further comprising:
generating a set of write slice requests corresponding to the set of error encoded data slices, wherein the set of write slice requests includes the set of error encoded data slices.

7. The method of claim 6, further comprising:
outputting the set of write slice requests to a set of storage units of the storage network.

8. The method of claim 7, wherein each write slice request of the set of write slice requests includes a slice identifier, wherein the slice identifier includes information sufficient to determine a storage unit for an error encoded data slice of the set of error encoded data slices.

9. The method of claim 7, further comprising:
receiving, from a storage unit of the set of storage units, a write response, wherein the write response indicates that the preferred encoded data slice size is not desirable;
determining another preferred encoded data slice size for storage of the data;
based on the another preferred encoded data slice size and the decode threshold value, determining another preferred segment size for the data;
based on the preferred segment size for the data, determine another segmentation scheme for the data;
segmenting the data into a plurality of another data segments in accordance with the another segmentation scheme;
determining dispersed error encoding parameters for encoding each another data segment of the plurality of another data segments to provide one or more data segment dispersed error encoding parameters; and
encoding, based on data segment dispersed error encoding parameters for another data segment of the plurality of another data segments, the another data segment to produce another set of error encoded data slices.

10. A computing device comprising:
an interface configured to interface and communicate with a storage network;
memory that stores operational instructions; and
processing circuitry operably coupled to the interface and to the memory, wherein the processing circuitry is configured to execute the operational instructions to:

receive data for storage in a storage network;

determine a decode threshold value for storage of the data, wherein the data is to be distributedly stored in the storage network, wherein the decode threshold value is determined based on at least one of receiving the decode threshold value, initiating a query, receiving a query response, accessing a storage network registry information and a previously determined desired performance level;

determine a preferred encoded data slice size for storage of the data, wherein the preferred encoded data slice size is based on a minimum performance level requirement;

based on the preferred encoded data slice size and the decode threshold value, determine a preferred segment size for the data;

based on the preferred segment size for the data, determine a segmentation scheme for the data, wherein the segmentation scheme is a variable segmentation scheme;

segment the data into a plurality of data segments in accordance with the segmentation scheme;

determine dispersed error encoding parameters for encoding each data segment of the plurality of data segments to provide one or more data segment dispersed error encoding parameters; and encode, based on data segment dispersed error encoding parameters for a data segment of the plurality of data segments, a data segment to produce a set of error encoded data slices.

11. The computing device of claim 10, wherein the processing circuitry is further configured to execute the operational instructions to:

generate a set of write slice requests corresponding to the set of error encoded data slices, wherein the set of write slice requests includes the set of error encoded data slices.

12. The computing device of claim 11, wherein the processing circuitry is further configured to execute the operational instructions to:

receive, from a storage unit of the set of storage units, a write response, wherein the write response indicates that the preferred encoded data slice size is not desirable;

determine another preferred encoded data slice size for storage of the data;

based on the another preferred encoded data slice size and the decode threshold value, determine another preferred segment size for the data;

based on the preferred segment size for the data, determine another segmentation scheme for the data;

segment the data into a plurality of another data segments in accordance with the another segmentation scheme;

determine dispersed error encoding parameters for encoding each another data segment of the plurality of another data segments to provide one or more data segment dispersed error encoding parameters; and encode, based on data segment dispersed error encoding parameters for another data segment of the plurality of another data segments, the another data segment to produce another set of error encoded data slices.

13. The computing device of claim 10, wherein the data is at least one of a data object, a data partition and a data file.

14. The computing device of claim 10, wherein the preferred encoded data slice size is determined based on at least one of a predetermination, an indicator of contemporary storage network performance and a desired storage network performance.

15. The computing device of claim 10, wherein the segmentation scheme is a fixed segmentation scheme and a variable segmentation scheme, wherein the fixed segmentation scheme is determined by multiplying the preferred encoded data slice size by the decode threshold value.

16. The computing device of claim 10, wherein each data segment of the plurality of data segments is substantially a same number of bits.

* * * * *